(12) United States Patent
Nichol et al.

(10) Patent No.: US 11,513,274 B2
(45) Date of Patent: Nov. 29, 2022

(54) LIGHTGUIDE WITH A LIGHT INPUT EDGE BETWEEN LATERAL EDGES OF A FOLDED STRIP

(71) Applicant: Azumo, Inc., Chicago, IL (US)

(72) Inventors: Anthony Nichol, Minneapolis, MN (US); Jose Romero, Chicago, IL (US); Zane Coleman, Elmhurst, IL (US); Gil Palmon, Chicago, IL (US)

(73) Assignee: Azumo, Inc., Chicago, IL (US)

( * ) Notice: Subject to any disclaimer, the term of this patent is extended or adjusted under 35 U.S.C. 154(b) by 0 days.

(21) Appl. No.: 17/630,849

(22) PCT Filed: Jul. 31, 2020

(86) PCT No.: PCT/US2020/070341
§ 371 (c)(1),
(2) Date: Jan. 27, 2022

(87) PCT Pub. No.: WO2021/022307
PCT Pub. Date: Feb. 4, 2021

(65) Prior Publication Data
US 2022/0268984 A1 Aug. 25, 2022

Related U.S. Application Data

(60) Provisional application No. 62/881,792, filed on Aug. 1, 2019.

(51) Int. Cl.
*F21V 8/00* (2006.01)
(52) U.S. Cl.
CPC ......... *G02B 6/0028* (2013.01); *G02B 6/0016* (2013.01); *G02B 6/0076* (2013.01)

(58) Field of Classification Search
CPC .... G02B 6/0028; G02B 6/0016; G02B 6/0076
See application file for complete search history.

(56) References Cited

U.S. PATENT DOCUMENTS

| 2,732,688 A | 1/1956 | Dickson |
| 3,535,537 A | 10/1970 | Powell |

(Continued)

FOREIGN PATENT DOCUMENTS

| CN | 1206661 | 2/1999 |
| CN | 1981221 | 6/2007 |

(Continued)

OTHER PUBLICATIONS

Rizzo, et al., "The recovery after bending of polycarbonate sheets." Rheol. Acta 20, 133-138 (1981), ISSN 0035-4511, p. 138, ln 1-2.

(Continued)

*Primary Examiner* — Donald L Raleigh

(57) ABSTRACT

A lightguide formed from a film comprises a light mixing region between a light emitting region and an array of coupling lightguides. The first coupling lightguide of the array of coupling lightguides comprises a first light input edge between an inner lateral edge of the first coupling lightguide and an outer lateral edge of the first coupling lightguide opposite the inner lateral edge, wherein a width of the first light input edge is less than a width of the first coupling lightguide at the light mixing region and the first coupling lightguide is folded toward the outer lateral edge such that the first light input edge is between the outer lateral edge and the inner lateral edge along the array direction. In one embodiment, the first light input edge is offset from the outer lateral edge and positioned above the first coupling lightguide.

20 Claims, 21 Drawing Sheets

(56) References Cited

U.S. PATENT DOCUMENTS

| | | |
|---|---|---|
| 3,933,556 A | 1/1976 | Strack |
| 4,026,693 A | 5/1977 | Sato |
| 4,141,058 A | 2/1979 | Mizohata et al. |
| 4,151,582 A | 4/1979 | Grunberger |
| 4,228,267 A | 10/1980 | Higashizume et al. |
| 4,389,698 A | 6/1983 | Cibie |
| 4,422,719 A | 12/1983 | Orcutt |
| 4,511,215 A | 4/1985 | Butler |
| 4,551,985 A | 11/1985 | Kovach |
| 4,592,717 A | 6/1986 | Albert |
| 4,667,481 A | 5/1987 | Watanabe et al. |
| 4,824,194 A | 4/1989 | Karasawa |
| 4,869,570 A | 9/1989 | Yokohama |
| 4,961,617 A | 10/1990 | Shahidi et al. |
| 4,974,354 A | 12/1990 | Hembrook, Jr. |
| 5,001,306 A | 3/1991 | Purcell |
| 5,009,483 A | 4/1991 | Rockwell, III |
| 5,106,181 A | 4/1992 | Rockwell, III |
| 5,134,857 A | 8/1992 | Burley |
| 5,165,187 A | 11/1992 | Shahidi-Hamedani et al. |
| 5,315,673 A | 5/1994 | Stetter et al. |
| 5,328,376 A | 7/1994 | West |
| 5,359,691 A | 10/1994 | Tai et al. |
| 5,379,539 A | 1/1995 | Hannula |
| 5,390,436 A | 2/1995 | Ashall |
| 5,506,929 A | 4/1996 | Tai et al. |
| 5,544,268 A | 8/1996 | Bischel |
| 5,596,671 A | 1/1997 | Rockwell, III |
| 5,661,839 A | 8/1997 | Whitehead |
| 5,737,472 A | 4/1998 | Bernasson et al. |
| 5,786,665 A | 7/1998 | Ohtsuki et al. |
| 5,789,710 A | 8/1998 | Vanderpoel |
| 5,818,554 A | 10/1998 | Hiyama et al. |
| 5,888,324 A | 3/1999 | Nakamura |
| 5,938,991 A | 8/1999 | Pollock |
| 6,049,641 A | 4/2000 | Deacon |
| 6,068,381 A | 5/2000 | Ayers |
| 6,208,788 B1 | 3/2001 | Nosov |
| RE37,186 E | 5/2001 | Hill |
| 6,224,269 B1 | 5/2001 | Engstrand et al. |
| 6,315,433 B1 | 11/2001 | Cavello |
| 6,464,365 B1 | 10/2002 | Gunn et al. |
| 6,490,090 B1 | 12/2002 | Kumazawa |
| 6,490,401 B2 | 12/2002 | Corneilissen et al. |
| 6,498,882 B1 | 12/2002 | Buckelew et al. |
| 6,547,445 B2 | 4/2003 | Kiani |
| 6,577,359 B2 | 6/2003 | Ishihara |
| 6,592,233 B1 | 7/2003 | Parikka |
| 6,641,880 B1 | 11/2003 | Deyak et al. |
| 6,700,054 B2 | 3/2004 | Cherney et al. |
| 6,750,996 B2 | 6/2004 | Jagt et al. |
| 6,825,895 B2 | 11/2004 | Nakano et al. |
| 6,846,082 B2 | 1/2005 | Glent-Madsen et al. |
| 6,847,424 B2 | 1/2005 | Gotoh et al. |
| 6,933,994 B1 | 8/2005 | Kaneko et al. |
| 6,964,226 B2 | 11/2005 | Weiss et al. |
| 7,004,610 B2 | 2/2006 | Yamashita et al. |
| 7,066,634 B2 | 6/2006 | Kitamura et al. |
| 7,108,414 B2 | 9/2006 | McCollum et al. |
| 7,121,711 B2 | 10/2006 | Yamamoto et al. |
| 7,190,425 B2 | 3/2007 | Hong |
| 7,237,396 B1 | 7/2007 | Nichol |
| 7,275,850 B2 | 10/2007 | Nesterenko |
| 7,343,060 B2 | 3/2008 | Ohtsu et al. |
| 7,384,173 B2 | 6/2008 | Whitney |
| 7,406,245 B2 | 7/2008 | Page et al. |
| 7,411,142 B2 | 8/2008 | Jung et al. |
| 7,413,336 B2 | 8/2008 | Freking et al. |
| 7,430,355 B2 | 9/2008 | Heikenfeld et al. |
| 7,452,120 B2 | 11/2008 | Lee et al. |
| 7,457,509 B2 | 11/2008 | Haenen et al. |
| 7,490,967 B2 | 2/2009 | Syribeys |
| 7,534,022 B2 | 5/2009 | Chou |
| 7,542,635 B2 | 6/2009 | Coleman |
| 7,565,054 B2 | 7/2009 | Rinko |
| 7,582,000 B2 | 9/2009 | Pendlebury et al. |
| 7,639,916 B2 | 12/2009 | Fine |
| 7,643,105 B2 | 1/2010 | Yang |
| 7,729,941 B2 | 6/2010 | Zampini, II et al. |
| 7,742,120 B2 | 6/2010 | Bayley et al. |
| 7,750,886 B2 | 7/2010 | Sampsell |
| 7,751,663 B2 | 7/2010 | Van Ostrand |
| 7,760,284 B2 | 7/2010 | Murase |
| 7,773,849 B2 | 8/2010 | Shani |
| 7,780,329 B2 | 8/2010 | McCollum et al. |
| 7,810,977 B2 | 10/2010 | Ueyama |
| 7,911,554 B2 | 3/2011 | Oohira |
| 8,013,831 B2 | 9/2011 | Sampsell |
| 8,098,347 B2 | 1/2012 | Brott et al. |
| 8,128,271 B2 | 3/2012 | Nichol |
| 8,164,703 B2 | 4/2012 | Cheng |
| 8,167,461 B2 | 5/2012 | Nichol |
| 8,231,256 B1 | 7/2012 | Coleman et al. |
| 8,434,909 B2 | 5/2013 | Nichol |
| 8,439,545 B2 | 5/2013 | Cheong et al. |
| 8,714,781 B2 | 5/2014 | Nichol |
| 8,750,671 B1 | 6/2014 | Kelly et al. |
| 8,761,565 B1 | 6/2014 | Coleman et al. |
| 8,764,262 B2 | 7/2014 | Nichol et al. |
| 8,794,809 B2 | 8/2014 | Lundin et al. |
| 8,905,610 B2 | 12/2014 | Coleman et al. |
| 8,917,962 B1 | 12/2014 | Nichol et al. |
| 8,950,902 B2 | 2/2015 | Nichol et al. |
| 9,028,123 B2 | 5/2015 | Nichol et al. |
| 9,103,956 B2 | 8/2015 | Nichol et al. |
| 9,110,200 B2 | 8/2015 | Nichol et al. |
| 9,287,336 B2 | 3/2016 | Lin et al. |
| 9,304,243 B2 | 4/2016 | Wolk et al. |
| 9,523,807 B2 | 12/2016 | Nichol et al. |
| 9,557,473 B2 | 1/2017 | Nichol et al. |
| 9,566,751 B1 | 2/2017 | Nichol et al. |
| 9,645,304 B2 | 5/2017 | Nichol et al. |
| 9,651,729 B2 | 5/2017 | Nichol et al. |
| 9,690,032 B1 | 6/2017 | Nichol et al. |
| 9,798,075 B2 | 10/2017 | Nichol et al. |
| 10,036,847 B2 | 7/2018 | Nichol et al. |
| 10,073,208 B2 | 9/2018 | Nichol et al. |
| 10,175,413 B2 | 1/2019 | Nichol et al. |
| 10,191,199 B2 | 1/2019 | Nichol et al. |
| 10,215,905 B2 | 2/2019 | Nichol et al. |
| 10,254,472 B2 | 4/2019 | Coleman et al. |
| 10,393,941 B2 | 8/2019 | Nichol et al. |
| 10,429,577 B2 | 10/2019 | Coleman et al. |
| 10,466,409 B2 | 11/2019 | Nichol et al. |
| 10,598,848 B2 | 3/2020 | Coleman et al. |
| 10,802,196 B2 | 10/2020 | Nichol et al. |
| 10,935,716 B2 | 3/2021 | Nichol et al. |
| 2001/0019379 A1 | 9/2001 | Ishihara et al. |
| 2001/0019380 A1 | 9/2001 | Ishihara |
| 2002/0015563 A1 | 2/2002 | Murakami |
| 2002/0028600 A1 | 3/2002 | Kondo |
| 2002/0047953 A1 | 4/2002 | Endo |
| 2002/0176035 A1 | 11/2002 | Yamazaki |
| 2003/0016930 A1 | 1/2003 | Inditsky |
| 2003/0174953 A1 | 9/2003 | Carnevale et al. |
| 2003/0198456 A1 | 10/2003 | Steiner |
| 2004/0008398 A1 | 1/2004 | Amundson |
| 2004/0093779 A1 | 5/2004 | Blach |
| 2004/0170373 A1 | 9/2004 | Kim |
| 2004/0228104 A1 | 11/2004 | Birman |
| 2004/0231481 A1 | 11/2004 | Floding et al. |
| 2005/0046921 A1 | 3/2005 | Govil et al. |
| 2005/0072032 A1 | 4/2005 | McCollum et al. |
| 2005/0088830 A1 | 4/2005 | Yumoto et al. |
| 2005/0091886 A1 | 5/2005 | Kim |
| 2005/0179850 A1 | 8/2005 | Du |
| 2005/0219148 A1 | 10/2005 | Bayley et al. |
| 2005/0264730 A1 | 12/2005 | Kataoka et al. |
| 2006/0007108 A1 | 1/2006 | Utsumi et al. |
| 2006/0008205 A1 | 1/2006 | Meir et al. |
| 2006/0008225 A1 | 1/2006 | Naitou et al. |
| 2006/0024017 A1 | 2/2006 | Page et al. |
| 2006/0061008 A1 | 3/2006 | Karner et al. |
| 2006/0105149 A1 | 5/2006 | Donahue |

(56) References Cited

U.S. PATENT DOCUMENTS

| | | |
|---|---|---|
| 2006/0114244 A1 | 6/2006 | Saxena et al. |
| 2006/0120106 A1 | 6/2006 | Kuki et al. |
| 2006/0120681 A1 | 6/2006 | Mune et al. |
| 2006/0207134 A1 | 9/2006 | Harry |
| 2006/0215958 A1 | 9/2006 | Yeo et al. |
| 2006/0269213 A1 | 11/2006 | Hwang |
| 2007/0002578 A1 | 1/2007 | Furusawa et al. |
| 2007/0014110 A1 | 1/2007 | Itaya |
| 2007/0025672 A1 | 2/2007 | Suzuki et al. |
| 2007/0031097 A1 | 2/2007 | Heikenfeld et al. |
| 2007/0081344 A1 | 4/2007 | Cappaert et al. |
| 2007/0081360 A1 | 4/2007 | Bailey et al. |
| 2007/0086712 A1 | 4/2007 | Shani |
| 2007/0116424 A1 | 5/2007 | Ting et al. |
| 2007/0133935 A1 | 6/2007 | Fine |
| 2007/0147023 A1 | 6/2007 | Matsushita |
| 2007/0153545 A1 | 7/2007 | Lee |
| 2007/0153548 A1 | 7/2007 | Hamada et al. |
| 2007/0171330 A1 | 7/2007 | Hung |
| 2007/0183730 A1 | 8/2007 | Morimoto et al. |
| 2007/0258267 A1 | 11/2007 | Huang et al. |
| 2007/0274091 A1 | 11/2007 | Inditsky |
| 2007/0279549 A1 | 12/2007 | Iwasaki |
| 2007/0280593 A1 | 12/2007 | Brychell et al. |
| 2007/0286562 A1 | 12/2007 | Inditsky |
| 2008/0007965 A1 | 1/2008 | Kanade et al. |
| 2008/0025039 A1 | 1/2008 | Guillermo |
| 2008/0031579 A1 | 2/2008 | Enami |
| 2008/0037284 A1 | 2/2008 | Rudisill |
| 2008/0043490 A1 | 2/2008 | Coleman et al. |
| 2008/0048366 A1 | 2/2008 | Durney |
| 2008/0075414 A1 | 3/2008 | Van Ostrand |
| 2008/0148753 A1 | 6/2008 | Welker et al. |
| 2008/0159693 A1 | 7/2008 | Chang |
| 2008/0266863 A1 | 10/2008 | Rinko |
| 2008/0285310 A1 | 11/2008 | Aylward et al. |
| 2009/0028038 A1 | 1/2009 | Harada |
| 2009/0034292 A1 | 2/2009 | Pokrovskiy et al. |
| 2009/0059618 A1 | 3/2009 | Onikiri et al. |
| 2009/0091836 A1 | 4/2009 | Mi et al. |
| 2009/0147535 A1 | 6/2009 | Mienko et al. |
| 2009/0172978 A1 | 7/2009 | Steenblick et al. |
| 2009/0173654 A1 | 7/2009 | Steenblick et al. |
| 2009/0190373 A1 | 7/2009 | Bita et al. |
| 2009/0207632 A1 | 8/2009 | McCollum et al. |
| 2009/0219734 A1 | 9/2009 | Sawada et al. |
| 2009/0257108 A1 | 10/2009 | Gruhlke et al. |
| 2009/0257215 A1 | 10/2009 | Gomi |
| 2010/0014311 A1 | 1/2010 | Danieli |
| 2010/0021109 A1 | 1/2010 | Ohtsu et al. |
| 2010/0021119 A1 | 1/2010 | Ohtsu et al. |
| 2010/0040986 A1 | 2/2010 | Yamaguchi |
| 2010/0053148 A1 | 3/2010 | Khazeni et al. |
| 2010/0067254 A1 | 3/2010 | Ohta |
| 2010/0074585 A1 | 3/2010 | Shimizu et al. |
| 2010/0092143 A1 | 4/2010 | Ushiwata et al. |
| 2010/0109173 A1 | 5/2010 | Yamamoto |
| 2010/0156953 A1 | 6/2010 | Nevitt |
| 2010/0212719 A1 | 8/2010 | Stolum |
| 2010/0214786 A1 | 8/2010 | Nichol |
| 2010/0246200 A1 | 9/2010 | Tessnow et al. |
| 2010/0258419 A1 | 10/2010 | Chung et al. |
| 2011/0032724 A1 | 2/2011 | Kinoshita |
| 2011/0085771 A1 | 4/2011 | Matsuyama et al. |
| 2011/0110638 A1 | 5/2011 | Shioda |
| 2011/0134623 A1 | 6/2011 | Sherman et al. |
| 2011/0164875 A1 | 7/2011 | Bicknell et al. |
| 2011/0176325 A1 | 7/2011 | Sherman et al. |
| 2011/0187964 A1 | 8/2011 | Li et al. |
| 2011/0227487 A1 | 9/2011 | Nichol et al. |
| 2011/0249425 A1 | 10/2011 | Aurongzeb et al. |
| 2011/0255303 A1 | 10/2011 | Nichol et al. |
| 2011/0273901 A1 | 11/2011 | Nichol et al. |
| 2011/0273906 A1 | 11/2011 | Nichol et al. |
| 2011/0277361 A1 | 11/2011 | Nichol et al. |
| 2011/0283576 A1 | 11/2011 | Nichol |
| 2011/0286234 A1 | 11/2011 | Nichol |
| 2012/0212414 A1 | 8/2012 | Osterhout et al. |
| 2012/0229531 A1 | 9/2012 | Yata et al. |
| 2012/0287674 A1 | 11/2012 | Nichol et al. |
| 2013/0038928 A1 | 2/2013 | Padiyath et al. |
| 2013/0155676 A1 | 6/2013 | Lee |
| 2013/0155723 A1 | 6/2013 | Coleman |
| 2013/0208508 A1 | 8/2013 | Nichol et al. |
| 2013/0250618 A1 | 9/2013 | Nichol et al. |
| 2013/0314942 A1 | 11/2013 | Nichol et al. |
| 2014/0049983 A1 | 2/2014 | Nichol et al. |
| 2014/0056028 A1 | 2/2014 | Nichol et al. |
| 2014/0063853 A1* | 3/2014 | Nichol ................ G02B 6/0028 362/616 |
| 2014/0340910 A1 | 11/2014 | Goldstein et al. |
| 2014/0360578 A1 | 12/2014 | Nichol et al. |
| 2015/0049285 A1 | 2/2015 | Qian et al. |
| 2015/0078033 A1 | 3/2015 | Lee et al. |
| 2015/0078035 A1 | 3/2015 | Nichol et al. |
| 2015/0219834 A1 | 8/2015 | Nichol et al. |
| 2015/0253487 A1 | 9/2015 | Nichol et al. |
| 2015/0354781 A1 | 12/2015 | Catalano |
| 2016/0218156 A1 | 7/2016 | Shedletsky et al. |
| 2017/0045669 A1 | 2/2017 | Nichol et al. |
| 2017/0205572 A1 | 7/2017 | Nichol et al. |
| 2017/0235036 A1 | 8/2017 | Nichol et al. |
| 2017/0285243 A1 | 10/2017 | Nichol et al. |
| 2018/0052274 A1 | 2/2018 | Nichol et al. |
| 2018/0059318 A1 | 3/2018 | Nichol et al. |
| 2018/0210131 A1 | 7/2018 | Nichol et al. |
| 2018/0348425 A1 | 12/2018 | Coleman et al. |
| 2019/0170925 A1 | 6/2019 | Nichol et al. |
| 2019/0170928 A1 | 6/2019 | Nichol et al. |
| 2019/0187360 A1 | 6/2019 | Nichol et al. |
| 2019/0235157 A1 | 8/2019 | Coleman et al. |
| 2021/0080638 A1 | 3/2021 | Nichol et al. |
| 2021/0181405 A1 | 6/2021 | Nichol et al. |
| 2021/0215857 A1 | 7/2021 | Nichol et al. |

FOREIGN PATENT DOCUMENTS

| | | |
|---|---|---|
| CN | 1985202 | 6/2007 |
| CN | 200962289 Y | 10/2007 |
| CN | 101140335 A | 3/2008 |
| DE | 2736486 A1 | 2/1978 |
| EP | 284098 A1 | 9/1988 |
| EP | 1760502 A1 | 3/2007 |
| EP | 2103972 A1 | 9/2009 |
| GB | 198085 | 5/1923 |
| GB | 662514 | 12/1951 |
| JP | 61-278416 A | 12/1987 |
| JP | 10-197865 A | 7/1998 |
| JP | S63301909 A | 12/1998 |
| JP | 11-264974 A | 9/1999 |
| JP | 2000-056138 A | 2/2000 |
| JP | 2000141997 A | 5/2000 |
| JP | 2000147218 A | 5/2000 |
| JP | 2000-258633 | 9/2000 |
| JP | 2001243818 | 9/2001 |
| JP | 2001266626 A | 9/2001 |
| JP | 2001305540 A | 10/2001 |
| JP | 2001-312233 A | 11/2001 |
| JP | 2002277661 A | 9/2002 |
| JP | 2004069729 A | 3/2004 |
| JP | 2004109426 A | 4/2004 |
| JP | 2004-170972 A | 6/2004 |
| JP | 2004199967 A | 7/2004 |
| JP | 2004-288570 A | 10/2004 |
| JP | 2005043766 A | 2/2005 |
| JP | 2005340160 A | 8/2005 |
| JP | 2006-003431 A | 1/2006 |
| JP | 2006-024561 | 1/2006 |
| JP | 2006310112 A | 11/2006 |
| JP | 2007053054 A | 3/2007 |
| JP | 2007-535790 A | 12/2007 |
| JP | 2008-198615 A | 8/2008 |
| KR | 20060057583 A | 5/2006 |
| WO | 1996011358 | 4/1996 |

(56) References Cited

FOREIGN PATENT DOCUMENTS

| WO | 2004027314 A1 | 4/2004 |
|---|---|---|
| WO | 2006131924 A2 | 12/2006 |
| WO | 2007081862 A2 | 7/2007 |
| WO | 2007123180 A1 | 11/2007 |
| WO | 2007143383 A2 | 12/2007 |
| WO | 2009048863 A1 | 4/2009 |
| WO | 2009084176 A1 | 7/2009 |
| WO | 2009084556 A1 | 7/2009 |
| WO | 2010005655 A2 | 1/2010 |
| WO | 2010085787 A1 | 7/2010 |
| WO | 2011130715 A2 | 10/2011 |
| WO | 2011130718 A2 | 10/2011 |
| WO | 2011130720 A2 | 10/2011 |
| WO | 2012016047 A1 | 2/2012 |
| WO | 2012068543 A1 | 5/2012 |
| WO | 2012088315 A1 | 6/2012 |
| WO | 2012122511 A1 | 9/2012 |
| WO | 2012158460 A1 | 11/2012 |
| WO | 2019090139 A1 | 5/2019 |
| WO | 2020047340 A1 | 3/2020 |
| WO | 2020123539 A1 | 6/2020 |
| WO | 2020142731 A1 | 7/2020 |
| WO | 2020146668 A1 | 7/2020 |
| WO | 2021022307 A1 | 2/2021 |

OTHER PUBLICATIONS

Lee et al., "LED Light Coupler Design for a Ultra Thin Light Guide," Journal of the Optical Society of Korea, vol. 11, No. 3, Sep. 2007, pp. 113-117.
Chien et al., "The study of LED uniform lightguide for liquid crystal display backlight applications," Tatung University white paper, Taipei, Taiwan, 2008.
Siitonen et al., "Coupling of light from an LED into a thin light guide by diffractive gratings," Applied Optics, vol. 43, No. 30, Oct. 2004, 5631-5636.
Murata et al., "Input couplers for thin light-guides and light-emitting diodes," Optical Engineering 47(2), Feb. 2008, 027001-027007.
Kim, Joon-Sung, et al. "Stacked Polymeric Multimode Waveguide Arrays for Two-Dimensional Optical Interconnects", Journal of Lightwave Technology, p. 840, Mar. 2004.
Luminus Devices PhlatLight Data Sheet, PDS-001022 Rev 05, 2009.
International Search Report for International Application No. PCT/US08/79041, dated Jan. 8, 2009.
Cardinal Intellectual Property's search report (Work order 5874.5) including the results of a search for the features of the claims included in the U.S. patent application entitled "Light Coupling Into Films ", inventor: Anthony Nichol, and having assigned U.S. Appl. No. 13/206,210. The foregoing U.S. patent application is a continuation of U.S. Appl. No. 12/682,387.
Cardinal Intellectual Property's supplemental search report dated Nov. 7, 2011 (Work Order 5874.6) including the results of a search for the features of the claims included in the U.S. patent application entitled "Method of Manufacturing a Light Emitting Device", inventor: Anthony Nichol, and having assigned U.S. Appl. No. 13/210,622. The foregoing U.S. patent application is a continuation of U.S. Appl. No. 12/682,387.
International Search Report for International Application No. PCT/US11/032797 dated Nov. 7, 2011.
Written Opinion of the International Searching Authority for International Application No. PCT/US11/032797 dated Nov. 7, 2011.
International Search Report for International Application No. PCT/US11/032795 dated Nov. 16, 2011.
Written Opinion of the International Searching Authority for International Application No. PCT/US11/032795 dated Nov. 16, 2011.
International Search Report for International Application No. PCT/US11/032792 dated Nov. 17, 2011.
Written Opinion of the International Searching Authority for International Application No. PCT/US11/032792 dated Nov. 17, 2011.
Written Opinion of the International Searching Authority for International Application No. PCT/US08/079041 dated Jan. 8, 2009.
International Search Report for International Application No. PCT/US10/22066 dated Mar. 22, 2010.
Written Opinion of the International Searching Authority for International Application No. PCT/US10/22066 dated Mar. 22, 2010.
International Search Report for International Application No. PCT/US11/045730 dated Dec. 23, 2011.
Written Opinion of the International Searching Authority for International Application No. PCT/US11/045730 dated Dec. 23, 2011.
International Search Report for International Application No. PCT/US11/61528 dated Mar. 26, 2012.
Written Opinion of the International Searching Authority for International Application No. PCT/US11/61528 dated Mar. 26, 2012.
International Search Report for International Application No. PCT/US11/066596 dated May 7, 2012.
Written Opinion of the International Searching Authority for International Application No. PCT/US11/066596 dated May 7, 2012.
Cardinal Intellectual Property's supplemental search report dated Nov. 7, 2011 (Work Order 5874.6) including the results of a search for the features of the claims included in the U.S. patent application entitled "Method of Manufacturing a Light Emitting Device,"inventor: Anthony Nichol. The foregoing U.S. Patent application is a continuation of U.S. Appl. No. 12/682,387.
International Search Report and Written Opinion for International Application No. PCT/US2012/028578 dated Jun. 28, 2012.
Office action dated Nov. 19, 2013 by the China Patent Office for application No. 201180027447.2.
European Search Report and written opinion for European Application No. EP08838526 dated Sep. 19, 2012.
Office action dated Sep. 10, 2012 by the State Intellectual Property Office of China for application No. CN201080005385.0.
International Search Report and Written opinion for International Application No. PCT/US2012/37317 dated Aug. 22, 2012.
Office action dated Dec. 3, 2013 by Japan Patent Office for application No. 2010-528972.
Office action dated Mar. 5, 2013 by the Japan Patent Office for application No. 2010-528972.
Office action dated May 15, 2012 by the USPTO for U.S. Appl. No. 12/682,387.
Office action dated Dec. 23, 2011by the USPTO for U.S. Appl. No. 12/682,387.
Office action dated Jul. 23, 2012 by IP Australia for application No. 2010206525.
Office action dated Nov. 22, 2012 by Institute Mexicano de la Propiedad Industrial for application MX/a/2011/007770.
Office action dated Dec. 6, 2012 by the USPTO for U.S. Appl. No. 13/088,231.
Notice of allowance dated Jan. 7, 2013 by the USPTO for U.S. Appl. No. 13/089,311.
Buchner, Diplomarbeit: Kinetmatics of 3D Folded Structures for Nanostructured Origami, Department of Mechanical Engineering, 3D optical Systems Group, Massachusetts Institute of Technology, 2003.
Nichol, A.J.; Barbastathis, G., "Sub-30nm alignment accuracy between layered photonic nanostructures using optimized V nanomagnet arrays," Optical MEMs and Nanophotonics, 2008 IEEE/LEOS Internationall Conference on , vol., No., pp. 9, 10, Aug. 11-14, 2008.
Arora et al., "Membrane folding to achieve three-dimensional nanostructures: Nanopatterned silicon nitride folded with stressed chromium hinges," Appl. Phys. Lett. 88, 053108 (Jan. 2006).
"Nanostructured Origami Folding of Patternable Resist for 3D Lithography""Se Young Yang, Hyung-ryul Johnny Choi, Martin Deterre, George Barbastathis,""IEEE 2010 International Conference on Optical MEMS & Nanophotonics, p. 37-38, Aug. 2010".
Notice of allowance dated Jul. 29, 2013 by the China Patent Office for application No. 201080005385.0.
Office action dated Jun. 20, 2013 by Institute Mexicano de la Propiedad Industrial for application MX/a/2012/012033.
Office action dated Jun. 26, 2013 by Institute Mexicano de la Propiedad Industrial for application MX/a/2012/012034.

(56) References Cited

OTHER PUBLICATIONS

Office action dated Jun. 26, 2013 by Institute Mexicano de la Propiedad Industrial for application MX/a/2012/012035.
Office action dated Oct. 15, 2013 by the China Patent Office for application No. 201180027439.8.
International Search Report and Written Opinion for International Application No. PCT/US2019/48943 dated Nov. 29, 2019.
International Search Report and Written Opinion for International Application No. PCT/US2019/065525 dated Feb. 21, 2020.
International Search Report and Written Opinion for International Application No. PCT/US2020/012245 dated Mar. 24, 2020.
International Search Report and Written Opinion for International Application No. PCT/US2020/012977 dated Mar. 20, 2020.
International Search Report and Written Opinion for International Application No. PCT/US2020/070341 dated Oct. 9, 2020.

* cited by examiner

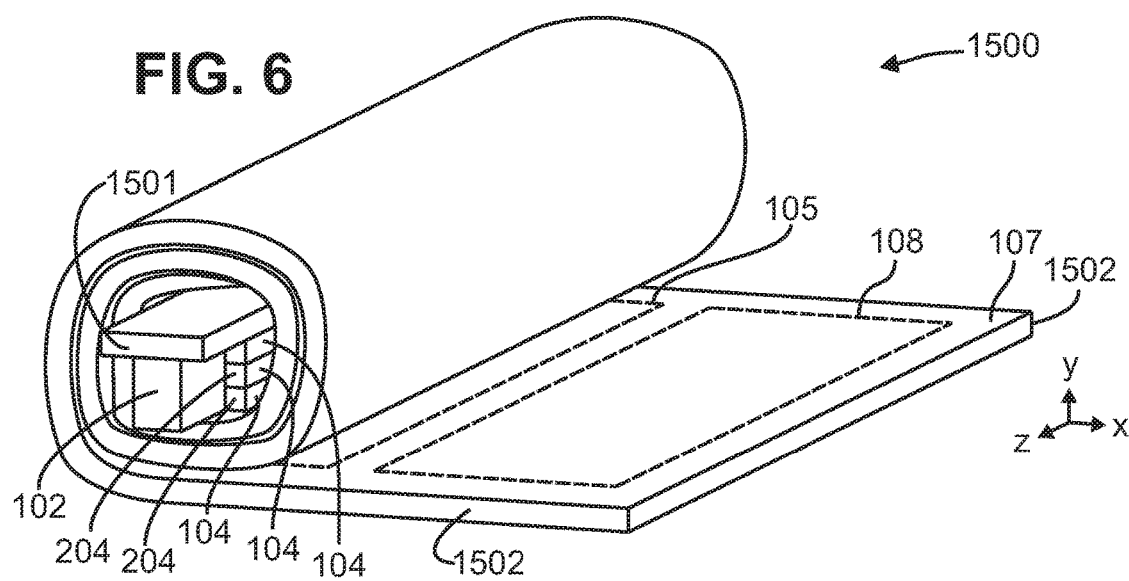
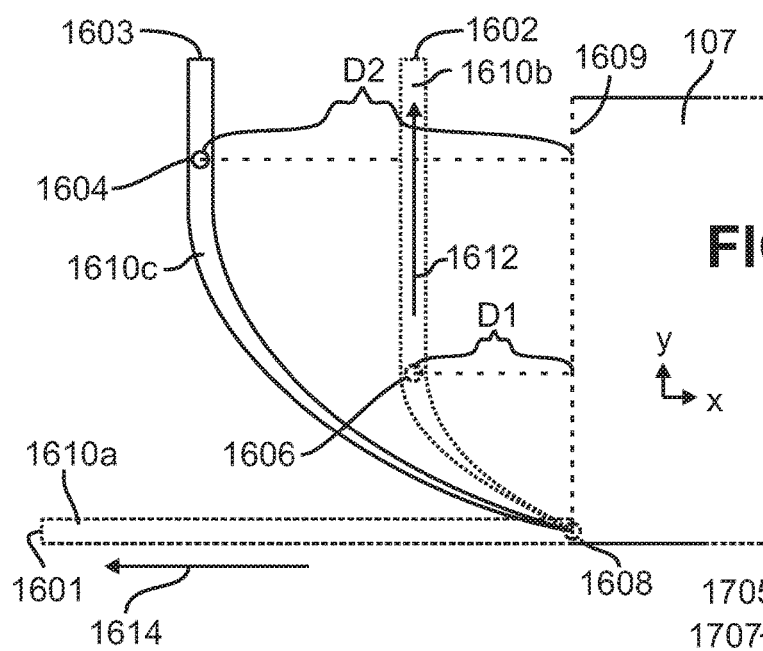
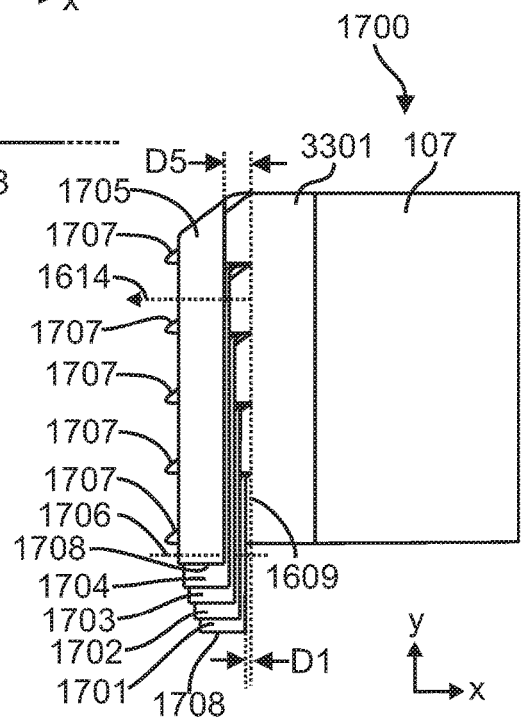

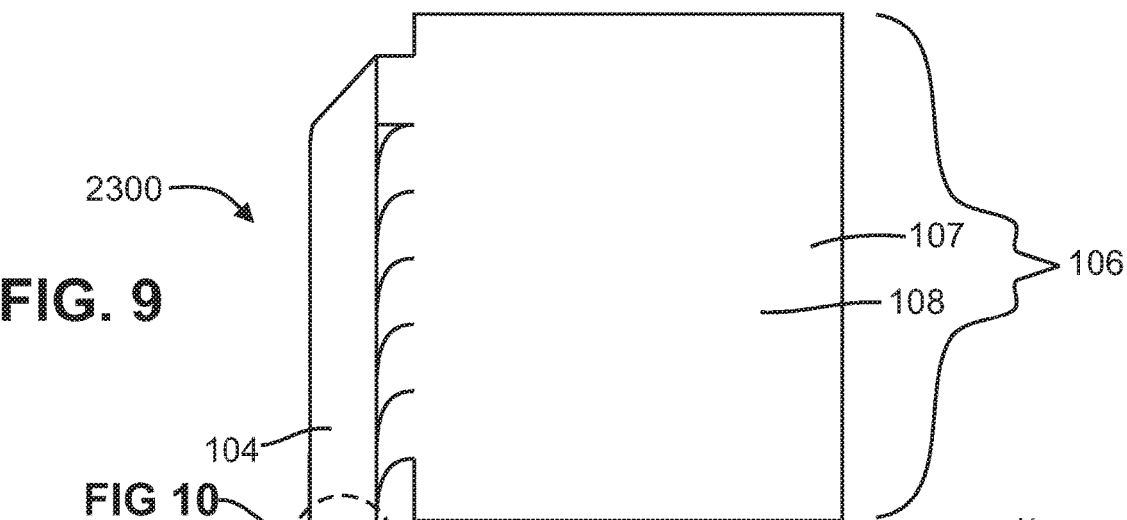
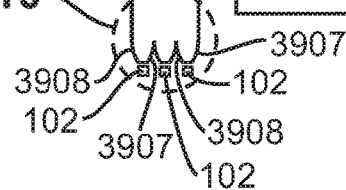
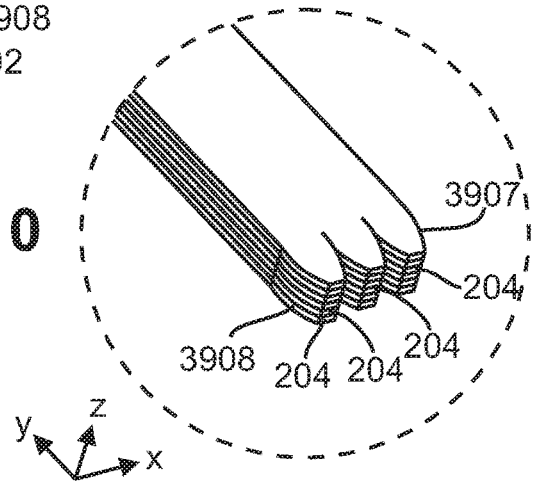
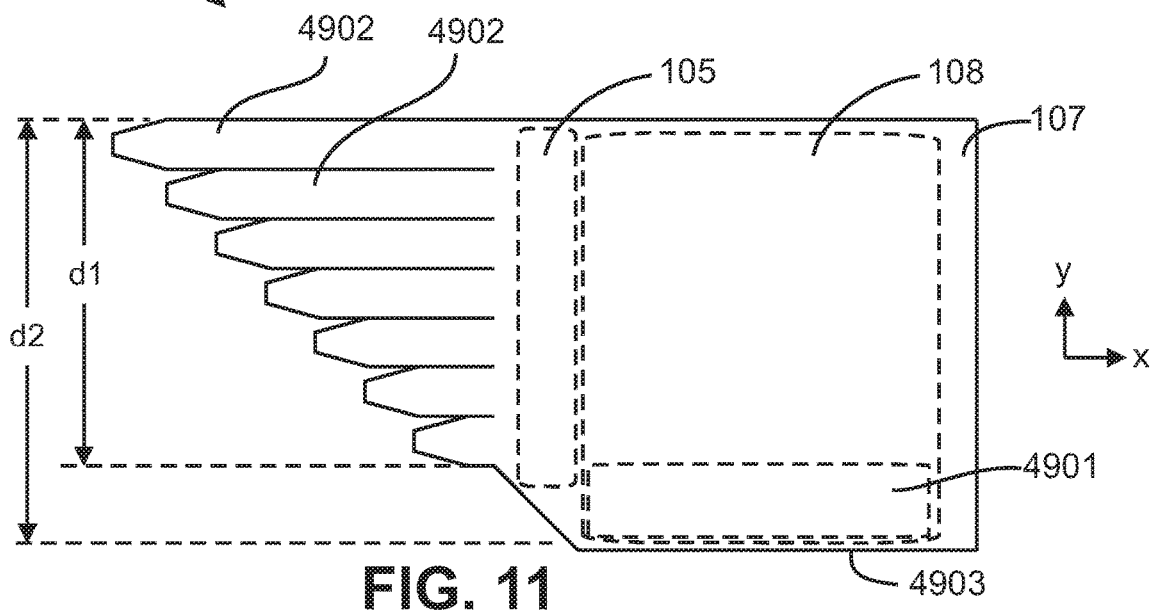

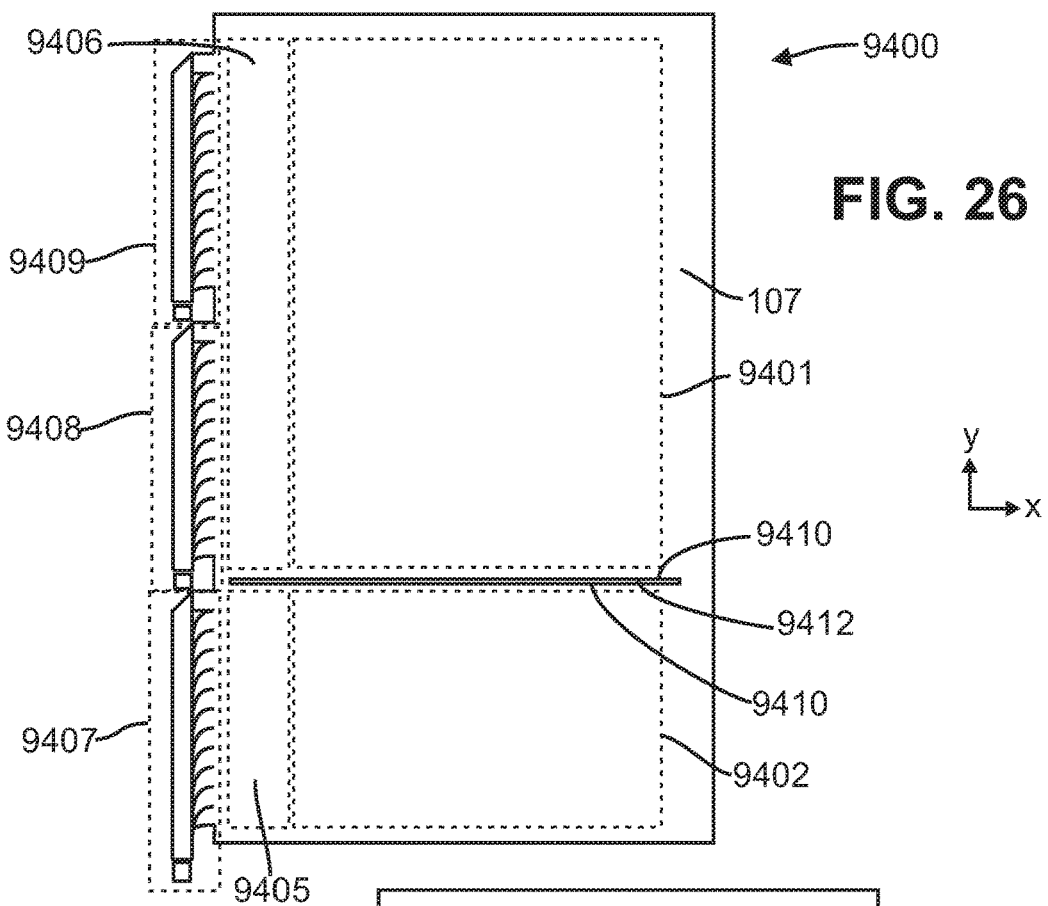
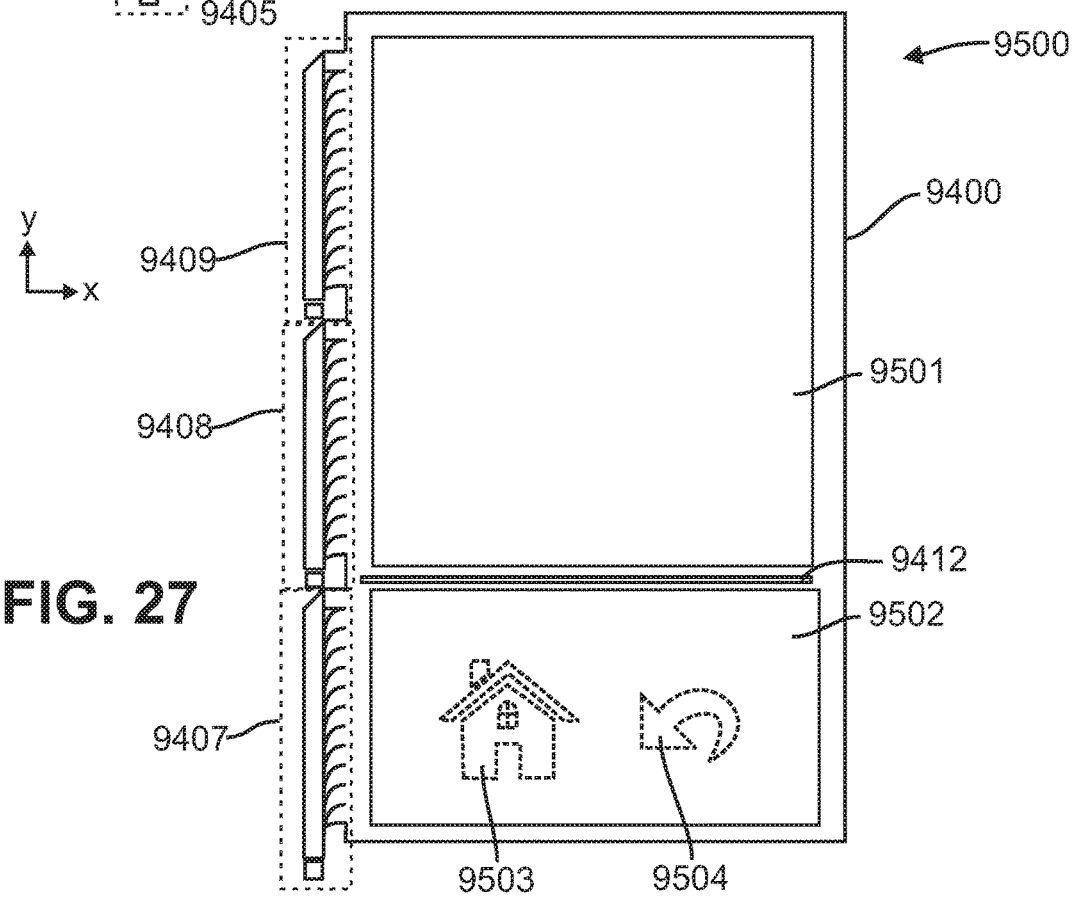

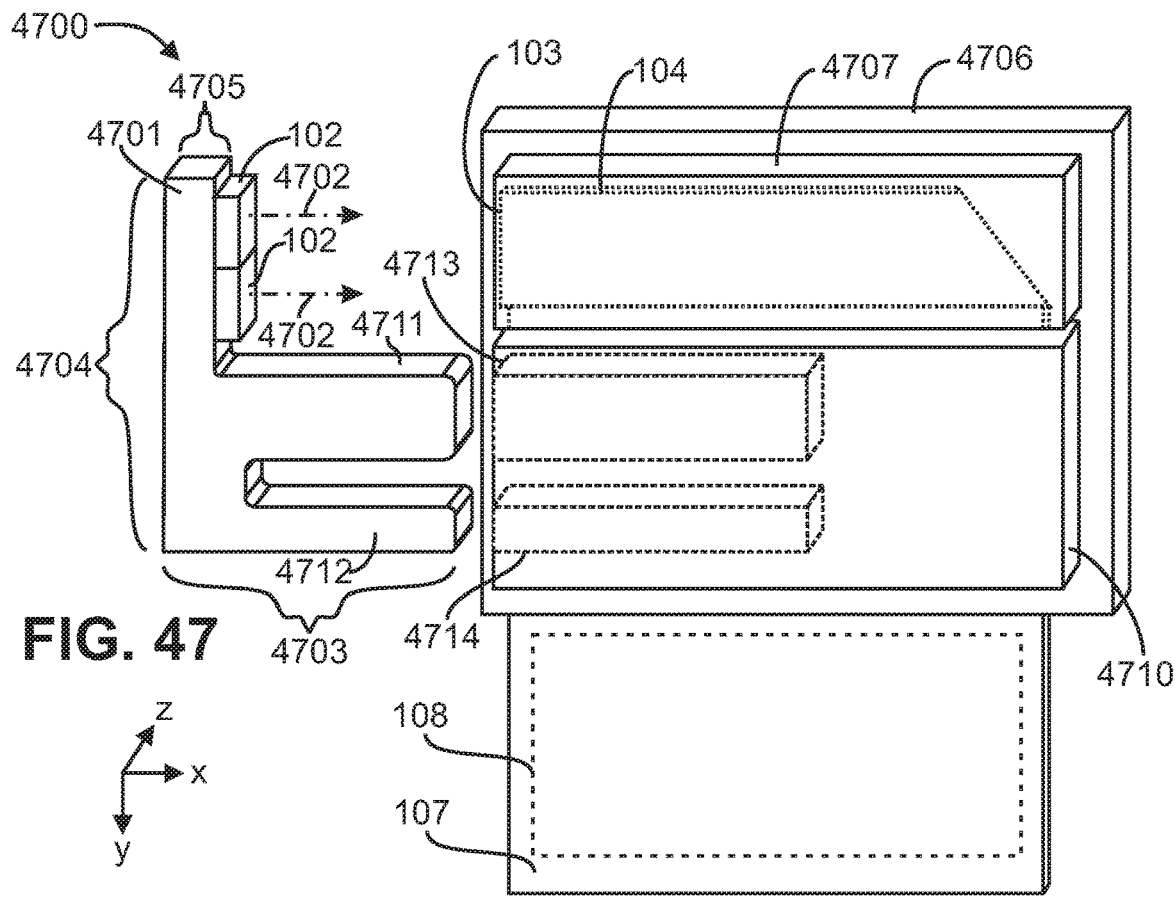
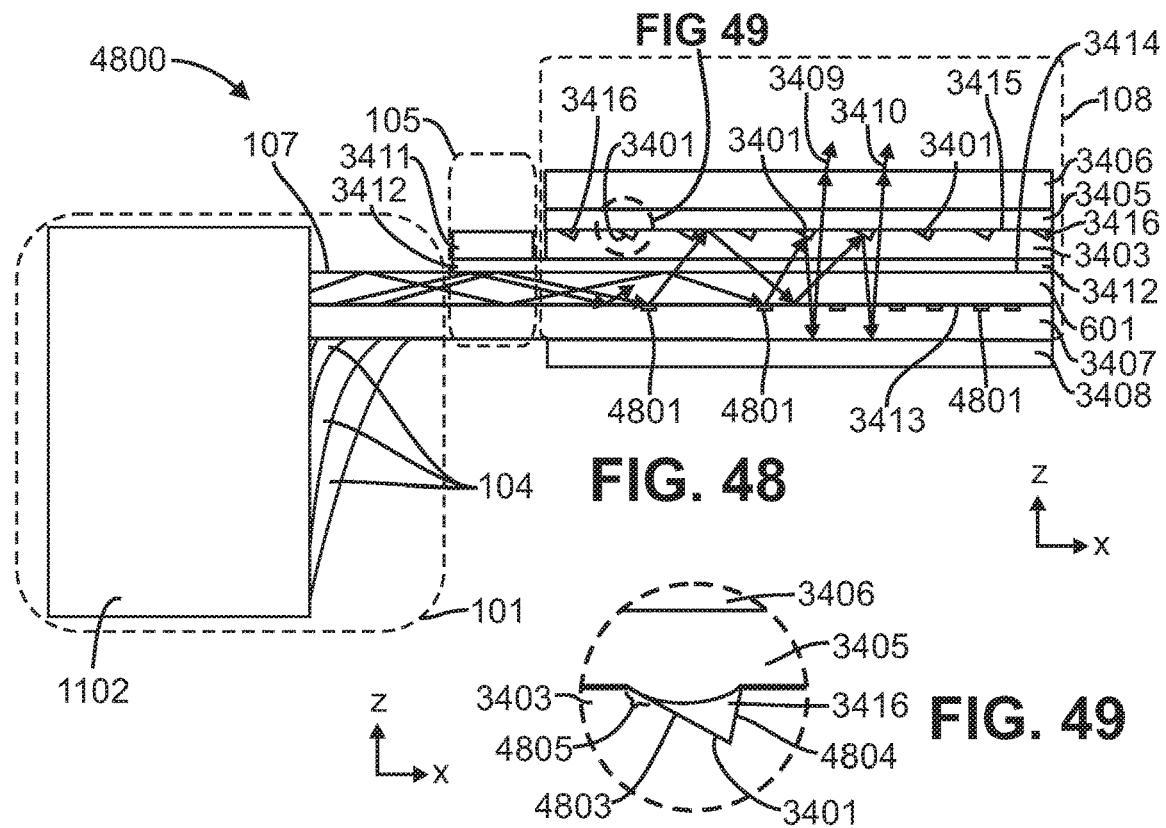

LIGHTGUIDE WITH A LIGHT INPUT EDGE BETWEEN LATERAL EDGES OF A FOLDED STRIP

CROSS-REFERENCE TO RELATED APPLICATIONS

This application is the 35 U.S.C. § 371 national stage application of PCT Application No. PCT/US2020/070341 filed Jul. 31, 2020, where the PCT claims priority to, and the benefit of, U.S. provisional application entitled "Film-based lightguide including folded coupling lightguides with a reduced width, offset light input edge" having Ser. No. 62/881,792, filed Aug. 1, 2019, both of which are herein incorporated by reference in their entireties.

TECHNICAL FIELD

The subject matter disclosed herein generally relates to lightguides, films, and light emitting devices such as, without limitation, light fixtures, backlights, frontlights, light emitting signs, passive displays, and active displays and their components and methods of manufacture.

BACKGROUND

Light emitting devices are needed that have a very thin form factor that can generate light with specific angular light output profiles. Conventionally, in order to reduce the thickness of displays and backlights, edge-lit configurations using rigid lightguides have been used to receive light from the edge of and direct light out of a larger area surface. These types of light emitting devices are typically housed in relatively thick, rigid frames that do not allow for component or device flexibility and require long lead times for design changes. The volume of these devices remains large and often includes thick or large frames or bezels around the device. The thick lightguides (typically 2 millimeters (mm) and larger) limit the design configurations, production methods, and illumination modes. The ability to further reduce the thickness and overall volume of these area light emitting devices has been limited by the ability to couple sufficient light flux into a thinner lightguide.

SUMMARY

In one embodiment, a lightguide formed from a film comprises a light mixing region between a light emitting region and an array of coupling lightguides. The first coupling lightguide of the array of coupling lightguides comprises a first light input edge between an inner lateral edge of the first coupling lightguide and an outer lateral edge of the first coupling lightguide opposite the inner lateral edge, wherein a width of the first light input edge is less than a width of the first coupling lightguide at the light mixing region and the first coupling lightguide is folded toward the outer lateral edge such that the first light input edge is between the outer lateral edge and the inner lateral edge along the array direction. In one embodiment, the first light input edge is offset from the outer lateral edge and positioned above the first coupling lightguide. In some embodiments, the coupling lightguides comprise reduced width, offset light input edges.

In one embodiment, a lightguide comprises a film having opposing surfaces with a thickness in a thickness direction not greater than 0.5 millimeters therebetween; a light mixing region of the film between a light emitting region of the film comprising light extraction features and an array of coupling lightguides, the array of coupling lightguides in a form of strips of the film extending from the light mixing region in an extended direction and arrayed in an array direction, with each coupling lightguide of the array of coupling lightguides terminating in a light input edge and folded such that the array of coupling lightguides are stacked to form a light input surface defined by the light input edges of the array of coupling lightguides and the array of coupling lightguides are flat at the light input surface. A first coupling lightguide of the array of coupling lightguides may be positioned first in the array of coupling lightguides along a side of the film, the first coupling lightguide comprising a first light input edge between an inner lateral edge of the first coupling lightguide and an outer lateral edge of the first coupling lightguide opposite the inner lateral edge, wherein a width of the first light input edge is less than a width of the first coupling lightguide at the light mixing region and the first coupling lightguide is folded toward the outer lateral edge of the first coupling lightguide at an angled fold such that the first light input edge is between the outer lateral edge and the inner lateral edge of the first coupling lightguide along the array direction. The first light input edge may be offset from the outer lateral edge in the array direction when the first coupling lightguide is folded, and the width of the light input edge is less than 70% of the width of the first coupling lightguide at the light mixing region. The light input surface may be between the outer lateral edge and the inner lateral edge of the first coupling lightguide along the array direction when the first coupling lightguide is folded. The light input surface may be offset from the outer lateral edge in the array direction when the first coupling lightguide is folded. The first light input edge may be offset from a center of the first coupling lightguide at the light mixing region in the array direction when the first coupling lightguide is un-folded. The first coupling lightguide may comprise a curved lateral edge region and/or a tapered lateral edge region defined by a first lateral edge and/or a second lateral edge curved and/or tapered, respectively, toward the first light input edge. The first coupling lightguide may comprise a curved region curved in a plane comprising the thickness direction of the film when the first coupling lightguide is folded, and the first light input edge may be positioned outside of the curved region of the first coupling lightguide. The curved region may comprise a portion of the first lateral edge. The first light input edge may be positioned in a first planar region of the first coupling lightguide defined between the inner lateral edge and a first line that is a first curved extension length from the angled fold in the extended direction when unfolded, wherein the first curved extension length, c, is defined by an equation $$c = \frac{\pi R}{2\cos\theta}$$

where R is a radius of curvature of the first coupling lightguide when folded and θ is an angle of the fold relative to the extended direction. The first light input edge may be offset from the outer lateral edge in the array direction and may be positioned above the first coupling lightguide in the thickness direction when the first coupling lightguide is folded. The first coupling lightguide may be folded 90 degrees such that the angled fold has a fold angle of 45 degrees from the extended direction. The first light input edge may be offset from the outer lateral edge in the array direction when the first coupling lightguide is folded. The curved lateral edge region and/or the tapered lateral region may extend through the angled fold. The first light input edge may offset from a center of the first coupling lightguide at the light mixing region in the array direction when the first coupling lightguide is un-folded. The first light input edge may be positioned outside of the curved region of the first coupling lightguide, and the first light input edge and the light input surface may be between the outer lateral edge and the inner lateral edge of the first coupling lightguide along the array direction.

BRIEF DESCRIPTION OF THE DRAWINGS

FIG. 6 is a perspective view of one embodiment of a light emitting device with a light mixing region wrapped around a relative position maintaining element and a stack of coupling lightguides.

FIG. 7 is a top view of one embodiment of a coupling lightguide in three different positions.

FIG. 8 is a top view of one embodiment of a light input coupler including a film-based lightguide with staggered coupling lightguides.

FIG. 9 is a top view of one embodiment of a light emitting device including coupling lightguides with a plurality of first reflective surface edges and a plurality of second reflective surface edges within each coupling lightguide.

FIG. 10 is an enlarged perspective view of the input end of the coupling lightguides of FIG. 9.

FIG. 11 is a top view of one embodiment of a film-based lightguide including an array of tapered coupling lightguides.

FIG. 26 is a top view of one embodiment of a light emitting device including a first light input coupler coupling light into a sub-display light emitting region of the film-based lightguide and a second light input coupler and third light input coupler coupling light into a main display light emitting region of the film-based lightguide.

FIG. 27 is a top view of one embodiment of a light emitting device including a main display and a sub-display illuminated by the light emitting device of FIG. 26.

FIG. 47 is a perspective view of a light emitting device comprising a film-based lightguide and thermal transfer element comprising extensions.

FIG. 48 is a cross-sectional side view of one embodiment of a light emitting device comprising a third pressure sensitive adhesive layer positioned over light turning features of a light turning film.

FIG. 49 is a close-up view of a light turning feature of the light emitting device of FIG. 48.

DETAILED DESCRIPTION

Figure 1:
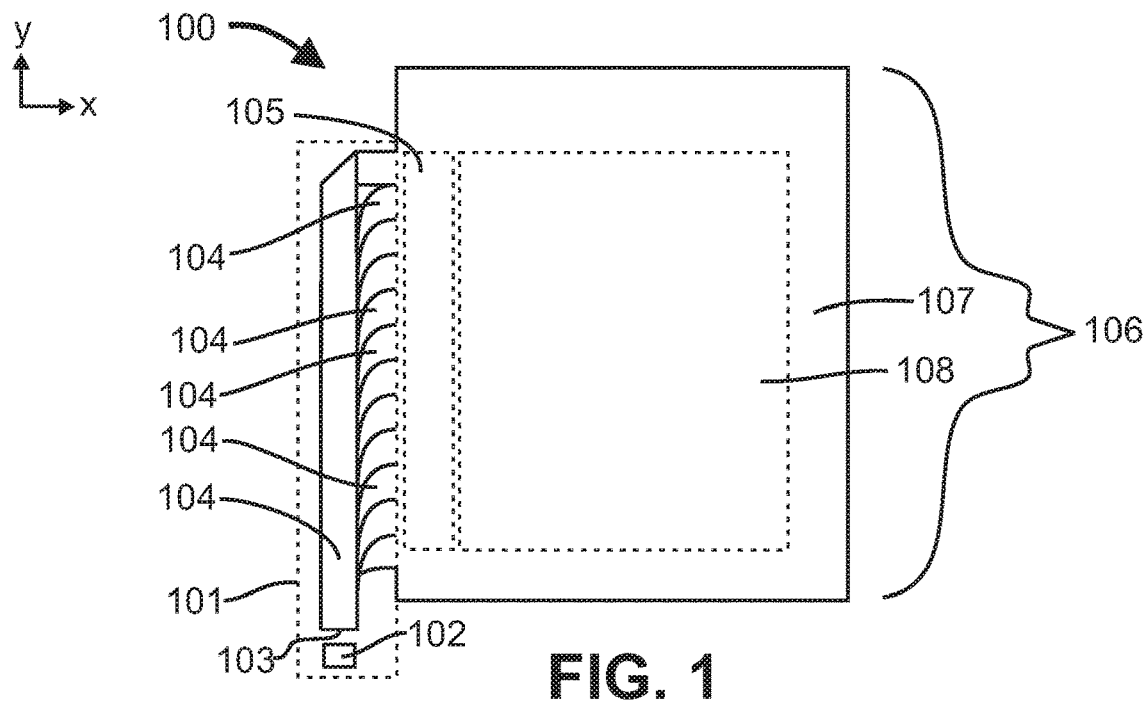
FIG. 1 is a top view of one embodiment of a light emitting device including a light input coupler disposed on one side of a lightguide.

The features and other details of several embodiments will now be more particularly described. It will be understood that particular embodiments described herein are shown by way of illustration and not as limitations. The principal features can be employed in various embodiments without departing from the scope of any particular embodiment. All parts and percentages are by weight unless otherwise specified.

Definitions

"Optically coupled" as defined herein refers to coupling of two or more regions or layers such that the luminance of light passing from one region to the other is not substantially reduced by Fresnel interfacial reflection losses due to differences in refractive indices between the regions. "Optical coupling" methods include methods of coupling wherein the two regions coupled together have similar refractive indices or using an optical adhesive with a refractive index substantially near or between the refractive index of the regions or layers. Examples of "optical coupling" include, without limitation, lamination using an index-matched optical adhesive, coating a region or layer onto another region or layer, or hot lamination using applied pressure to join two or more layers or regions that have substantially close refractive indices. Thermal transferring is another method that can be used to optically couple two regions of material. Forming, altering, printing, or applying a material on the surface of another material are other examples of optically coupling two materials. "Optically coupled" also includes forming, adding, or removing regions, features, or materials of a first refractive index within a volume of a material of a second refractive index such that light propagates from the first material to the second material. For example, a white light scattering ink (such as titanium dioxide in a methacrylate, vinyl, or polyurethane based binder) may be optically coupled to a surface of a polycarbonate or silicone film by inkjet printing the ink onto the surface. Similarly, a light scattering material such as titanium dioxide in a solvent applied to a surface may allow the light scattering material to penetrate or adhere in close physical contact with the surface of a polycarbonate or silicone film such that it is optically coupled to the film surface or volume.

"Lightguide" or "waveguide" refers to a region bounded by the condition that light rays propagating at an angle that is larger than the critical angle will reflect and remain within the region. In a lightguide, the light will reflect or TIR (totally internally reflect) if the angle ($\alpha$) satisfies the condition $\alpha > \sin^{-1}(n_2/n_1)$, where $n_1$ is the refractive index of the medium inside the lightguide and $n_2$ is the refractive index of the medium outside the lightguide. Typically, $n_2$ is air with a refractive index of $n \approx 1$; however, high and low refractive index materials can be used to achieve lightguide regions. A lightguide does not need to be optically coupled to all of its components to be considered as a lightguide. Light may enter from any surface (or interfacial refractive index boundary) of the waveguide region and may totally internally reflect from the same or another refractive index interfacial boundary. A region can be functional as a waveguide or lightguide for purposes illustrated herein as long as the thickness is larger than the wavelength of light of interest. For example, a lightguide may be a 5-micron region or layer of a film or it may be a 3-millimeter sheet including a light transmitting polymer.

"In contact" and "disposed on" are used generally to describe that two items are adjacent one another such that the whole item can function as desired. This may mean that additional materials can be present between the adjacent items, as long as the item can function as desired.

A "film" as used herein refers to a thin extended region, membrane, or layer of material.

A "bend" as used herein refers to a deformation or transformation in shape by the movement of a first region of an element relative to a second region, for example. Examples of bends include the bending of a clothes rod when heavy clothes are hung on the rod or rolling up a paper document to fit it into a cylindrical mailing tube. A "fold" as used herein is a type of bend and refers to the bend or lay of one region of an element onto a second region such that the first region covers at least a portion of the second region. An example of a fold includes bending a letter and forming creases to place it in an envelope. A fold does not require that all regions of the element overlap.

A bend or fold may be a change in the direction along a first direction along a surface of the object. A fold or bend may or may not have creases and the bend or fold may occur in one or more directions or planes such as 90 degrees or 45 degrees. A bend or fold may be lateral, vertical, torsional, or a combination thereof.

Light Emitting Device

In one embodiment, a light emitting device includes a first light source, a light input coupler, a light mixing region, and a lightguide including a light emitting region with a light extraction feature. In one embodiment, the first light source has a first light source emitting surface, the light input coupler includes an input surface disposed to receive light from the first light source and transmit the light through the light input coupler by total internal reflection through a plurality of coupling lightguides. In this embodiment, light exiting the coupling lightguides is re-combined and mixed in a light mixing region and directed through total internal reflection within a lightguide or lightguide region. Within the lightguide, a portion of incident light is directed within the light extracting region by light extracting features into a condition whereupon the angle of light is less than the critical angle for the lightguide and the directed light exits the lightguide through the lightguide light emitting surface.

In a further embodiment, the lightguide is a film with light extracting features below a light emitting device output surface within the film. The film is separated into coupling lightguide strips which are folded such that the coupling lightguide strips form a light input coupler with a first input surface formed by the collection of edges of the coupling lightguide strips.

Light Input Coupler

In one embodiment, a light input coupler includes a plurality of coupling lightguides disposed to receive light emitting from a light source and channel the light into a lightguide. In one embodiment, the plurality of coupling lightguides are strips cut from a lightguide film such that each coupling lightguide strip remains un-cut on at least one edge but can be rotated or positioned (or translated) substantially independently from the lightguide to couple light through at least one edge or surface of the strip. In another embodiment, the plurality of coupling lightguides are not cut from the lightguide film and are separately optically coupled to the light source and the lightguide. In another embodiment, the light emitting device includes a light input coupler having a core region of a core material and a cladding region or cladding layer of a cladding material on at least one surface or edge of the core material with a refractive index less than a refractive index of the core material. In other embodiment, the light input coupler includes a plurality of coupling lightguides wherein a portion of light from a light source incident on a surface of at least one strip is directed into the lightguide such that light travels in a waveguide condition. The light input coupler may also include one or more of the following: a strip folding device, a strip holding element, and an input surface optical element.

In one embodiment, a first array of light input couplers is positioned to input light into the light mixing region, light emitting region, or lightguide region and a separation distance between the light input couplers varies. In one embodiment, a light emitting device includes at least three light input couplers disposed along a side of a film having a separation distance between a first pair of input couplers along the side of the film different than a separation distance between a second pair of input couplers along the side of the film. For example, in one embodiment a separation distance between the first pair of input couplers along the side of the film is great than a separation distance between a second pair of input couplers along the side of the film.

Light Source

In one embodiment, a light emitting device includes at least one light source selected from a group: fluorescent lamp, cylindrical cold-cathode fluorescent lamp, flat fluorescent lamp, light emitting diode, organic light emitting diode, field emissive lamp, gas discharge lamp, neon lamp, filament lamp, incandescent lamp, electroluminescent lamp, radiofluorescent lamp, halogen lamp, incandescent lamp, mercury vapor lamp, sodium vapor lamp, high pressure sodium lamp, metal halide lamp, tungsten lamp, carbon arc lamp, electroluminescent lamp, laser, photonic bandgap based light source, quantum dot based light source, high efficiency plasma light source, microplasma lamp. The light emitting device may include a plurality of light sources arranged in an array, on opposite sides of lightguide, on orthogonal sides of a lightguide, on 3 or more sides of a lightguide, or on 4 sides of a substantially planer lightguide. The array of light sources may be a linear array with discrete LED packages includes at least one LED die. In one embodiment a light emitting device includes at least one narrowband light source with a peak wavelength within a range selected from the group: 300 nm-350 nm, 350 nm-400 nm, 400 nm-450 nm, 450 nm-500 nm, 500 nm-550 nm, 550 nm-600 nm, 600 nm-650 nm, 650 nm-700 nm, 700 nm-750 nm, 750 nm-800 nm, and 800 nm-1200 nm. In another embodiment, at least two light sources with different colors are disposed to couple light into the lightguide through at least one light input coupler. In another embodiment, a light emitting device includes at least three light input couplers, at least three light sources with different colors (red, green, and blue for example) and at least three lightguides. In another embodiment, a light source further includes at least one selected from the group: reflective optic, reflector, reflector cup, collimator, primary optic, secondary optic, collimating lens, compound parabolic collimator, lens, reflective region, and input coupling optic. The light source may also include an optical path folding optic such as a curved reflector that can enable the light source (and possibly heat-sink) to be oriented along a different edge of the light emitting device. The light source may also include a photonic bandgap structure, nanostructure or other three-dimensional arrangement that provides light output with an angular FWHM less than one selected from the group: 120 degrees, 100 degrees, 80 degrees, 60 degrees, 40 degrees, and 20 degrees.

LED Array

In one embodiment, the light emitting device includes a plurality of LEDs or LED packages wherein the plurality of LEDs or LED packages includes an array of LEDs. The array components (LEDs or electrical components) may be physically (and/or electrically) coupled to a single circuit board or they may be coupled to a plurality of circuit boards that may or may not be directly physically coupled (i.e. such as not on the same circuit board). In one embodiment, the array of LEDs is an array including at least two selected from the group: red, green, blue, and white LEDs. In this embodiment, the variation in the white point due to manufacturing or component variations can be reduced. In another embodiment, the LED array includes at least one cool white LED and one red LED. In one embodiment, the light emitting device includes one or more lasers disposed to couple light into one or more light input couplers or the surface of one or more coupling lightguides. In one embodiment, the light emitting device includes two or more light sources and the relative output of the two light sources is adjusted to achieve a desired color in a light emitting region of the lightguide or an area of light output on the light emitting device including a plurality of lightguides overlapping in the region. In one embodiment, a plurality of LED arrays is disposed to couple light into a single light input coupler or more than one light input coupler. In a further embodiment, a plurality of LEDs disposed on a circuit board are disposed to couple light into a plurality of light input couplers that direct light toward a plurality of sides of a light emitting device including a light emitting region. In a further embodiment, a light emitting device includes an LED array and light input coupler folded behind the light emitting region of the light emitting device such that the LED array and light input coupler are not visible when viewing the center of the light emitting region at an angle perpendicular to the surface. In another embodiment, the LED is a blue or ultraviolet LED combined with a phosphor. In another embodiment, a light emitting device includes a light source with a first activating energy and a wavelength conversion material which converts a first portion of the first activating energy into a second wavelength different than the first. In one embodiment, the light source includes a semiconductor light emitter such as an LED and a wavelength conversion material that converts a portion of the light from the emitter to a shorter or longer wavelength. In another embodiment, at least one selected from the group: light input coupler, cladding region, coupling lightguide, input surface optic, coupling optic, light mixing region, lightguide, light extraction feature or region, and light emitting surface includes a wavelength conversion material.

Light Input Coupler Input Surface

In one embodiment, the light input coupler includes a collection of coupling lightguides with a plurality of edges forming a light coupler input surface. In another embodiment, an optical element is disposed between the light source and at least one coupling lightguide wherein the optical element receives light from the light source through a light coupler input surface. In some embodiments, the input surface is substantially polished, flat, or optically smooth such that light does not scatter forwards or backwards from pits, protrusions, or other rough surface features. In some embodiments, an optical element is disposed to between the light source and at least one coupling lightguide to provide light redirection as an input surface (when optically coupled to at least one coupling lightguide) or as an optical element separate or optically coupled to at least one coupling lightguide such that more light is redirected into the lightguide at angles greater than the critical angle within the lightguide than would be the case without the optical element or with a flat input surface. The coupling lightguides may be grouped together such that the edges opposite the lightguide region are brought together to form an input surface including their thin edges.

Stacked Strips or Segments of Film Forming a Light Input Coupler

In one embodiment, the light input coupler is region of a film that includes the lightguide and the light input coupler which includes strip sections of the film which form coupling lightguides that are grouped together to form a light coupler input surface. The coupling lightguides may be grouped together such the edges opposite the lightguide region are brought together to form an input surface including their thin edges. A planar input surface for a light input coupler can provide beneficial refraction to redirect a portion of the input light from the surface into angles such that it propagates at angles greater than the critical angle for the lightguide. In another embodiment, a substantially planar light transmitting element is optically coupled to the grouped edges of coupling lightguides. One or more of the edges of the coupling lightguides may be polished, melted, smoothed using a caustic or solvent material, adhered with an optical adhesive, solvent welded, or otherwise optically coupled along a region of the edge surface such that the surface is substantially polished, smooth, flat, or substantially planarized.

In one embodiment, the lateral edges of at least one selected from the group: light turning lateral edges of the coupling lightguides, light collimating lateral edges of the coupling lightguides, lateral edges of the coupling lightguides, lateral edges of the lightguide region, lateral edges of the light mixing region, and lateral edges of the light emitting region includes an optical smoothing material disposed at a region of the edge that reduces the surface roughness of the region of the edge in at least one of the lateral direction and thickness direction. In one embodiment, the optical smoothing material fills in gaps, grooves, scratches, pits, digs, flattens regions around protrusions or other optical blemishes such that more light totally internally reflects from the surface from within the core region of the coupling lightguide.

The light input surface may include a surface of the optical element, the surface of an adhesive, the surface of more than one optical element, the surface of the edge of one or more coupling lightguides, or a combination of one or more of the aforementioned surfaces. The light input coupler may also include an optical element that has an opening or window wherein a portion of light from a light source may directly pass into the coupling lightguides without passing through the optical element. The light input coupler or an element or region therein may also include a cladding material or region. In one embodiment, a light redirecting optical element is disposed to receive light from at least one light source and redirect the light into a plurality of coupling lightguides. In one embodiment, the light input coupler includes a light collimating optical element. A light collimating optical element receives light from the light source with a first angular full-width at half maximum intensity within at least one input plane and redirects a portion of the incident light from the light source such that the angular full-width at half maximum intensity of the light is reduced in the first input plane. In one embodiment, the light collimating optical element is one or more of the following: a light source primary optic, a light source secondary optic, a light input surface, and an optical element disposed between the light source and at least one coupling lightguide. In one embodiment the light input coupler includes a light source and a light collimating optical element disposed to receive light from one or more light sources and provide light output in a first output plane, second output plane orthogonal to the first plane, or in both output planes with an angular full-width at half maximum intensity in air less than one selected from the group: 60 degrees, 40 degrees, 30 degrees, 20 degrees, and 10 degrees from the optical axis of the light exiting the light collimating optical element.

Coupling Light Guides

In one embodiment, the coupling lightguide is a region wherein light within the region can travel in a waveguide condition and a portion of the light input into a surface or region of the coupling lightguides passes through the coupling lightguide toward a lightguide or light mixing region. The coupling lightguide, in some embodiments, may serve to geometrically transform a portion of the flux from a light source from a first shaped area to a second shaped area different from the first shaped area. In an example of this embodiment, the light input surface of the light input coupler formed from the edges of folded strips (coupling lightguides) of a planar film has dimensions of a rectangle that is 3 millimeters by 2.7 millimeters and the light input coupler couples light into a planar section of a film in the light mixing region with a cross-sectional dimensions of 40.5 millimeters by 0.2 millimeters. In one embodiment, the extended direction of one or more coupling lightguides is the direction in which the one or more coupling lightguides extend from a common base area.

Coupling Lightguide Folds and Bends

In one embodiment, a light emitting device includes a light mixing region disposed between a lightguide and strips or segments cut to form coupling lightguides, whereby a collection of edges of the strips or segments are brought together to form a light input surface of the light input coupler disposed to receive light from a light source. In one embodiment, the light input coupler includes a coupling lightguide wherein the coupling lightguide includes at least one fold or bend in a plane such that at least one edge overlaps another edge. In another embodiment, the coupling lightguide includes a plurality of folds or bends wherein edges of the coupling lightguide can be abutted together in region such that the region forms a light input surface of the light input coupler of the light emitting device. In one embodiment, at least one coupling lightguide includes a strip or a segment that is bent or folded to radius of curvature of less than 75 times a thickness of the strip or the segment. In another embodiment, at least one coupling lightguide includes a strip or a segment that is bended or folded to radius of curvature greater than 10 times a thickness of the strip or the segment. In another embodiment, at least one coupling lightguide is bent or folded such that a longest dimension in a cross-section through the light emitting device or coupling lightguide in at least one plane is less than without the fold or bend. Segments or strips may be bent or folded in more than one direction or region and the directions of folding or bending may be different between strips or segments.

Coupling Lightguide Lateral Edges

In one embodiment, the lateral edges, defined herein as the edges of the coupling lightguide which do not substantially receive light directly from the light source and are not part of the edges of the lightguide region. The lateral edges of the coupling lightguide receive light substantially only from light propagating within the coupling light guide. In one embodiment, the lateral edges are at least one selected from the group: uncoated, coated with a reflecting material, disposed adjacent to a reflecting material, and cut with a specific cross-sectional profile. The lateral edges may be coated, bonded to, or disposed adjacent to a specularly reflecting material, partially diffusely reflecting material, or diffuse reflecting material. In one embodiment, the edges are coated with a specularly reflecting ink including nano-sized or micron-sized particles or flakes which substantially reflect the light in a specular manner when the coupling lightguides are brought together from folding or bending. In another embodiment, a light reflecting element (such as a multi-layer mirror polymer film with high reflectivity) is disposed near the lateral edge of at least one region of a coupling lightguide disposed, the multi-layer mirror polymer film with high reflectivity is disposed to receive light from the edge and reflect it and direct it back into the lightguide. In another embodiment, the lateral edges are rounded, and the percentage of incident light diffracted out of the lightguide from the edge is reduced. One method of achieving rounded edges is by using a laser to cut the strips, segments or coupling lightguide region from a film and edge rounding through control of the processing parameters (speed of cut, frequency of cut, laser power, etc.). Other methods for creating rounded edges include mechanical sanding/polishing or from chemical/vapor polishing. In another embodiment, the lateral edges of a region of a coupling lightguide are tapered, angled, serrated, or otherwise cut or formed such that light from a light source propagating within the coupling lightguide reflects from the edge such that it is directed into an angle closer to the optical axis of the light source, toward a folded or bent region, or toward a lightguide or lightguide region.

One or more of the edges of the coupling lightguides may be polished, melted, smoothed using a caustic or solvent material, adhered with an optical adhesive, solvent welded, or otherwise optically coupled along a region of the edge surface such that the surface is substantially polished, smooth, flat, or substantially planarized. This polishing can aide to reduce light scattering, reflecting, or refraction into angles less than the critical angle within the coupling lightguides or backwards toward the light source. In one embodiment, one or more lateral edges of the coupling lightguides or film has a surface roughness, Ra, measured as the arithmetic average of absolute values of the vertical deviations (deviations away from the edge surface) of the roughness profile from the mean line, in the lateral direction or the thickness direction less than one or more selected from the group: 500, 400, 300, 200, 100, 50, 40, 30, 20, 10, and 5 millionths of an inch. In one embodiment, the RMS of the profile within the sampling length, $R\Delta q$, of the surface of one or more lateral edges, is less than one or more selected from the group: 1000, 500, 400, 300, 200, 100, 75, 50, 40, 30, 20, 10, and 5. In one embodiment, the arithmetical mean height areal roughness, Sa, of the surface of one or more lateral edges according to ISO 25178-2:2012 is less than one or more selected from the group: 1000, 500, 400, 300, 200, 100, 75, 50, 40, 30, 20, 10, and 5 millionths of an inch.

In one embodiment, the lateral edges of at least one selected from the group: light turning lateral edges of the coupling lightguides, light collimating lateral edges of the coupling lightguides, lateral edges of the coupling lightguides, lateral edges of the lightguide region, lateral edges of the light mixing region, and lateral edges of the light emitting region includes an optical smoothing material disposed at a region of the edge that reduces the surface roughness of the region of the edge in at least one of the lateral direction and thickness direction. In one embodiment, the optical smoothing material fills in gaps, grooves, scratches, pits, digs, flattens regions around protrusions or other optical blemishes such that more light totally internally reflects from the surface from within the core region of the coupling lightguide. In one embodiment, one or more edges includes an optical smoothing material and the surface roughness, Ra, measured as the arithmetic average of absolute values of the vertical deviations (deviations away from the edge surface) of the roughness profile from the mean line, in the lateral direction or the thickness direction is less than one or more selected from the group: 500, 400, 300, 200, 100, 50, 40, 30, 20, 10, and 5 millionths of an inch. In one embodiment, the core region of the film-based lightguide includes a core material with a core refractive index and one or more lateral edges or edge regions includes an optical smoothing material with an optical smoothing material refractive index such that the ratio of the refractive index of the optical smoothing material to the refractive index of the core material is within one or more ranges selected from the group: 0.1-3, 0.2-2, 0.3-1.5, 0.4-1.2, 0.5-1.1, 0.8-1.1, 0.9-1.1, 0.95-1.05, and 0.98-1.02. In another embodiment, the optical smoothing material is the same material as the core material. In another embodiment, the optical smoothing refractive index material is applied to the one or more edge regions simultaneously. In one embodiment, the contact angle of the optical smoothing material with the core material at the lateral edge is less than one selected from the group: 120 degrees, 100 degrees, 80 degrees, 60 degrees, 40 degrees, 30 degrees, 20 degrees, and 10 degrees. In another embodiment, the contact angle of the optical smoothing material with the cladding or top surface the coupling lightguides or lightguide is greater than one selected from the group of 150 degrees, 140 degrees, 130 degrees, 120 degrees, 100 degrees, 80 degrees, 60 degrees, 40 degrees, and 30 degrees. In one embodiment, the low contact angle of the optical smoothing material with the core region reduces the surface roughness of the core region material surface along the lateral edge and the material spreads laterally along the edge and the high contact angle with the cladding layer or outer layer of the coupling lightguide or lightguide prevents spreading of the optical smoothing material along the cladding or outer layer.

In another embodiment, optical smoothing material is a thermoplastic material or a thermoset material. In one embodiment, the optical smoothing material is radiation cured material. In one embodiment, the optical smoothing material is a liquid with a vapor pressure less than one or more selected from the group of 30, 20, 10, 5, 4, 3, 2, 1, 0.1, 0.01, 0.001, 0.0001, 0.00001, 0.000001, 0.0000001, and 0.00000001 torr at 20 degrees Celsius.

In one embodiment, one or more of the lateral edges (or internal edge) of the film, lightguide, light emitting region, light mixing region, or one or more coupling lightguides or sub-coupling lightguides is cut using an ultra-keen blade. The cut may be made by razor slitting (or other blade slitting), shear slitting, or crush-score slitting. In one embodiment, the film comprises one or more carrier substrate or films (such as sacrificial film, carrier film, and/or film in temporary contact with the lightguide film) on the side of the blade and/or the side of the roller or cutting substrate/surface. In this embodiment, non-uniformities in the cut such as edge beads or raised edges, or differences between the edge quality of the two opposing surfaces may be minimized.

The cut may be made by a die cut (also known as shearing) using one or more straight or curved blades (shearing-type operation) that may be in a die, such as a blanking die, cut off die, trimming die, steel-rule die, or rotary die. The blade may translate relative to the film or component thereof (or the film or component thereof may translate relative to the blade) in a vertical direction parallel to the thickness direction, at an angle to the vertical direction between 0 degrees and 90 degrees, or in a horizontal direction. In one embodiment, the cut is performed with a blade pressing against the film on a flat surface or roll of rubber, polymer, metal, or material with a higher hardness than the film. In another embodiment, the cut is performed without a rubber, polymer, metal, or material with a higher hardness than the film on the opposite side. In one embodiment, one or more coupling lightguides are cut or formed at an angle to the machine direction of the film (during film-production, secondary processing, and/or during the cutting process) selected from the group: between 0 and 10 degrees; between 0.5 and 8 degrees; between 1 and 6 degrees, and between 2 and 5 degrees.

Cutting Blade Properties

In one embodiment, the cutting blade comprises a small apex angle to help create a higher quality edge. In one embodiment, the blade cutting the edge comprises an apex included angle selected from the group: between 15 and 50 degrees; between 15 and 40 degrees; between 15 and 30 degrees; between 20 and 30 degrees; and less than 50 degrees. In one embodiment, the blade comprises a high-quality polish to improve the (flatness) of the cut edge. In one embodiment, the blade comprises one or more cutting surfaces that cut the edge, wherein the cutting surfaces comprise an average surface roughness, Ra, measured as the arithmetic average of absolute values of the vertical deviations (deviations away from the cutting surface) of the roughness profile from the mean line, in the lateral direction or the thickness direction less than one or more selected from the group: 1000, 500, 400, 300, 200, 100, 50, 40, 30, 20, 10, and 5 millionths of an inch. In one embodiment, one or more regions of the film and/or the blade are heated to soften film during the cut to improve the flatness/optical quality. In one embodiment, the RMS of the profile within the sampling length, R$\Delta$q, of one or more cutting surfaces of the blade in a cutting region of the blade that contacts the film, is less than one or more selected from the group: 1000, 500, 400, 300, 200, 100, 75, 50, 40, 30, 20, 10, and 5. In one embodiment, the arithmetical mean height areal roughness, Sa, of one or more cutting surfaces of the blade in a cutting region of the blade, such as according to ISO 25178, is less than one or more selected from the group: 1000, 500, 400, 300, 200, 100, 75, 50, 40, 30, 20, 10, and 5 millionths of an inch.

In one embodiment, the film, the region of the film being cut to form an edge, and/or the blade is heated to a temperature higher than one or more selected from the group: 20, 25, 30, 40, 50, 60, 70, 80, 100, 120, 150, 180, 200, and 250 degrees Celsius. In one embodiment, one or more regions of the film and/or the blade are heated using one or more methods selected from the group: laser heating, infra-red heating, infra-red lamp heating, light-emitting diode heating, microwave heating, heating elements, tubular electric heater, heating elements within a roll or plate, electric resistance films or heaters, conductive heating to the blade, heated rubber roller, heated polymer roller, heated metal roller. The heating may be one or more selected from the group: continuous; just prior to the cut; during the cut; prior and during the cut; after the cut; prior, during, and after the cut. In one embodiment, the film is heated prior, or prior and during the cut in a localized region corresponding to the region to be cut, such as by using an infrared exposure pattern, screen-printed metal-ceramic or other resistive material in a pattern corresponding to the area to be cut. In one embodiment, the film is cooled quickly, such as by quenching or a cold roller after one or more lateral edges are formed. In one embodiment, the blade is hard-coated with one or more materials selected from the group: titanium nitride, ceramic, and diamond-like coating. In one embodiment, the blade comprises a ceramic material, solid tungsten carbide material, or steel material.

Width of Coupling Lightguides

In one embodiment, the dimensions of the coupling lightguides are substantially equal in width and thickness to each other such that the input surface areas for each edge surface are substantially the same. In another embodiment, at least one selected from the group: coupling lightguide width, the largest width of a coupling waveguide, the average width of the coupling lightguides, and the width of each coupling lightguides is selected from a group of: 0.5 mm-1 mm, 1 mm-2 mm, 2 mm-3 mm, 3 mm-4 mm, 5 mm-6 mm, 0.5 mm-2 mm, 0.5 mm-25 mm, 0.5 mm-10 mm, 10-37 mm, and 0.5 mm-5 mm. Separation or Gap between the coupling lightguides In one embodiment, two or more coupling lightguides include a gap between the lightguides in the region where they connect to the lightguide region, lightguide region, or light mixing region. In another embodiment, the lightguides are formed from a manufacturing method wherein gaps between the lightguides are generated. For example, in one embodiment, the lightguides are formed by die cutting a film and the coupling lightguides have a gap between each other. In one embodiment, the gap between the coupling lightguides is greater than one selected from the group: 0.15, 0.25, 0.5, 1, 2, 4, 5, 10, 25, and 50 millimeters. If the gap between the coupling lightguides is very large relative to the coupling lightguide width, then the uniformity of the light emitting region may be reduced (with respect to luminance or color uniformity) in some embodiments if the light mixing region is not sufficiently long in a direction parallel to the optical axis of the light propagating in the lightguide because a side of the lightguide has regions (the gap regions) where light is not entering the lightguide region from coupling lightguides. In one embodiment, a film-based lightguide includes two coupling lightguides wherein the average of the width of the two coupling lightguides divided by the width of the gap between the two coupling lightguides at the region where the two coupling lightguides join the light mixing region or lightguide region is greater than one selected from the group: 0.1, 0.5, 1, 1.5, 2, 4, 6, 10, 20, 40, and 50. In another embodiment, the film-based lightguide has large gaps between the coupling lightguides and a sufficiently long light mixing region to provide the desired level of uniformity. In another embodiment, a film-based lightguide includes two coupling lightguides wherein the width of the gap between the two coupling lightguides divided by the average of the width of the two coupling lightguides at the region where the coupling lightguides join the light mixing region or lightguide region is greater than one selected from the group: 1, 1.5, 2, 4, 6, 10, 20, 40, and 50.

In one embodiment, the average cut width of the coupling lightguides at the light mixing region is minimized in order to reduce optical shadows due to light not entering the light mixing region and/or light emitting region from the shadow area corresponding to the width of the cuts. In one embodiment, the average cut width, cw, of the coupling lightguides at the light mixing region is less than one selected from the group: 300, 250, 100, 75, 50, and 25 micrometers in the width direction. In one embodiment, the ratio of the average width of the coupling lightguides in the width direction to the average cut width, cw, is greater than one selected from the group: 10, 20, 30, 40, 50, 75, 100, 150, 200, 250, 300, 400, and 500. In one embodiment, the ratio of the width of the light mixing region at the coupling lightguides to the average cut width, cw, is greater than one selected from the group: 10, 20, 30, 40, 50, 75, 100, 150, 200, 250, 300, 400, and 500. In one embodiment, the strips of the film forming the coupling lightguides are cut using a femtosecond laser.

Variable Separation Between Coupling Lightguides

In one embodiment, a first array of coupling lightguides extends from the lightguide region or body of a film-based lightguide and the separation distance between the coupling lightguides at the lightguide region varies. In another embodiment, the separation distance between two or more coupling lightguides along a first side of a lightguide region of a film-based lightguide is greater than the separation distance between two or more coupling lightguides along the side of the lightguide region.

Separation Between the Lightguide Region Edge and the Coupling Lightguide Nearest the Edge In one embodiment, a coupling lightguide nearest the edge of the film-based lightguide is spaced from the edge of the film adjacent the side. For example, in one embodiment, the first coupling lightguide along a side of a film-based lightguide is separated from the edge of the lightguide region by a distance greater than 1 mm. In another embodiment, the first coupling lightguide along a side of a film-based lightguide is separated from the edge of the lightguide region by a distance greater than one selected from the group: 0.5, 1, 2, 4, 6, 8, 10, 20, and 50 millimeters. In one embodiment, the distance between the lightguide region edge and the first coupling lightguide along a side improves the uniformity in the lightguide region due to the light from the first coupling lightguide reflecting from the lateral edge of the lightguide region.

Shaped or Tapered Coupling Lightguides

The width of the coupling lightguides may vary in a predetermined pattern. In one embodiment, the width of the coupling lightguides varies from a large width in a central coupling lightguide to smaller width in lightguides further from the central coupling lightguide as viewed when the light input edges of the coupling lightguides are disposed together to form a light input surface on the light input coupler. In this embodiment, a light source with a substantially circular light output aperture can couple into the coupling lightguides such that the light at higher angles from the optical axis are coupled into a smaller width strip such that the uniformity of the light emitting surface along the edge of the lightguide or lightguide region and parallel to the input edge of the lightguide region disposed to receive the light from the coupling lightguides is greater than one selected from the group: 60%, 70%, 80%, 90% and 95%.

Other shapes of stacked coupling lightguides can be envisioned, such as triangular, square, rectangular, oval, etc. that provide matched input areas to the light emitting surface of the light source. The widths of the coupling lightguides may also be tapered such that they redirect a portion of light received from the light source. The lightguides may be tapered near the light source, in the area along the coupling lightguide between the light source and the lightguide region, near the lightguide region, or some combination thereof.

The shape of a coupling lightguide is referenced herein from the lightguide region or light emitting region or body of the lightguide. One or more coupling lightguides extending from a side or region of the lightguide region may expand (widen or increase in width) or taper (narrow or decrease in width) in the direction toward the light source. The expansion or tapering of the lateral edges may be represented by one or more angles and/or curves in a cross-sectional plane of the one or more coupling lightguides orthogonal to thickness direction of the one or more coupling lightguides. In one embodiment, coupling lightguides taper in one or more regions to provide redirection or partial collimation of the light traveling within the coupling lightguides from the light source toward the lightguide region. In one embodiment, one or more coupling lightguides widens along one lateral edge and tapers along the opposite lateral edge. In this embodiment, the net effect may be that the width remains constant. The widening or tapering may have different profiles or shapes along each lateral side for one or more coupling lightguides. The widening, tapering, and the profile for each lateral edge of each coupling lightguide may be different and may be different in different regions of the coupling lightguide. For example, one coupling lightguide in an array of coupling lightguides may have a parabolic tapering profile on both sides of the coupling lightguides in the region near the light source to provide partial collimation, and at the region starting at about 50% of the length of the coupling lightguides one lateral edge tapers in a linear angle and the opposite side includes a parabolic shaped edge. The tapering, widening, shape of the profile, location of the profile, and number of profiles along each lateral edge may be used to provide control over one or more selected from the group: spatial or angular color uniformity of the light exiting the coupling lightguides into the light mixing region (or light emitting region), spatial or angular luminance uniformity of the light exiting the coupling lightguides into the light mixing region (or light emitting region), angular redirection of light into the light mixing region (or light emitting region) of the lightguide (which can affect the angular light output profile of the light exiting the light emitting region along with the shape, size, and type of light extraction features), relative flux distribution within the light emitting region, and other light redirecting benefits such as, without limitation, redirecting more light toward a second, extending light emitting region. In one embodiment, the film lightguide body is connected to an array of strips or coupling lightguides that are bounded by a non-linear edge, such as, for example, a flat light input edge between two lateral edges angled at an angle greater than 0 degrees to the light input edge at the bounding edge of the strips or coupling lightguides. In one embodiment, the edges of different strips may all have similar geometries. The edge, such as the light input edge or one or more regions of a lateral edge, for example, can be modified to focus the light, scatter the light, or otherwise shape the insertion of light from the LED. In one embodiment, a first lateral edge of one or more coupling lightguides tapers outward or inward in a taper region at a first lateral edge angle from the optical axis of the light propagating in the coupling lightguide or the coupling lightguide length direction (at the taper region) of the coupling lightguide perpendicular to the width direction and perpendicular to the thickness direction. In another embodiment, a second lateral edge opposite the first lateral edge of the one or more coupling lightguides tapers outward or inward in the taper region at a second lateral edge angle from the optical axis of the light propagating in the coupling lightguide or the coupling lightguide length direction (at the taper region). In another embodiment, the first lateral edge angle and second lateral edge angle are equal in magnitude, but opposite in sign. In one embodiment, the first lateral edge angle is one or more selected from the group: 0 degrees, between 0 and 90 degrees, between 10 and 80 degrees, between 20 and 70 degrees, between 25 and 65 degrees, between 30 and 60 degrees, between 35 and 55 degrees, and between 40 and 50 degrees. In another embodiment, the second lateral edge angle is one or more selected from the group: between 0 and −90 degrees, between −10 and −80 degrees, between −20 and −70 degrees, between −25 and −65 degrees, between −30 and −60 degrees, between −35 and −55 degrees, and between −40 and −50 degrees. In one embodiment, the taper region of the one or more coupling lightguides is a region of the one or more coupling lightguides between the light input surface for one or more coupling lightguides and the light mixing region or light emitting region of the film-based lightguide. In one embodiment, the taper region is the region of the one or more coupling lightguides adjacent the light input surface of the one or more coupling lightguides. For example, in one embodiment, the first lateral edge angle is 40 degrees and the second lateral edge angle is 0 degrees from the length direction of a plurality of coupling lightguides in a taper region of the coupling lightguides at the ends of the stacked plurality of coupling lightguides with a light input surface formed from the ends of the coupling lightguides positioned to receive light from one or more light sources.

Curved Lateral Edge Region

In one embodiment, one or more of the coupling lightguides comprises one or more lateral edges (or portions thereof) that are positively or negatively sloped in a cross-sectional plane orthogonal to the thickness direction of the coupling lightguides. As used herein, a two-dimensional curve of a lateral edge (or portion thereof) is negatively sloped if the slope of the tangent to the curve is negative and is positively sloped if the slope of the tangent to the curve is positive when the cross-section of the one or more coupling lightguides is viewed looking down on the coupling lightguide in a direction parallel to the thickness direction. In one embodiment, one or more coupling lightguides comprises a first curved portion of a first lateral edge adjacent the light input edge that is negatively sloped and a second curved portion on a second lateral edge opposite the first lateral edge on the opposite side of the coupling lightguide that is positively sloped.

Offset Light Input Edge

In one embodiment, in order for a stack of light input edges of coupling lightguides to be space-efficient and efficient at collecting the light from the light source into the coupling lightguides, the edges should be parallel to each other and the stack should not have any relatively large air gaps between the edges forming the input surface for collecting light from one or more light sources. Thus, in this embodiment, using coupling lightguides formed from a film, the stack of light input edges of the coupling lightguides may be flat at the light input surface. When the coupling lightguides are folded, the coupling lightguides are curved along the folds over a distance from the angled fold. The radius of curvature of the fold extends the curved portion of the coupling lightguide past the angled fold by a curved extension length, c. The curved extension length, c, in the extended direction of the coupling lightguide is:

$$c = \frac{\frac{\pi \times R}{2}}{\cos\theta},$$

where R is the radius of curvature of the coupling lightguide and θ is the angle of the fold relative the lateral edge (for linear lateral edges parallel to the extended direction). For coupling lightguides extending from the body of the film with a coupling lightguide orientation angle parallel to the extended direction of the coupling lightguides that are folded 90 degrees (fold angle, θ=45 degrees), the curved extension length c, is $$\frac{\sqrt{2}}{2} \times \pi \times R.$$

The curved portion of the lateral edges of the coupling lightguide (for linear, parallel lateral coupling lightguide edges) for 90 degree folds extend in the fold direction from the angled fold by the curved extension length. Thus, when a first coupling lightguide in an array of coupling lightguides whose un-folded first lateral edge (outer lateral edge) co-linear with the first lateral edge of the light mixing region (or light emitting region) is folded 90 degrees, the curved portion of the first lateral edge of the first coupling lightguide extends beyond the first lateral edge of the light mixing region (or light emitting region) by the first curved extension length c1, for the first folded coupling lightguide, where $$c1 = \frac{\sqrt{2}}{2} \times \pi \times R_1.$$

Thus, for full-width coupling lightguides where the width of the coupling lightguide light input surface (light input edge) is the same as the width of the coupling lightguide where it meets the light mixing region (or light emitting region), the curved region of the first coupling lightguide extends past the lateral edge of the light mixing region (or light emitting region) when it is folded. Since there is a desire to reduce bevel areas of light emitting devices and displays and minimize the length and width of the light emitting devices (such as frontlights for reflective displays), a reduced width light input edge (the width of the coupling lightguide at the input surface is less than the width of the coupling lightguide at the light mixing region (or light emitting region)) that is off-set from the outer lateral edge of the first coupling lightguide may be used to position the light input surface (formed from the bounding edges of the coupling lightguides) within a planar region of the first coupling lightguide at a location between the lateral edges of the light mixing region (or light emitting region) in the array direction when the coupling lightguides are folded. The inner lateral edge for the first coupling lightguide is the lateral edge adjacent a lateral edge (outer lateral edge) of the second coupling lightguide in the array of coupling lightguides when unfolded, and the outer lateral edge of the first coupling lightguide is the lateral edge of the first coupling lightguide opposite the inner lateral edge of the first coupling lightguide (and may be substantially coplanar with the lateral edge of film-based lightguide in the light mixing region and/or the light emitting region). Positioning at least a portion of the light input edge for the first coupling lightguide in a first planar region, offset from the outer lateral edge of the first coupling lightguide, offset from a first line at a location along the extended direction of the coupling lightguide corresponding to the curved extension length from the angled fold along the outer lateral edge, and with a width less than the width of the first coupling lightguide at the light mixing region (or light emitting region) can enable the light source (or a light emitting surface of the light source) to be positioned at a location between the lateral edges of the light mixing region (or light emitting region) in the array direction when the coupling lightguides are folded, and thus reduce the lateral dimension of the light emitting device and/or display.

The curved region (when folded) of the first coupling lightguide is curved in a plane comprising the thickness direction of the film-based lightguide and is the region of the first coupling lightguide between a first line which is a first curved extension length from the angled fold in the extended direction and a second line which is a first curved extension length from the angled fold in a direction opposite the extended direction. The offset, reduced width light input edge for the first coupling lightguide may be cut or formed such that it is within a first planar region (that is planar after folding) of the first coupling lightguide defined as the region of the coupling lightguide between the inner lateral edge of the first coupling lightguide and the first line which is a first curved extension length from the angled fold in the extended direction. In one embodiment, more than one coupling lightguide comprises an offset, reduced width light input edge in a planar region (that is planar after folding). In one embodiment, the light input edge for the first coupling lightguide is at location along the coupling lightguide corresponding to a distance along the coupling lightguide greater than the distance corresponding to the first curved extension length from the angled fold along the outer later edge by 0.01, 0.1, 0.5, 1, 1.5, 2, 3, 4, or 5 millimeters (when unfolded).

In one embodiment, the width of the light input edge of one or more coupling lightguides is less than one selected from the group: 100%, 90%, 80%, 70%, 60%, 50%, 40%, and 30% of the width of the one or more coupling lightguide at the light mixing region or light emitting region.

In one embodiment, one or more coupling lightguides each comprise a plurality of light input edges where the combined width of the one or more coupling lightguides light input edges is less than one selected from the group: 100%, 90%, 80%, 70%, 60%, 50%, 40%, and 30% of the width of the one or more coupling lightguide at the light mixing region or light emitting region. In one embodiment, one or more coupling lightguides comprises two or more light input edges wherein each input each is less than one selected from the group: 70%, 60%, 50%, 40%, and 30% of the width of the one or more coupling lightguide at the light mixing region or light emitting region. For example, in one embodiment, the first coupling lightguide comprises two light input edges with angled lateral edges on either side of the light input edges, with each light input edge offset off-set from the outer lateral edge of the first coupling lightguide and each light input edge is 20% of the width of the first coupling lightguide at the light mixing region of the film-based lightguide comprising an array of coupling lightguides folded and stacked such that each light input edge of the first coupling lightguide receives light from a different light source.

In one embodiment, the light input edge of one or more coupling lightguides is offset from the angled fold line (the outer, linear portion of the fold viewed looking in the thickness direction, which is also the line of the outer surface of the coupling lightguide formed at the fold as the radius of the fold approaches zero) in a direction parallel to the extended direction of the corresponding coupling lightguide by a distance greater than one selected from the group: 100%, 105%, 110%, 120%, 125%, 150%, and 200% of the curved extension length of the corresponding coupling lightguide. In one embodiment, the end or center of a light input edge of one or more coupling lightguides is offset from the outer lateral edge of the corresponding one or more coupling lightguides by one or more selected from the group: 1%, 2%, 5%, 10%, 20%, 30%, 40%, 50%, 60%, 70%, 80%, 90%, and 100% of the width of the corresponding one or more coupling lightguides at the light mixing or light emitting region.

In one embodiment, one or more coupling lightguides (such as the first coupling lightguide) comprises a curved or tapered lateral edge region connecting to the light input edge of the coupling lightguide, wherein a curved region of the coupling lightguide comprises at least a portion of the curved or tapered lateral edge. In one embodiment, the curved region of one or more coupling lightguides comprises a radius of curvature between 0.2 and 5 millimeters; and the curved region comprises all or a portion of a tapered lateral edge of the coupling lightguide with a first lateral edge angle or all or a portion of a curved lateral edge of the coupling lightguide with a positive slope, negative slope, or a portion of a parabolic curve in a cross-sectional plane orthogonal to the thickness direction of the one or more coupling lightguides.

Interior Light Directing Edge

In one embodiment, the interior region of one or more coupling lightguides includes an interior light directing edge. The interior light directing edge may be formed by cutting or otherwise removing an interior region of the coupling lightguide. In one embodiment, the interior light directed edge redirects a first portion of light within the coupling lightguide. In one embodiment, the interior light directing edges provide an additional level of control for directing the light within the coupling lightguides and can provide light flux redistribution within the coupling lightguide and within the lightguide region to achieve a predetermined light output pattern (such as higher uniformity or higher flux output) in a specific region. In one embodiment, at least one interior light directing edge is positioned within a coupling lightguide to receive light propagating within the coupling lightguide within a first angular range from the optical axis of light traveling within the coupling lightguide and direct the light to a second, different angular range propagating within the coupling lightguide. In one embodiment, the first angular range is selected from the group: 70-89, 70-80, 60-80, 50-80, 40-80, 30-80, 20-80, 30-70, and 30-60 degrees; and the second angular range is selected from the group: 0-10, 0-20, 0-30, 0-40, 0-50, 10-40, and 20-60 degrees. In another embodiment, at least one coupling lightguide includes a plurality of channels defined by at least one interior light directing edge and a lateral edge of the coupling lightguide. In a further embodiment, the coupling lightguide includes a channel defined by a first interior light directing edge and a second interior light directing edge. In one embodiment, one or more channels defined by interior light directing edges and/or lateral edges of the coupling lightguide separate angular ranges of light from the light source into spatially separated channels that can transfer the spatial separation to the lightguide region.

Coupling Lightguide Orientation Angle

In a further embodiment, at least one portion of the array of coupling lightguides is disposed at a first coupling lightguide orientation angle to the edge of at least one of the light mixing region and light emitting region which it directs light into. The coupling lightguide orientation angle is defined as the angle between the coupling lightguide axis and the direction parallel to the major component of the direction of the coupling lightguides to the light emitting region of the lightguide. The major component of the direction of the coupling lightguide to the light emitting region of the lightguide is orthogonal to the array direction of the array of coupling lightguides at the light mixing region (or lightguide region if they extend directly from the light emitting region). In one embodiment, the orientation angle of a coupling lightguide or the average orientation angle of a plurality of coupling lightguides is at least one selected from the group: 1-10 degrees, 10-20 degrees, 20-30 degrees, 30-40 degrees, 40-50 degrees, 60-70 degrees, 70-80 degrees, 1-80 degrees, 10-70 degrees, 20-60 degrees, 30-50 degrees, greater than 5 degrees, greater than 10 degrees, and greater than 20 degrees. In a further embodiment, the film-based lightguide includes a non-folded coupling lightguide disposed to receive light from the light input surface and direct light toward the lightguide region without turning the light.

Coupling Lightguide Stack

In one embodiment, coupling lightguides extending from a lightguide region in a film-based lightguide are folded at a 90-degree fold angle with their ends stacked. In this embodiment, the radius of curvature for each of the coupling lightguides is different due to the thickness of each of the coupling lightguides. In this embodiment, the radius of curvature for the nth coupling lightguide is determined by the equation:

$$R_n = R_1 + \frac{(n-1)}{2}t,$$

where $R_1$ is an initial (smallest radius) coupling lightguide radius, and t is a thickness of the coupling lightguides.

The coupling lightguide stack can be configured in numerous ways to compensate for the different radii of curvature. In one embodiment, the coupling lightguides have one or more compensation features selected from the group: staggered light input surfaces; coupling lightguides oriented at an angle with respect to each other; varying lateral fold locations; coupling lightguides angled in an oriented stack; non-uniform tension or torsion; a constant fold radius of curvature stack; and other compensation techniques or features.

In one embodiment, a film-based lightguide comprises a first array of coupling lightguides in a first array direction extending from a light mixing region or light emitting region of film, wherein the coupling lightguides are folded and stacked; and each coupling lightguide of the array of coupling lightguides comprises two or more sub-coupling lightguides in a second array direction which may be parallel or at an angle to the first array direction. In one embodiment, the sub-coupling lightguides are folded and stacked such that their ends form a light input surface. In one embodiment, each coupling lightguide of the array of coupling lightguides comprises two sub-coupling lightguides comprising a first sub-coupling lightguide and a second coupling lightguide. In another embodiment, each first sub-coupling lightguide is stacked in a first sub-coupling lightguide stack, and each second-sub-coupling lightguide is stacked in a second sub-coupling lightguide stack, wherein the second sub-coupling lightguide stack and/or the first sub-coupling lightguide stack is positioned or moved such that the first sub-coupling lightguide stack is positioned below (or above) the second sub-coupling lightguide stack without folding the first sub-coupling lightguides and/or second sub-coupling lightguides. In one embodiment, the array of coupling lightguides are folded and stacked, and the first sub-coupling lightguides and the second sub-coupling lightguides are positioned in a single stack without folding. In one embodiment, the first sub-coupling lightguides and second sub-coupling lightguides are positioned in a single stack such that their ends (light input ends or bounding edges) are parallel and/or their lateral edges are parallel at the light input surface when stacked. In one embodiment, each coupling lightguide in an array of coupling lightguides comprises a first sub-coupling lightguide adjacent a second sub-coupling lightguide, wherein when the array of coupling lightguides are stacked, the first sub-coupling lightguides form a first sub-coupling lightguide stack, and the second sub-coupling lightguides form a second sub-coupling lightguide stack. In one embodiment, the first sub-coupling lightguide stack and second sub-coupling lightguide stack are stacked together such that for each coupling lightguide in the array of coupling lightguides, the first sub-coupling lightguide is at a different location in the stack in the thickness direction than the second sub-coupling lightguide. In one embodiment, the first sub-coupling lightguide stack is position at a different height in the thickness direction than the second sub-coupling lightguide stack.

In one embodiment, the first sub-coupling lightguides are ordered in the first stack according to the order along the coupling lightguide in the width direction of the corresponding coupling lightguide. In another embodiment, the second sub-coupling lightguides are ordered in the second stack according to the order along the coupling lightguide in the width direction of the corresponding coupling lightguide. In one embodiment, one or more of the sub-coupling lightguides comprises tapered, curved, and/or collimating lateral edges. The average width of one or more groups of sub-coupling lightguides (such as the first sub-coupling lightguides) for an array of coupling lightguides may be less than the average width of a second group of sub-coupling lightguides (such as the second sub-coupling lightguides).

In one embodiment, the sub-coupling lightguides are formed from a film by cutting, slitting, stamping, die-cutting, laser cutting, water cutting, or by injection molding, or by other method suitable for manufacturing coupling lightguides. In one embodiment, the sub-coupling lightguides are formed in the same manufacturing step as the coupling lightguides, such as a die cutting operation on a film, for example. In one embodiment, the sub-coupling lightguides are formed by slits in coupling lightguides wherein the slits may be oriented at an angle greater than 0 degrees, greater than 5 degrees, or between 5 and 50 degrees to the lateral edges of the coupling lightguides in the region adjacent the region comprising the sub-coupling lightguides. In another embodiment, the film-based lightguide includes a sacrificial coupling lightguide on one or both ends in an array of coupling lightguides extending from a lightguide region of the film.

Light Mixing Region

In one embodiment, a light emitting device includes a light mixing region disposed in an optical path between the light input coupler and the lightguide region. The light mixing region can provide a region for the light output from individual coupling lightguides to mix together and improve at least one of a spatial luminance uniformity, a spatial color uniformity, an angular color uniformity, an angular luminance uniformity, an angular luminous intensity uniformity or any combination thereof within a region of the lightguide or of the surface or output of the light emitting region or light emitting device. In one embodiment, a width of the light mixing region is selected from a range from 0.1 mm (for small displays) to more than 10 feet (for large billboards). In one embodiment, the light mixing region is the region disposed along an optical path near the end region of the coupling lightguides wherein light from two or more coupling lightguides may inter-mix and subsequently travel to a light emitting region of the lightguide. In one embodiment, the light mixing region is formed from the same component or material as at least one of the lightguide, lightguide region, light input coupler, and coupling lightguides.

In one embodiment, the width of the light mixing region in a width direction orthogonal to the array direction of the array of coupling lightguides and the thickness direction of the film improves the spatial uniformity (luminous flux, radiant flux, color, luminance, and/or radiance) or angular uniformity of the light in the light emitting region in a direction parallel to the array direction of the array of coupling lightguides. In one embodiment, the width of the light mixing region in the direction orthogonal to the array direction of the array of coupling lightguides and the thickness direction of the film is one or more selected from the group: greater than 2 millimeters, greater than 5 millimeters; greater than 10 millimeters; greater than 20 millimeters; greater than 40 millimeters; greater than 100 millimeters; between 2 and 100 millimeters; between 2 and 20 millimeters; greater than or equal to 40%, 50%, 60%, 70%, 80%, 90%, 100%, 120%, 50%, and 200% of the total width of the coupling lightguides at the light mixing region in the width direction; between 20% and 400%, between 40% and 200%, and between 50% and 100% of the total width of the coupling lightguides at the light mixing region in the width direction. In one embodiment, the spatial uniformity (radiant flux or luminous flux) in the array direction of the array of coupling lightguides of light in the mixing region just prior to the light emitting region is one or more selected from the group: greater than 50%, 60%, 70%, 80%, 90%, and 100%; between 50% and 100%, between 70% and 100%, between 80% and 100%; greater than the uniformity in the light mixing region just after the array of coupling lightguides in the array direction. The color uniformity may be evaluated by the color non-uniformity. In one embodiment, the color non-uniformity, $\Delta u'v'$, in the 1976 u', v' Uniform Chromaticity Scale in the direction parallel to the array direction of the array of coupling lightguides in the light mixing region just prior to the light emitting region is one or more selected from the group: less than 0.3, 0.2, 0.1, 0.05, 0.01, or 0.004; less than the color non-uniformity in the light mixing region just after the array of coupling lightguides in the array direction; and less than the color non-uniformity in the light mixing region just after the array of coupling lightguides in the array direction by more than one selected from the group: 0.3, 0.2, 0.1, 0.05, or 0.01. The angular uniformity can be evaluated by examining the maximum variation along the array direction of the light mixing region of the angle of peak luminous (or radiant) intensity (largest difference in angles of peak intensity) and/or largest differences in angular Full angular Width at Half Maximum luminous (or radiant) intensity (FWHM) in a light output plane perpendicular to the thickness direction. In one embodiment, angle of peak luminous (or radiant) intensity varies by a maximum angular variation of one or more selected from the group: less than 2, 4, 6, 8, 10, 20, 30, and 40 degrees; less than the maximum angular variation of the peak luminous (or radiant) intensity in the light mixing region just after the array of coupling lightguides in the array direction; and less than the maximum angular variation of the peak luminous (or radiant) intensity in the light mixing region just after the array of coupling lightguides in the array direction by one or more selected from the group: 2, 4, 6, 8, 10, 20, and 30 degrees.

The spatial and/or angular uniformity just prior to the light emitting region may be evaluated using a cut and aperture scan method. The cut and aperture scan method cuts the film-based lightguide using a knife, blade, or tool to cut the film in a line (or curve) with a smooth, flat surface finish (such as surface roughness less than 200 nanometers) in a line in the array direction (or curve if the coupling lightguides are extending along a curve, for example), and a rectangular slit aperture oriented with the aperture's longer dimension in the thickness direction (such as two knife blades) is scanned in the array direction where the light from the aperture is coupled into an integrating sphere (or angular scanning device such as a goniophotometer for angular measurements) that measures the luminous and/or radiometric flux (or relative intensity values), or the relative or absolute luminous or radiant intensities across the angular output angles in a light output plane perpendicular to the thickness direction for angular uniformity measurements. The data of the luminous flux, radiometric flux, color, angle of peak intensity, or FWHM may be evaluated along the light mixing region in the array direction. The luminous flux uniformity or radiometric flux uniformity as used herein is 100% times the minimum luminous flux divided by the maximum luminous flux or 100% times the minimum radiant flux divided by the maximum radiant flux, respectively. The aperture width in the width direction should be 10% of the average width of the coupling lightguides in the width direction and the step increments in the width direction of the aperture should be the width of the aperture. The aperture should be less than 2 millimeters from the light mixing region edge under evaluation and the angular measurements should be performed with an angular resolution less than 2 degrees.

Width of the Light Mixing Region or Array of Coupling Lightguides

In one embodiment, the length of the array of coupling lightguides and/or the light mixing region is longer than the light emitting region or lightguide region in a direction parallel to the array direction of the coupling lightguides (perpendicular to the extended direction of the array of coupling lightguides). In one embodiment, the array of coupling lightguides and/or the light mixing region extends past a lateral side of the light emitting region in the direction parallel to the array direction of the coupling lightguides (the perpendicular to the extended direction of the coupling lightguides) by a distance selected from the group: greater than 1 millimeter; greater than 2 millimeters; greater than 4 millimeters; greater than 6 millimeters; greater than 10 millimeters; greater than 15 millimeters; greater than 20 millimeters; greater than 50% of the average width of the coupling lightguides; greater than 100% of the average width of the coupling lightguides; and greater than 1%, 2%, 5%, or 10% of the length of the light emitting region in the direction parallel to the array direction of the coupling lightguides. In one embodiment, the array of coupling lightguides or light mixing region extends past the lateral edge of the light emitting region opposite the direction of the fold. In a further embodiment, the array of coupling lightguides or light mixing region extends past the lateral side of the light emitting region in the direction of the fold. In one embodiment, more light can be introduced into the edge region (defined as the region of the light emitting area within 10% of the lateral edge) by extending the array of coupling lightguides past the lateral edge of the light emitting region and/or extending the light mixing region past the lateral edge of the light emitting region. In a further embodiment, a lateral edge of the light mixing region, a lateral edge of one or more coupling lightguides, or an internal light directing edge is oriented at a first extended orientation angle to the extended direction of the coupling lightguides to direct light from the extended region of the array of coupling lightguides or the light mixing region toward the light emitting region of the film-based lightguide. In one embodiment, the first extended orientation angle is greater than one selected from the group: 0, 2, 5, 10, 20, 30, 45, and 60 degrees. For example, in one embodiment, the array of coupling lightguides includes a coupling lightguide that extends past the far lateral edge (the edge furthest from the light source) of the light emitting area and the light mixing region includes a lateral edge with an extended orientation angle of 30 degrees. In this embodiment, the far coupling lightguides are longer in length, and thus more light is absorbed through the material. One method of compensation for the light flux difference reaching the far edge region of the light emitting area due to the longer path length of light traveling toward the far edge region of the light emitting area is to add an additional coupling lightguide that can receive a distributed portion of the light from the light source and direct it into the far edge region of the light emitting area by an angled lateral edge in the extended coupling lightguide, the light mixing region, or an internal light directing edge.

Housing or Holding Device for Light Input Coupler

In one embodiment, a light emitting device includes a housing or holding device that holds or includes at least part of a light input coupler and light source. The housing or holding device may house or contain within at least one selected from the group: light input coupler, light source, coupling lightguides, lightguide, optical components, electrical components, heat sink or other thermal components, attachment mechanisms, registration mechanisms, folding mechanisms devices, and frames. The housing or holding device may include a plurality of components or any combination of the aforementioned components. The housing or holding device may serve one or more of functions selected from the group: protect from dust and debris contamination, provide air-tight seal, provide a water-tight seal, house or contain components, provide a safety housing for electrical or optical components, assist with the folding or bending of the coupling lightguides, assist in the alignment or holding of the lightguide, coupling lightguide, light source or light input coupler relative to another component, maintain the arrangement of the coupling lightguides, recycle light (such as with reflecting inner walls), provide attachment mechanisms for attaching the light emitting device to an external object or surface, provide an opaque container such that stray light does not escape through specific regions, provide a translucent surface for displaying indicia or providing illumination to an object external to the light emitting device, include a connector for release and interchangeability of components, and provide a latch or connector to connect with other holding devices or housings. In another embodiment, the housing includes at least one curved surface. A curved surface can permit non-linear shapes or devices or facilitate incorporating non-planer or bent lightguides or coupling lightguides. In one embodiment, the housing includes a thermal transfer element disposed to transfer heat from a component within the housing to an outer surface of the housing. In another embodiment, the thermal transfer element is one selected from the group: heat sink, metallic or ceramic element, fan, heat pipe, synthetic jet, air jet producing actuator, active cooling element, passive cooling element, rear portion of a metal core or other conductive circuit board, thermally conductive adhesive, or other component known to thermally conduct heat. In one embodiment, the thermal transfer element has a thermal conductivity (W/(m·K)) greater than one selected from the group: 0.2, 0.5, 0.7, 1, 3, 5, 50, 100, 120, 180, 237, 300, and 400. In another embodiment, a frame supporting the film-based lightguide (such as one that holds tension in the film to maintain flatness) is a thermal transfer element. In one embodiment, the light source is an LED and the LED is thermally coupled to the ballast or frame that is a thermal transfer element. In a further embodiment, a frame or ballast used to thermally transfer heat away from the light source and is also a housing for the light emitting device.

In one embodiment, a light emitting device comprises a thermal transfer element thermally coupled to one or more light sources, wherein heat is conducted from the one or more light sources into the thermal transfer element wherein it is subsequently transferred to a second thermal transfer element or element, or is dissipated through one or more surfaces of the thermal transfer element to the environment. In one embodiment, all or a portion of the thermal transfer element can be formed (or positioned) along the side of the one or more light sources and bent, extruded, or formed such that a portion of the thermal transfer element extends along one or multiple sides of the optical coupling systems (which may include one or more light redirecting elements, light collimating optical elements, coupling lightguides). In one embodiment, the one or more light sources are positioned between a light input surface formed by the stacked ends of coupling lightguides and the thermal transfer element, wherein the thermal transfer element has a first dimension behind the one or more light sources in a direction opposite the optical axis of the one or more light sources, has a second dimension in a direction orthogonal to the direction of the optical axis of the one or more light sources and the thickness direction of the stacked coupling lightguides, and extends a third dimension alongside the one or more light sources in a direction parallel to the optical axis of the one or more light sources past the one or more light sources (and optionally past the light input surface of the stack of coupling lightguides). In one embodiment, the first dimension is less than one selected from the group: 20, 15, 10, 8, 6, 4, 3, and 2 millimeters. In another embodiment, the second dimension is greater than one selected from the group 2, 4, 6, 8, 10, 15, and 20 millimeters. In one embodiment, the third dimension is greater than one or more selected from the group: 2, 4, 6, 8, 10, 15, and 20 millimeters; the first dimension; the second dimension; the thickness of the one or more light sources; 2%, 5%, 10%, and 20% of the length the coupling lightguides in the direction parallel to the optical axis of the one or more light sources. In one embodiment, the average thickness of the thermal transfer element in the direction parallel to the thickness direction of the coupling lightguides in the stack of coupling lightguides is one or more selected from the group: less than 2, 4, 6, 8, 10, 15, and 20 millimeters; less than 50%, 75%, 100%, 150%, 200%, or 300% of the thickness of the light input surface of the stacked coupling lightguides; less than 50%, 75%, 100%, 150%, 200%, or 300% of the thickness of the dimension of the one or more light sources in the thickness direction of the coupling lightguides in the stack of coupling lightguides. In one embodiment, the thermal transfer element extends alongside one, two, three, or four sides of the stacked coupling lightguides. In one embodiment, the extended region of the thermal transfer element in a direction parallel to the optical axis of the light from the one or more light sources mates with a cavity, opening, or fastener of a relative position maintaining element, housing, or holder, which aligns the one or more light sources in one or more directions selected from the group: the thickness direction of the coupling lightguides in the stack of coupling lightguides, the direction of the optical axis of the one or more light sources, the direction orthogonal to the thickness direction and the direction of the optical axis of the one or more light sources.

In one embodiment, a light emitting device, such as a light emitting display, comprises a light emitting area of a film-based lightguide frontlight positioned between a cover lens and/or touchscreen substrate or panel and a reflective spatial light modulator. In one embodiment, the cover lens and/or touchscreen substrate extends past a lateral edge of the reflective spatial light modulator (such as the edge a reflective LCD), and a housing, holder, and/or mechanical fastener is positioned below the cover lens and/or touchscreen substrate (in the thickness direction of the film of the film-based lightguide frontlight) and along one or more sides (lateral edges) of the reflective spatial light modulator (such as adjacent an edge of a reflective LCD and below a cover lens comprising a touchscreen layer). In one embodiment, at least a portion of the housing, holder, and/or mechanical fastener is positioned in an edge region defined between the lower surface of the cover lens and/or touchscreen substrate (in the thickness direction of the film of the film-based lightguide frontlight) and the lower surface of the reflective spatial light modulator, and between a lateral edge of the reflective spatial light modulator and a distance from the lateral edge of the reflective spatial light modulator in a first direction in a plane orthogonal to the thickness direction equal to the distance the cover lens and/or touchscreen substrate extends past the lateral edge in the first direction. In one embodiment, the at least a portion of the housing, holder, and/or mechanical fastener positioned in an edge region comprises all or a portion of one or more of the following elements: relative position maintaining element; one or more light sources positioned to emit light that propagates into a light input surface comprising a stack of coupling lightguides; a light redirecting optical element; a light collimating optical element; a printed circuit board comprising electrical components for the light source, display (such as display drivers), touchscreen, and/or microprocessor; a flexible printed circuit comprising electrical components for the light source, display (such as display drivers), touchscreen, and/or microprocessor; and thermal transfer element or heatsink thermally coupled to one or more light sources, electrical heat-dissipating elements, microprocessors, and/or display drivers. In one embodiment, a heatsinking method can be used for a film lightguide where one or more LEDs are placed at the end of the coupling system. In this configuration a metal heat sink can be formed along the side of the light source and bent or extruded along one or multiple sides of the optical coupling system. This transfers the heat away from the light source yet still maintains an overall compact form for the system.

Low Contact Area Cover

In one embodiment, a low contact area cover is disposed between at least one coupling lightguide and the exterior to the light emitting device. The low contact area cover or wrap provides a low surface area of contact with a region of the lightguide or a coupling lightguide and may further provide at least one selected from the group: protection from fingerprints, protection from dust or air contaminants, protection from moisture, protection from internal or external objects that would decouple or absorb more light than the low contact area cover when in contact in one or more regions with one or more coupling lightguides, provide a means for holding or including at least one coupling lightguide, hold the relative position of one or more coupling lightguides, reflect light back through the lightguide, and prevent the coupling lightguides from unfolding into a larger volume or contact with a surface that could de-couple or absorb light. In one embodiment, the low contact area cover is disposed substantially around one or more coupling lightguide stacks or arrays and provides one or more of the functions selected from the group: reducing the dust buildup on the coupling lightguides, protecting one or more coupling lightguides from frustrated total internal reflection or absorption by contact with another light transmitting or absorbing material, and preventing or limiting scratches, cuts, dents, or deformities from physical contact with other components or assemblers and/or users of the device. In another embodiment, the low contact area cover or wrap is disposed substantially around the light emitting device. In one embodiment the low contact area cover is a film with at least one of a lower refractive index than the refractive index of the outer material of the coupling lightguide disposed near the low contact area cover, and a surface relief pattern or structure on the surface of the film-based low contact area cover disposed near at least one coupling lightguide.

Cladding Layer

In one embodiment, at least one of the light input coupler, coupling lightguide, light mixing region, lightguide region, and lightguide includes a cladding layer optically coupled to at least one surface. A cladding region, as used herein, is a layer optically coupled to a surface wherein the cladding layer includes a material with a refractive index, $n_{clad}$, less than the refractive index of the material, $n_m$, of the surface to which it is optically coupled. In a one embodiment, the average thickness of one or both cladding layers of the lightguide is less than one selected from the group: 100 microns, 60 microns, 30 microns, 20 microns, 10 microns, 6 microns, 4 microns, 2 microns, 1 micron, 0.8 microns, 0.5 microns, 0.3 microns, and 0.1 microns. In one embodiment, the cladding layer includes an adhesive such as a silicone-based adhesive, acrylate-based adhesive, epoxy, radiation curable adhesive, UV curable adhesive, or other light transmitting adhesive. Fluoropolymer materials may be used as a low refractive index cladding material. In one embodiment, the cladding region is optically coupled to one or more of the following: a lightguide, a lightguide region, a light mixing region, one surface of the lightguide, two surfaces of the lightguide, a light input coupler, coupling lightguides, and an outer surface of the film. In another embodiment, the cladding is disposed in optical contact with the lightguide, the lightguide region, or a layer or layers optically coupled to the lightguide and the cladding material is not disposed on one or more coupling lightguides.

In one embodiment, the cladding is one selected from the group: methyl-based silicone pressure sensitive adhesive, fluoropolymer material (applied using a coating including a fluoropolymer substantially dissolved in a solvent), and a fluoropolymer film. The cladding layer may be incorporated to provide a separation layer between the core or core part of a lightguide region and the outer surface to reduce undesirable out-coupling (for example, frustrated totally internally reflected light by touching the film with an oily finger) from the core or core region of a lightguide. Components or objects such as additional films, layers, objects, fingers, dust etc. that come in contact or optical contact directly with a core or core region of a lightguide may couple light out of the lightguide, absorb light or transfer the totally internally reflected light into a new layer. By adding a cladding layer with a lower refractive index than the core, a portion of the light will totally internally reflect at the core-cladding layer interface. Cladding layers may also be used to provide the benefit of at least one of increased rigidity, increased flexural modulus, increased impact resistance, anti-glare properties, provide an intermediate layer for combining with other layers such as in the case of a cladding functioning as a tie layer or a base or substrate for an anti-reflection coating, a substrate for an optical component such as a polarizer, liquid crystal material, increased scratch resistance, provide additional functionality (such as a low-tack adhesive to bond the lightguide region to another element, a window "cling type" film such as a highly plasticized PVC). The cladding layer may be an adhesive, such as a low refractive index silicone adhesive which is optically coupled to another element of the device, the lightguide, the lightguide region, the light mixing region, the light input coupler, or a combination of one or more of the aforementioned elements or regions. In one embodiment, a cladding layer is optically coupled to a rear polarizer in a backlit liquid crystal display. In another embodiment, the cladding layer is optically coupled to a polarizer or outer surface of a front-lit display such as an electrophoretic display, e-book display, e-reader display, MEMs type display, electronic paper displays such as E-ink® display by E Ink Corporation, reflective or partially reflective LCD display, cholesteric display, or other display capable of being illuminated from the front. In another embodiment, the cladding layer is an adhesive that bonds the lightguide or lightguide region to a component such as a substrate (glass or polymer), optical element (such as a polarizer, retarder film, diffuser film, brightness enhancement film, protective film (such as a protective polycarbonate film), the light input coupler, coupling lightguides, or other element of the light emitting device. In one embodiment, the cladding layer is separated from the lightguide or lightguide region core layer by at least one additional layer or adhesive. In one embodiment, the cladding region is optically coupled to one or more surfaces of the light mixing region to prevent out-coupling of light from the lightguide when it is in contact with another component. In this embodiment, the cladding also enables the cladding and light mixing region to be physically coupled to another component.

Cladding Location

In one embodiment, the cladding region is optically coupled to at least one selected from the group: lightguide, lightguide region, light mixing region, one surface of the lightguide, two surfaces of the lightguide, light input coupler, coupling lightguides, and an outer surface of the film. In another embodiment, the cladding is disposed in optical contact with the lightguide, lightguide region, or layer or layers optically coupled to the lightguide and the cladding material is not disposed on one or more coupling lightguides. In a one embodiment, the average thickness of one or both cladding layers of the lightguide is less than one selected from the group: 100 microns, 60 microns, 30 microns, 20 microns, 10 microns, 6 microns, 4 microns, 2 microns, 1 micron, 0.8 microns, 0.5 microns, 0.3 microns, and 0.1 microns.

Layers or Regions on Opposite Sides of the Lightguide of Materials with Higher and Lower Refractive Indexes In one embodiment, a light emitting region of the film-based lightguide comprises: a first layer or coating of a first material with a first refractive index optically coupled to a first surface of the film-based lightguide in the light emitting region, a second layer or coating of a second material with a second refractive index optically coupled to the opposite surface of the film-based lightguide in the light emitting region, the second refractive index higher than the first refractive index, the second refractive index and the first refractive index less than the refractive index of the material in the core region of the lightguide. In this embodiment, light propagating within the core layer or region of the film-based lightguide in the light emitting region that undergoes a low angle light redirection, such as by a low angle directing feature, will preferentially leak or exit the lightguide on the side with the second refractive index since it is higher than the first refractive index and the critical angle is higher. In this embodiment, light deviating from angles higher than the critical angle to smaller angles from the thickness direction of the film will first pass the total internal reflection interface on the side of the core layer or region optically coupled to the cladding layer or region with the higher refractive index.

Lightguide Configuration and Properties

In one embodiment, the thickness of the film, light redirecting optical element, reflective display, lightguide, and/or lightguide region is within a range of 0.005 mm to 0.5 mm. In another embodiment, the thickness of the film or lightguide is within a range of 0.025 mm (0.001 inches) to 0.5 mm (0.02 inches). In a further embodiment, the thickness of the film, lightguide and/or lightguide region is within a range of 0.050 mm to 0.175 mm. In one embodiment, the thickness of the film, lightguide or lightguide region is less than 0.2 mm or less than 0.5 mm. In one embodiment, one or more of a thickness, a largest thickness, an average thickness, a greater than 90% of the entire thickness of the film, a lightguide, and a lightguide region is less than 0.2 millimeters. In one embodiment, the core material of the lightguide has a higher refractive index than the cladding material. In one embodiment, the core is formed from a material with a refractive index ($n_D$) greater than one selected from the group: 1.3, 1.4, 1.5, 1.6, 1.7, 1.8, 1.9, 2.0, 2.1, 2.2, 2.3, 2.4, 2.5, 2.6, 2.7, 2.8, 2.9, and 3.0. In another embodiment, the refractive index ($n_D$) of the cladding material is less than one selected from the group: 1.1, 1.2, 1.3, 1.4, 1.5, 1.6, 1.7, 1.8, 1.9, 2.0, 2.1, 2.2, 2.3, 2.4, and 2.5.

Edges of the Lightguide

In one embodiment, the edges of the lightguide or lightguide region are coated, bonded to, or disposed adjacent to a specularly reflecting material, partially diffusely reflecting material, or diffuse reflecting material. In one embodiment, the lightguide edges are coated with a specularly reflecting ink including nano-sized or micron-sized particles or flakes which reflect the light substantially specularly. In another embodiment, a light reflecting element (such as a specularly reflecting multi-layer polymer film with high reflectivity) is disposed near the lightguide edge and is disposed to receive light from the edge and reflect it and direct it back into the lightguide. In another embodiment, the lightguide edges are rounded and the percentage of light diffracted from the edge is reduced. One method of achieving rounded edges is by using a laser to cut the lightguide from a film and achieve edge rounding through control of the processing parameters (speed of cut, frequency of cut, laser power, etc.). In another embodiment, the edges of the lightguide are tapered, angled, serrated, or otherwise cut or formed such that light from a light source propagating within the coupling lightguide reflects from the edge such that it is directed into an angle closer to the optical axis of the light source, toward a folded region, toward a bent region, toward a lightguide, toward a lightguide region, or toward the optical axis of the light emitting device. In a further embodiment, two or more light sources are disposed to each couple light into two or more coupling lightguides including light re-directing regions for each of the two or more light sources that include first and second reflective surfaces which direct a portion of light from the light source into an angle closer to the optical axis of the light source, toward a folded or bent region, toward a lightguide region, toward a lightguide region, or toward the optical axis of the light emitting device. In one embodiment, one or more edges of the coupling lightguides, the lightguide, the light mixing region, or the lightguide region include a curve or arcuate profile in the region of intersection between two or more surfaces of the film in a region.

Shape of the Lightguide

In one embodiment, at least a portion of the lightguide shape or lightguide surface is substantially planar, curved, cylindrical, a formed shape from a substantially planar film, spherical, partially spherical, angled, twisted, rounded, have a quadric surface, spheroid, cuboid, parallelepiped, triangular prism, rectangular prism, ellipsoid, ovoid, cone pyramid, tapered triangular prism, wave-like shape, and/or other known suitable geometrical solids or shapes. In one embodiment, the lightguide is a film formed into a shape by thermoforming or other suitable forming techniques. In another embodiment, the film or region of the film is tapered in at least one direction. In a further embodiment, a light emitting device includes a plurality of lightguides and a plurality of light sources physically coupled or arranged together (such as tiled in a 1×2 array for example). In another embodiment, the surface of the lightguide region of the film is substantially in the shape of a polygon, triangle, rectangle, square, trapezoid, diamond, ellipse, circle, semicircle, segment or sector of a circle, crescent, oval, annulus, alphanumeric character shaped (such as "U-shaped" or "T-shaped), or a combination of one or more of the aforementioned shapes. In another embodiment, the shape of the lightguide region of the film is substantially in the shape of a polyhedron, toroidal polyhedron, curved polyhedron, spherical polyhedron, rectangular cuboid, cuboid, cube, orthotope, stellation, prism, pyramid, cylinder, cone, truncated cone, ellipsoid, paraboloid, hyperboloid, sphere, or a combination of one or more of the aforementioned shapes.

Thickness of the Lightguide

In one embodiment, the thickness of the film, lightguide, lightguide region, and/or light emitting region is within a range of 0.005 mm to 0.5 mm. In one embodiment, a light emitting device includes a lightguide or lightguide region formed from at least one light transmitting material. In one embodiment, the lightguide is a film includes at least one core region and at least one cladding region, each including at least one light transmitting material. In one embodiment, the light transmitting material is a thermoplastic, thermoset, rubber, polymer, high transmission silicone, glass, composite, alloy, blend, silicone, or other suitable light transmitting material, or a combination thereof. In one embodiment, a component or region of the light emitting device includes a suitable light transmitting material, such as one or more of the following: cellulose derivatives (e.g., cellulose ethers such as ethylcellulose and cyanoethylcellulose, cellulose esters such as cellulose acetate), acrylic resins, styrenic resins (e.g., polystyrene), polyvinyl-series resins [e.g., poly (vinyl ester) such as poly(vinyl acetate), poly(vinyl halide) such as poly(vinyl chloride), polyvinyl alkyl ethers or polyether-series resins such as poly(vinyl methyl ether), poly(vinyl isobutyl ether) and poly(vinyl t-butyl ether)], polycarbonate-series resins (e.g., aromatic polycarbonates such as bisphenol A-type polycarbonate), polyester-series resins (e.g., homopolyesters, for example, polyalkylene terephthalates such as polyethylene terephthalate and polybutylene terephthalate, polyalkylene naphthalates corresponding to the polyalkylene terephthalates; copolyesters including an alkylene terephthalate and/or alkylene naphthalate as a main component; homopolymers of lactones such as polycaprolactone), polyamide-series resin (e.g., nylon 6, nylon 66, nylon 610), urethane-series resins (e.g., thermoplastic polyurethane resins), copolymers of monomers forming the above resins [e.g., styrenic copolymers such as methyl methacrylate-styrene copolymer (MS resin), acrylonitrile-styrene copolymer (AS resin), styrene-(meth)acrylic acid copolymer, styrene-maleic anhydride copolymer and styrene-butadiene copolymer, vinyl acetate-vinyl chloride copolymer, vinyl alkyl ether-maleic anhydride copolymer]. Incidentally, the copolymer may be whichever of a random copolymer, a block copolymer, or a graft copolymer.

Light Extraction Method

In one embodiment, one or more of the lightguide, the lightguide region, and the light emitting region includes at least one light extraction feature or region. In one embodiment, the light extraction region may be a raised or recessed surface pattern or a volumetric region. Raised and recessed surface patterns include, without limitation, scattering material, raised lenses, scattering surfaces, pits, grooves, surface modulations, microlenses, lenses, diffractive surface features, holographic surface features, photonic bandgap features, wavelength conversion materials, holes, edges of layers (such as regions where the cladding is removed from covering the core layer), pyramid shapes, prism shapes, and other geometrical shapes with flat surfaces, curved surfaces, random surfaces, quasi-random surfaces, and combinations thereof. The volumetric scattering regions within the light extraction region may include dispersed phase domains, voids, absence of other materials or regions (gaps, holes), air gaps, boundaries between layers and regions, and other refractive index discontinuities or inhomogeneities within the volume of the material different that co-planar layers with parallel interfacial surfaces.

In one embodiment, the light extraction feature is substantially directional and includes one or more of the following: an angled surface feature, a curved surface feature, a rough surface feature, a random surface feature, an asymmetric surface feature, a scribed surface feature, a cut surface feature, a non-planar surface feature, a stamped surface feature, a molded surface feature, a compression molded surface feature, a thermoformed surface feature, a milled surface feature, an extruded mixture, a blended materials, an alloy of materials, a composite of symmetric or asymmetrically shaped materials, a laser ablated surface feature, an embossed surface feature, a coated surface feature, an injection molded surface feature, an extruded surface feature, and one of the aforementioned features disposed in the volume of the lightguide. For example, in one embodiment, the directional light extraction feature is a 100 micron long, 45 degree angled facet groove formed by UV cured embossing a coating on the lightguide film that substantially directs a portion of the incident light within the lightguide toward 0 degrees from the surface normal of the lightguide.

In one embodiment, the light extraction feature is a specularly, diffusive, or a combination thereof reflective material. In another embodiment, the fill factor of the light extracting features, light turning features, or low angle directing features defined as the percentage of the area comprising the features in a square centimeter in a light emitting region, surface or layer of the lightguide or film, is one selected from the group of less than 80%, less than 70%, less than 60%, less than 50%, less than 40%, less than 30%, less than 20%, and less than 10%.

In one embodiment, the lightguide or lightguide region comprises light extraction features in a plurality of regions. In one embodiment, the lightguide or lightguide region comprises light extraction features on or within at least one selected from the group of one outer surface, two outer surfaces, two outer and opposite surfaces, an outer surface and at least one region disposed between the two outer surfaces, within two different volumetric regions substantially within two different volumetric planes parallel to at least one outer surface or light emitting surface or plane, within a plurality of volumetric planes. In another embodiment, a light emitting device comprises a light emitting region on the lightguide region of a lightguide comprising more than one region of light extraction features.

In one embodiment, a first lightguide including a film layer comprises light extraction features, a second lightguide is defined by a surface of a light redirecting optical element and a surface of the first lightguide, and the light redirecting optical element comprises light redirecting features or light turning features that are also light extraction features for the second lightguide.

In a further embodiment, the light extraction features are grooves, indentations, curved, or angled features that redirect a portion of light incident in a first direction to a second direction within the same plane through total internal reflection. In another embodiment, the light extraction features redirect a first portion of light incident at a first angle into a second angle greater than the critical angle in a first output plane and increase the angular full width at half maximum intensity in a second output plane orthogonal to the first. In a further embodiment, the light extraction feature is a region comprising a groove, indentation, curved or angled feature and further comprises a substantially symmetric or isotropic light scattering region of material such as dispersed voids, beads, microspheres, substantially spherical domains, or a collection of randomly shaped domains wherein the average scattering profile is substantially symmetric or isotropic. In a further embodiment, the light extraction feature is a region comprising a groove, indentation, curved or angled feature and further comprises a substantially anisotropic or asymmetric light scattering region of material such as dispersed elongated voids, stretched beads, asymmetrically shaped ellipsoidal particles, fibers, or a collection of shaped domains wherein the average scattering profile is substantially asymmetric or anisotropic. In one embodiment, the Bidirectional Scattering Distribution Function (BSDF) of the light extraction feature is controlled to create a predetermined light output profile of the light emitting device or light input profile to a light redirecting element.

In one embodiment, at least one light extraction feature is an array, pattern or arrangement of a wavelength conversion material selected from the group of a fluorophore, phosphor, a fluorescent dye, an inorganic phosphor, photonic bandgap material, a quantum dot material, a fluorescent protein, a fusion protein, a fluorophores attached to protein to specific functional groups, quantum dot fluorophores, small molecule fluorophores, aromatic fluorophores, conjugated fluorophores, and a fluorescent dye scintillators, phosphors such as Cadmium sulfide, rare-earth doped phosphor, and other known wavelength conversion materials.

In one embodiment, the light extraction feature is a specularly, diffusive, or a combination thereof reflective material. For example, the light extraction feature may be a substantially specularly reflecting ink disposed at an angle (such as coated onto a groove) or it may be a substantially diffusely reflective ink such as an ink comprising titanium dioxide particles within a methacrylate-based binder (white paint). Alternatively, the light extraction feature may be a partially diffusively reflecting ink such as an ink with small silver particles (micron or sub-micron, spherical or non-spherical, plate-like shaped or non-plate-like shaped, or silver (or aluminum) coated onto flakes) further comprising titanium dioxide particles. In another embodiment, the degree of diffusive reflection is controlled to optimize at least one of the angular output of the device, the degree of collimation of the light output, and the percentage of light extracted from the region.

The pattern or arrangement of light extraction features may vary in size, shape, pitch, location, height, width, depth, shape, orientation, in the x, y, or z directions. Patterns and formulas or equations to assist in the determination of the arrangement to achieve spatial luminance or color uniformity are known in the art of edge-illuminated backlights. In one embodiment, varying the pitch, feature dimension, or density of the low angle directing features in the first and/or second direction enables spatial control of the light flux redirected toward the light turning features wherein the low angle directing features do not cause moiré interference with the object being illuminated by the light emitting device (such as a reflective or transmissive liquid crystal display). Thus, in this example, the pitch of the light turning features can be chosen to be a constant pitch that does not create moiré interference and the luminance uniformity of the light reaching the object of illumination is achieved by spatially varying the pitch, feature dimension, or density of the low angle directing features. In one embodiment, a method of providing uniform illuminance for an object includes providing a plurality of types of light directing features (such as low angle directing features and light turning features) wherein the uniformity is provided by varying the pitch, dimension, or density of a first type of feature and the redirection of light to an angle that escapes the lightguide to illuminate an object (such as a reflective or transmissive LCD) is achieved by a second type of feature with a substantially constant pitch, dimension, and/or density such that the moiré contrast between the light directing features and the object of illumination is less than one selected from the group of 50%, 40%, 30%, 20% and 10%. The low angle directing feature may be formed on a surface or within a volume of material and the material may be thermoplastic, thermoset, or adhesive material. In one embodiment, the low angle directing features are light extraction features. In another embodiment, the low angle directing features are light extraction features for a first lightguide and a second lightguide. In another embodiment, the light emitting device comprises low angle directing features in two or more layers or regions in the direction of the light output of the light emitting device.

Low Angle Directing Features

In one embodiment, at least one of the coupling lightguides, light mixing region, or light emitting region comprises two or more low angle directing features. As used herein, low angle directing features are refractive, total internal reflection, diffractive, or scattering surfaces, features, or interfaces that redirect light propagating within a totally internally reflecting lightguide at a first angle to the thickness direction of the film in the core region of the lightguide to a second angle in the core region of the lightguide smaller than the first angle by an average total angle of deviation of less than 20 degrees. In another embodiment, the low angle directing features redirect incident light to a second angle with an average total angle of deviation less than one selected from the group 18, 16, 14, 12, 10, 8, 6, 5, 4, 3, 2, and 1 degrees from the angle of incidence. In one embodiment, the low angle directing features are defined by one or more reflective surfaces of the reflective spatial light modulator. For example, in one embodiment, the rear reflective surface of a reflective spatial light modulator comprises low angle directing features and the reflective spatial light modulator is optically coupled to the lightguide in the light emitting region. In another example, the reflective pixels of a reflective spatial light modulator are low angle directing features and the reflective spatial light modulator is optically coupled to the lightguide in the light emitting region.

In one embodiment, at least one of the pitch, first dimension of the feature in a first direction perpendicular to the thickness direction of the film, second dimension of the feature in a second direction perpendicular to the first direction and perpendicular to the thickness direction of the film; dimension of the feature in the thickness direction; and density of the features in the first direction and/or second direction varies in the first direction and/or second direction. In one embodiment, the non-uniform pitch, feature dimension, or density is used to direct light to an angle less than the critical angle for one or more interfaces of the core region of the lightguide with a spatially uniform luminous flux such that the light coupling through the cladding layer or region with the higher refractive index than the cladding layer or region on the opposite surface of the core region of the lightguide is incident on one or more light turning features that direct the light to an angular range within thirty degrees from the thickness direction of the lightguide in the light emitting region. In one embodiment, varying the pitch, feature dimension, or density of the low angle directing features in the first and/or second direction enables spatial control of the light flux redirected toward the light turning features wherein the low angle directing features do not cause moiré interference with the object being illuminated by the light emitting device (such as a reflective or transmissive liquid crystal display). Thus, in this example, the pitch of the light turning features can be chosen to be a constant pitch that does not create moiré interference and the luminance uniformity of the light reaching the object of illumination is achieved by spatially varying the pitch, feature dimension, or density of the low angle directing features. In one embodiment, a method of providing uniform illuminance for an object includes providing a plurality of types of light directing features (such as low angle directing features and light turning features) wherein the uniformity is provided by varying the pitch, dimension, or density of a first type of feature and the redirection of light to an angle that escapes the lightguide to illuminate an object (such as a reflective or transmissive LCD) is achieved by a second type of feature with a substantially constant pitch, dimension, and/or density such that the moiré contrast between the light directing features and the object of illumination is less than one selected from the group of 50%, 40%, 30%, 20% and 10%. The low angle directing feature may be formed on a surface or within a volume of material and the material may be thermoplastic, thermoset, or adhesive material. In one embodiment, the low angle directing features are light extraction features. In a further embodiment, the light redirecting features are low angle directing features. In another embodiment, the low angle directing features are light extraction features for a first lightguide and a second lightguide. In another embodiment, the light emitting device comprises low angle directing features in two or more layers or regions in the direction of the light output of the light emitting device.

In one embodiment, the light redirecting element has a refractive index less than or equal to the refractive index of the core layer of the film-based lightguide. For example, in one embodiment a reflective display comprises a frontlight having a light redirecting element formed in a polycarbonate material with a refractive index of about 1.6 that is optically coupled to a polycarbonate lightguide with a refractive index of about 1.6 using an adhesive functioning as a cladding layer with a refractive index of about 1.5 where the lightguide comprises low angle directing features that are light extracting features for the film-based lightguide and the lightguide is optically coupled to a reflective spatial light modulator on a side opposite the light redirecting optical element using an adhesive that functions as a cladding with a refractive index of about 1.42.

Reflecting Low Angle Directing Features

In one embodiment, a film-based lightguide comprises a light emitting region with low angle directing features defined by angled or curved interfaces between materials with two different refractive indexes. In this embodiment, the refractive index difference can cause at least a portion of the incident light to be reflected with an average total angle of deviation less than 20 degrees from the angle of incidence. In one embodiment, light propagating within a core region of a lightguide of a first core material with a first core refractive index adjacent a region with a second refractive index less than the first refractive index interacts and reflects from angled surface features embossed into the first core material such that at least a portion of the incident light is reflected with an average total angle of deviation less than 20 degrees from the angle of incidence. In one embodiment, the reflection at the angled or curved surface feature is a total internal reflection. In another example, a film-based lightguide comprises a light emitting region with low angle directing features defined by an arrangement of surfaces wherein light passing through the surface is refracted (and optionally reflected) at least once to a new angle with an average total angle of deviation less than 20 degrees from the angle of incidence. In another embodiment, a film-based lightguide comprises a light emitting region with low angle directing features defined by an arrangement of diffractive features or surfaces wherein light passing through the features or surfaces is diffracted (and optionally reflected) at least once to a new angle with an average total angle of deviation less than 20 degrees from the angle of incidence.

Scattering Low Angle Directing Features

In a further example, a film-based lightguide comprises a light emitting region with low angle directing features defined by a layer or region with light scattering features, domains, or particles wherein light passing through the light scattering layer or region is scattered at least once to a new angle with an average total angle of deviation less than 20, 15, 10, 8, 6, 4, 3, 2, or 1 degrees from the angle of incidence. In one embodiment, the light scattering layer or region can be formed adjacent, above, below, or within a region of the core layer of material. In this example, the light scattering layer or region may comprise or be defined by a light scattering interface with a regular or irregular surface structure on a first material with a first refractive index in contact with a second surface of a second material conforming to the first material surface with a lower or higher refractive index than the first material such that a portion of the light incident on the interface is scattered (forward and/or back scattering) such that it escapes the lightguide at a surface interface and is subsequently redirected by light turning features. In another embodiment, the film-based lightguide comprises low angle scattering features defined by a dispersed phase of a first material in a second matrix material (such as dispersed beads within a coating matrix). In this embodiment, the light incident scatters or refracts from one or more domain-matrix interfaces such that the average total angle of deviation of the incident light is less than 20 degrees from the angle of incidence. In one embodiment, the low angle directing features progressively redirect light such that the light is deviated into an angle such that all or a portion of the light escapes the total internal reflection condition within the lightguide. In one embodiment, the low angle directing features redirect light with a first polarization more than light with a second polarization different than the first polarization. In another embodiment, the ratio of the percentage of the light with the first polarization that is redirected to the percentage of light with the second polarization that is redirected, the polarization directing ratio, is greater than one selected from the group: 1, 2, 3, 4, 5, 10, 15, 20, 30, and 50.

Light Turning Features

In one embodiment, the light emitting region of the lightguide comprises or is optically coupled to a layer, region, or film with light turning features. As used herein, light turning features are refractive, total internal reflection, diffractive, or scattering surfaces, features, or interfaces that redirect at least a portion of light incident within a first angular range to a second angular range different from the first, wherein the second angular range is within 30 degrees from the thickness direction of the film in the light emitting region. For example, in one embodiment, a polycarbonate film with grooves on a first outer surface is optically coupled to a film-based lightguide using a pressure sensitive adhesive on the second surface of the polycarbonate film opposite the first outer surface. In this embodiment, light escaping the lightguide (such as by low angle directing features) through the pressure sensitive adhesive totally internally reflects at the groove-air interface in the polycarbonate film and is directed to an angle within 30 degrees from the thickness direction of the film in the light emitting region where it further passes through the lightguide to illuminate an object, such as a reflective LCD, and may optionally pass back through the lightguide. In one embodiment, the light turning features receive light from the low angle directing features and redirect the light into an angle less than 30 degrees from the thickness direction in the light emitting region. The light turning feature may be formed on a surface or within a volume of material and the material may be thermoplastic, thermoset, or adhesive material. In one embodiment, the light turning features are embossed (UV cured or thermomechanically embossed) surface features in a light turning film that is optically coupled (such as by using a pressure sensitive adhesive) to the film-based lightguide in the light emitting region. In one embodiment, a light turning film comprising light turning features on a first surface of the film is optically coupled to the lightguide on the second surface opposite the first surface, the light turning features comprise recessed regions or grooves in the first surface, and the first surface is adhered to a second film in regions between the recessed regions or grooves using a pressure sensitive adhesive that leaves an air gap in the recessed region or grooves. In this embodiment, the large refractive index difference between the polymer light turning film or layer and the air within the recessed region or grooves increases the percentage of totally internally reflected light at the interface over that of an adhesive that effectively planarizes the surface by filing in the recessed regions or grooves with the adhesive. In another embodiment, the light turning film or region or layer comprising the light turning features extends into less than one selected from the group of 30%, 20%, 10%, and 5% of the light mixing region of the film-based lightguide.

In one embodiment, the light turning film comprises light turning features on the surface opposite the film-based lightguide, and the reflective display comprises an adhesive layer (such as a pressure sensitive adhesive layer, structural adhesive, or a reactive adhesive layer) between the light turning film and a protective film or cover layer (which may include a touchscreen film or substrate, cover glass or plastic lens, hardcoated protective film, for example). With some thick pressure sensitive adhesives, the adhesive may flow into the air gap region defined by the light turning feature, thus reducing the area that totally internally reflects light and possibly allowing stray light to be redirected at undesired angles. In one embodiment, the flow of the adhesive on to a surface of the light turning feature is reduced by reducing the thickness of the adhesive. In one embodiment, the adhesive between the light turning film and protective film or layer has a thickness selected from the group: less than or equal to 100, 75, 50, 40, 30, 20, or 10 micrometers; less than or equal to 25%, 50%, 75%, 100%, 150%, or 200% of the average thickness of the light turning features in the thickness direction of the light turning film; and less than or equal to 25%, 50%, 75%, 100%, 150%, or 200% of the average thickness of the light turning film. In one embodiment, the adhesive between the light turning film and protective film or layer has a thickness selected from the group: greater than or equal to 100, 75, 50, 40, 30, 20, or 10 micrometers; greater than or equal to 25%, 50%, 75%, 100%, 150%, or 200% of the average thickness of the light turning features in the thickness direction of the light turning film; and greater than or equal to 25%, 50%, 75%, 100%, 150%, or 200% of the average thickness of the light turning film. In one embodiment, the kinematic viscosity of the adhesive is greater than 2,000, 5,000, 10,000, 50,000, 70,000, and 100,000 centistokes measured using a Ford viscosity cups at 25 degrees Celsius according to ANSI D1200-10. In one embodiment, the degree of crosslinking of the adhesive is evaluated using the gel swell ratio according to ASTM F2214-02 and the swell ratio of the adhesive is less than one selected from the group: 6, 5, 4, 3, 2, and 1.5. In one embodiment, the surface energy of one or more surfaces of the light turning film is greater than one selected from the group: 15, 30, 50, 100, 200, 500, 1,000, 2,000. In one embodiment, the surface of the light turning film on the side of the light turning film opposite the film-based lightguide (such as the side whereupon a pressure sensitive adhesive is used to bond the light turning film to a protective or cover layer), is treated (such as by corona treating or plasma treating) to increase the surface energy. In one embodiment, one or more surfaces of the light turning film are coated with a tie layer, primer, or coating to promote adhesion with the adhesive. In one embodiment, the aforementioned coating has an average thickness less than 25, 15, 10, 5, 4, 3, 2, or 1 micrometers. In one embodiment, the adhesive has a peel adhesion strength greater than 4, 6, 8, 10, 15, 20, 25, and 30 Newtons per 25 millimeters to the surface of the light turning film (or a coating or layer thereon) and/or a surface of the film-based lightguide measured according to ASTM D3330-00 test method A (180 degree peel). In one embodiment, a first cladding layer is disposed on a first side of the film-based lightguide and a second cladding layer is positioned on the second side of the film-based lightguide opposite the first side and positioned between the second side of the film-based lightguide and a first side of the light turning film. In this embodiment, the first cladding layer and/or the second cladding layer may be an adhesive (such as a pressure sensitive adhesive). In this embodiment, the first cladding layer has a refractive index, $n_{D(C1)}$ and a protective layer, lens, or cover is adhered using a third adhesive (which may be a pressure sensitive adhesive) to the light turning film on a second side of the light turning film opposite the first side of the light turning film. In this embodiment, the refractive index of the third adhesive is less than or equal to the refractive index of the first cladding layer at the sodium wavelength. In one embodiment, the adhesive adhering the light turning film or layer to a cover, lens, or protective film is in contact with an average of less than 40%, 30%, 20%, 15%, and 10% of the surface of the first angled surface and/or second angled surface of the light turning features evaluated in cross-section by freeze fracturing and a scanning electron microscope. The adhesive may be in contact on the side of the light turning film surface and extend along part of a surface of the first and/or second angled facet of the light turning feature toward the film-based lightguide.

In one embodiment, the light turning film is formed by coating or casting a first material on a surface of the film-based lightguide and thermally and/or radiation embossing and/or photo-curing (such as by UV exposure) the first material in contact with surface relief features opposite the light turning features to form the light turning features in the coating of the first material. In this embodiment, the light turning film or layer formed directly on the film-based lightguide may not require a separate adhesive layer between the film-based lightguide and a light turning film. Thus, in this embodiment, an additional layer (the adhesive layer) may be effectively removed by directly embossing a coating or cast material on the film-based lightguide instead of using a separately extruded or coated film adhered to the film-based lightguide using an adhesive. In this embodiment, the first material may be coated or casted in the light emitting region of the lightguide, may be coated or casted in the light emitting region and all or a portion of the light mixing region of the lightguide, and/or may be coated or casted in regions of the film-based lightguide outside of the coupling lightguide region (where the coupling lightguide region is the region of the film-based lightguide comprising the coupling lightguides or the region of the film-based lightguide corresponding to where the coupling lightguides will be formed). In one embodiment, the first material is a pressure sensitive adhesive and the thickness of the first material reduces in thickness away from the light emitting region of the lightguide and/or away from light mixing region toward the coupling lightguide region. In one embodiment, the average thickness of the coated or casted first material is greater than one selected from the group: 10, 20, 30, 40, and 50 micrometers in the light emitting region and less than one selected from the group 10, 5, 4, 2, and 1 micrometers in the coupling lightguide region of the film-based lightguide. In one embodiment, the first material is coated on all or a portion of the coupling lightguide region, light mixing, and/or light emitting region, and all or a portion of the first material is removed from all or a portion of the light mixing region and/or coupling lightguide region after casting and/or curing the first material to form the light turning features. In one embodiment, one or more of the first cladding layer, second cladding layer, or adhesive layer comprises a UV curable pressure sensitive adhesive of the type selected from the group: acrylic urethane, cationic epoxy-functional liquid rubber that is UV-curable, acrylic polymer/monomers syrups, acrylic polymers with grafted photo-initiator, oligomer that is acrylated, and styrenic block co-polymers that are UV curable.

In one embodiment, the light turning features comprise a region (such as an angled planar region) of low refractive index material (such as a material with a refractive index less than the material around the angled planar region or a material with a refractive index less than the refractive index of the layer of the light turning film comprising surface relief features) oriented at an angle with higher refractive index material(s) on either side of the low refractive index material in the region of the film or layer comprising the light turning feature. In some embodiments, effectively removing the refractive index difference (or reducing or minimizing the refractive index difference to less than 0.001, for example) along a near vertical angled surface opposite a designed angle surface for the light turning feature reduces the stray light, reduces extraneous reflections or refractions, and/or increases display spatial contrast. In one embodiment, angled surface relief features are formed in a film or layer of a first material and the surface of the film or coating comprising the surface relief features is coated at an angle with a second material forming light turning features of a low refractive index material along at least a portion of the angled surface relief features such that a portion of the light turning feature is not coated due to a shadow from the angled exposure. In this embodiment, the cavity of the resulting surface relief feature may be filled-in to form the light turning features comprising an angled (optionally planar) low refractive index region between two higher refractive index regions. In one embodiment, an organic vapor phase deposition process is used to coat at an angle a thin film of organic low refractive index material onto at least a portion of the surface relief features (such as an angled surface), such that a shadow area is created without the coating of the organic low refractive index material (or with an organic refractive index material coating thickness less than 1 micrometer). In another embodiment, an organic vapor jet printing process is used to coat at an angle a thin film of organic low refractive index material through one or more nozzles onto the surface relief features, such that a shadow area is created without the coating of the organic low refractive index material (or with an organic refractive index material coating thickness less than 1 micrometer). In one embodiment, the angle of the coating of the low refractive index material relative to the portions of the surface substantially planar (or relative to a direction of the film or coating perpendicular to the thickness direction of the film or coating) is one or more selected from the group: the same as the angle of the angled surface of the angled surface feature; within 5 degrees from the angle of the angled surface of the angled surface feature; within 10 degrees from the angle of the angled surface of the angled surface feature; between 5 and 50 degrees; between 10 and 45 degrees; between 20 and 40 degrees; between 30 and 45 degrees; greater than 5 degrees; greater than 20 degrees; greater than 30 degrees; and greater than 35 degrees.

In one embodiment, angled surface relief features are formed in a film or layer of a first material with surface energy less than one selected from the group: 100, 50, 40, 30, 20, and 10 and the surface of the film or coating comprising the angled surface relief features is exposed at an angle to radiation, gas, and/or coating of material with a surface energy greater than one selected from the group: 50, 100, 200, 500, and 1,000 (or modifies the surface energy of the portion of the surface relief feature such that the surface energy is greater than one selected from the group: 50, 100, 200, 500, and 1,00) such that the surface energy of a portion (such as the angled portion) of the surface relief feature is higher and the surface energy of the shadow portion of the surface relief feature is not substantially increased due to the angled exposure. In this embodiment, the surface relief feature may be subsequently coated or exposed to a deposition of a low refractive index material that wets and bonds to the angled portion due to the increased surface energy and does not substantially bond to the shadow portion of the surface relief feature. This creates an angled low refractive index region or layer. In this embodiment, a planarization or coating layer of a material with a higher refractive index (such as the refractive index of the first material) may be coated on the surface relief features and/or the light turning film or layer to fill in all or a portion of the remaining surface relief feature.

Size and Shape of the Light Turning Features

In one embodiment, a light emitting device comprises the film-based lightguide providing front illumination, such as a frontlight for a reflective display, and the density of the light turning features in the light emitting region of the film (or in a film optically coupled to the light emitting region) is less than about 50% in order to reduce undesired second light deviations (such as unwanted reflections) of the light reflected from the object illuminated and passing back through the lightguide and layer or region comprising the light turning features. In another embodiment, the average depth of the light turning features in the thickness direction of the layer or region of film comprising the light turning features is one or more selected from the group: between 1 and 500 microns, between 3 and 300 microns, between 5 and 200 microns, greater than 2 microns, less than 500 microns, less than 200 microns, less than 100 microns, less than 75 microns, less than 50 microns, and less than 10 microns. In another embodiment, the average width of the light turning features in the direction of light propagation from a first input side of the light emitting region of the lightguide to the opposite side of the light emitting region of the lightguide is one or more selected from the group: between 2 and 500 microns, between 5 and 300 microns, between 10 and 200 microns, greater than 5 microns, less than 500 microns, less than 200 microns, less than 100 microns, less than 75 microns, less than 50 microns, less than 25 microns, and less than 10 microns. In one embodiment, the light turning feature includes one or more of the following: an angled surface feature, a curved surface feature, a rough surface feature, a random surface feature, an asymmetric surface feature, a scribed surface feature, a cut surface feature, a non-planar surface feature, a stamped surface feature, a molded surface feature, a compression molded surface feature, a thermoformed surface feature, a milled surface feature, a composite of symmetric or asymmetrically shaped materials, a laser ablated surface feature, an embossed surface feature, a coated surface feature, an injection molded surface feature, an extruded surface feature, and one of the aforementioned features positioned in the volume of the lightguide.

In one embodiment, a reflective display comprises a light emitting device with a film-based lightguide and a reflective spatial light modulator. In this embodiment, the light emitting device comprises a light redirecting optical element with light redirecting features or light turning features with a dimension in a plane orthogonal to the thickness direction of the film-based lightguide larger than the average size of a pixel of the reflective spatial light modulator or larger than the size of 2, 3, 4, 5, 7, 10, 20, 30, or 50 average size pixels.

Pitch of the Light Turning Features

In one embodiment the average pitch or spacing between the light redirecting features or light turning features is constant. In one embodiment, the average pitch of the light turning features in the direction of light propagation from a first input side of the light emitting region of the lightguide to the opposite side of the light emitting region of the lightguide (such as the direction of the average angle of propagation within the lightguide in the light emitting region, for example) is one or more selected from the group: between 5 and 500 microns, between 10 and 300 microns, between 20 and 200 microns, greater than 5 microns, less than 500 microns, less than 200 microns, less than 100 microns, less than 75 microns, and less than 50 microns.

Polarization Dependent Light Turning Features

In one embodiment, the light turning features redirect light with a first polarization more than light with a second polarization different than the first polarization. In another embodiment, the ratio of the percentage of the light with the first polarization that is redirected to the percentage of light with the second polarization that is redirected, the polarization directing ratio, is greater than one selected from the group: 1, 2, 3, 4, 5, 10, 15, 20, 30, and 50. For example, in one embodiment, the first polarization is s-polarized light and the second polarization is p-polarized light. In one embodiment, the light turning features or surface, or a material optically coupled to the light turning features or surface comprise a substantially isotropic material, a birefringent material, or a trirefringent material. In one embodiment, a structured light turning feature in a birefringent material is used to redirect light of a first polarization such that the average total angle of deviation of the incident light is less than 20 degrees from the angle of incidence. For example, in one embodiment, light from low angle directing features incident on the light turning feature of the first polarization, such as s-polarized light, is directed into an angle from the thickness direction of the film in the light emitting region less than 30 degrees such that it escapes the film-based lightguide in the light emitting region, such as to illuminate a reflective display, and may optionally pass back through the lightguide. Light of the second polarization may pass through the light turning feature and totally internally reflect at an interface further from the core region of the lightguide. In this example, the light of the second polarization may be changed to the first polarization state and be recycled within the lightguide and layers optically coupled to the lightguide. Thus, in this example, light of the desired polarization state, s-polarized light for example, is preferentially directed to an angle such that it can transmit out of the lightguide and layers by the light turning features. The light turning features may directly couple light out of the lightguide without passing back through the core region of the lightguide or the light turning features may direct the light to the opposite side of the lightguide toward an object for front illumination. In another embodiment, one or more layers or region optically coupled to the lightguide comprises a waveplate, birefringent, trirefringent, or anisotropic material that converts light remaining in the lightguide into the desired polarization state such that it can be redirected through a second or subsequent interaction with the polarization dependent light turning feature.

Multiple Lightguides

In one embodiment, a light emitting device includes more than one lightguide to provide one or more of the following: color sequential display, localized dimming backlight, red, green, and blue lightguides, animation effects, multiple messages of different colors, NVIS and daylight mode backlight (one lightguide for NVIS, one lightguide for daylight for example), tiled lightguides or backlights, and large area light emitting devices including smaller light emitting devices. In another embodiment, a light emitting device includes a plurality of lightguides optically coupled to each other. In another embodiment, at least one lightguide or a component thereof includes a region with anti-blocking features such that the lightguides do not substantially couple light directly into each other due to touching. In one embodiment, a light emitting device includes a first lightguide and second lightguide disposed to receive light from a first and second light source, respectively, through two different optical paths wherein the first and second light source emit light of different colors and the light emitting regions of the first and second lightguides include pixelated regions spatially separated in the plane including the light output plane of the light emitting device at the pixelated regions (for example, separated in the thickness direction of the film-based lightguides). In one embodiment, the colors of the first and second pixelated light emitting regions are perceived by a viewer with a visual acuity of 1 arcminute without magnification at a distance of two times the diagonal (or diameter) of the light emitting region to be the additive color of the combination of sub-pixels.

Lightguide Folding Around Components

In one embodiment, at least one selected from the group: lightguide, lightguide region, light mixing region, plurality of lightguides, coupling lightguides, and light input coupler bends or folds such that the component other components of the light emitting device are hidden from view, located behind another component or the light emitting region, or are partially or fully enclosed. These components around which they may bend or fold include components of the light emitting device such as light source, electronics, driver, circuit board, thermal transfer element, spatial light modulator, display, housing, holder, or other components such that the components are disposed behind the folded or bent lightguide or other region or component. In one embodiment, a frontlight for a reflective display includes a lightguide, coupling lightguides and a light source wherein one or more regions of the lightguide are folded and the light source is disposed substantially behind the display. In one embodiment, the light mixing region includes a fold and the light source and/or coupling lightguides are substantially disposed on the side of the film-based lightguide opposite the light emitting region of the device or reflective display. In one embodiment, a reflective display includes a lightguide that is folded such that a region of the lightguide is disposed behind the reflective spatial light modulator of the reflective display. In one embodiment, the fold angle is between 150 and 210 degrees in one plane. In another embodiment, the fold angle is substantially 180 degrees in one plane. In one embodiment, the fold is substantially 150 and 210 degrees in a plane parallel to the optical axis of the light propagating in the film-based lightguide. In one embodiment, more than one input coupler or component is folded behind or around the lightguide, light mixing region or light emitting region. In this embodiment, for example, two light input couplers from opposite sides of the light emitting region of the same film may be disposed adjacent each other or utilize a common light source and be folded behind the spatial light modulator of a display. In another embodiment, tiled light emitting devices include light input couplers folded behind and adjacent or physically coupled to each other using the same or different light sources. In one embodiment, the light source or light emitting area of the light source is disposed within the volume bounded by the edge of the light emitting region and the normal to the light emitting region on the side of the lightguide opposite the viewing side. In another embodiment, at least one of the light source, light input coupler, coupling lightguides, or region of the light mixing region is disposed behind the light emitting region (on the side of the lightguide opposite the viewing side) or within the volume bounded by the edge of the light emitting region and the normal to the light emitting region on the side of the lightguide opposite the viewing side.

In another embodiment, the lightguide region, light mixing region, or body of the lightguide extends across at least a portion of the array of coupling lightguides or a light emitting device component. In another embodiment, the lightguide region, light mixing region, or body of the lightguide extends across a first side of the array of coupling lightguides or a first side of the light emitting device component. In one embodiment, at least one selected from the group: lightguide, lightguide region, light mixing region, plurality of lightguides, coupling lightguides, and light input coupler bends or folds such that it wraps around a component of the light emitting device more than once. In one embodiment, wrapping the lightguide, lightguide region, light mixing region, plurality of lightguides, coupling lightguides, or light input coupler around a component provides a compact method for extending the length of a region of the lightguide.

Light Absorbing Region or Layer

In one embodiment, one or more of the cladding, the adhesive, the layer disposed between the lightguide and lightguide region and the outer light emitting surface of the light emitting device, a patterned region, a printed region, and an extruded region on one or more surfaces or within a volume of the film includes a light absorbing material which absorbs a first portion of light in a first predetermined wavelength range.

Adhesion Properties of the Lightguide, Film, Cladding, or Other Layer

In one embodiment, one or more of the lightguide, the core material, the light transmitting film, the cladding material, and a layer disposed in contact with a layer of the film has adhesive properties or includes a material with one or more of the following: chemical adhesion, dispersive adhesion, electrostatic adhesion, diffusive adhesion, and mechanical adhesion to at least one element of the light emitting device (such as a carrier film with a coating, an optical film, the rear polarizer in an LCD, a brightness enhancing film, another region of the lightguide, a coupling lightguide, a thermal transfer element such as a thin sheet including aluminum, or a white reflector film) or an element external to the light emitting device such as a window, wall, or ceiling. In one embodiment, the optical path length variation across the light emitting area, region of the light emitting area, or display is measured and one or more path length compensation elements are added to the light emitting device to compensate for the path length difference for light propagating through different regions and/or coupling lightguide lengths. In one embodiment, the lightguide, cladding, or adhesive optically coupled to the lightguide includes a pliable or impact absorbing material.

Light Redirecting Element Disposed to Redirect Light from the Lightguide

In one embodiment, a light emitting device includes a lightguide with light redirecting elements disposed on or within the lightguide and light extraction features disposed in a predetermined relationship relative to one or more light redirecting elements. In another embodiment, a first portion of the light redirecting elements are disposed above a light extraction feature in a direction substantially perpendicular to the light emitting surface, lightguide, or lightguide region. As used herein, the light redirecting element is an optical element which redirects a portion of light of a first wavelength range incident in a first angular range into a second angular range different than the first. In one embodiment, the light redirecting element includes at least one element selected from the group: refractive features, totally internally reflected feature, reflective surface, prismatic surface, microlens surface, diffractive feature, holographic feature, diffraction grating, surface feature, volumetric feature, and lens. In one embodiment, the widths of the light extraction features relative to the corresponding widths of the light redirecting elements varies in at least a first plane and the full angular width at half maximum intensity of the light emitted from the light redirecting elements varies in at least a first plane. In a further embodiment, the light redirecting element is disposed to receive light from an electro-optical element wherein the optical properties may be changed in one or more regions, selectively or as a whole by applying a voltage or a current to the device.

Location of the Film-Based Lightguide

In one embodiment, the core region of the film-based lightguide is positioned between two layers selected from the group: hardcoating substrate, layer, or adhesive; anti-glare layer or anti-reflection layer, substrate or adhesive; color filter material, layer, substrate, or adhesive; first cladding of the lightguide; second cladding of the lightguide; cladding substrate or adhesive; film-based lightguide adhesive; electro-optic layer (such as liquid crystal layer or electrophoretic layer, for example); viewer side substrate for the electro-optic layer; substrate for the electro-optic layer on non-viewer side; adhesive or substrate for the electro-optic layer; reflective material, film, layer, or substrate or adhesive for reflective layer; polarizer layer substrate, or adhesive for polarizer; light redirecting layer; light extraction feature film; impact protection layer; internal coating; conformal coating; circuit board; flexible connector; thermally conducting film, layer (such as a stainless steel, copper, or aluminum foil layer), substrate, or adhesive; sealant layer, film substrate or adhesive; air gap layer; spacer layer or substrate for the spacer layer; electrically conducting layer (transparent or opaque), substrate, or adhesive; anode layer, substrate, or adhesive for anode layer; cathode layer, substrate or adhesive for cathode layer; active matrix layer, substrate or adhesive for active matrix layer; passive matrix layer, substrate or adhesive for passive matrix layer; and touchscreen layer, substrate for touchscreen, or adhesive for touchscreen layer. In another embodiment, the film-based lightguide functions as one or more of the aforementioned layers in addition to propagating light in a waveguide condition.

In one embodiment, the light emitting device includes a film-based lightguide and a force sensitive touchscreen wherein the film based lightguide is sufficiently thin to permit a force sensitive touchscreen to function by finger pressure on the display. In one embodiment, a film-based lightguide frontlight is disposed between a touchscreen film and a reflective spatial light modulator. In another embodiment, a touchscreen film is disposed between the film-based lightguide and the reflective spatial light modulator. In another embodiment, the reflective spatial light modulator, the film-based lightguide frontlight and the touchscreen are all film-based devices and the individual films may be laminated together. In another embodiment, the light transmitting electrically conductive coating for the touchscreen device or the display device is coated onto the film-based lightguide frontlight. In a further embodiment, the film-based lightguide is physically coupled to the flexible electrical connectors of the display or the touchscreen. In one embodiment, a reflective display includes one or more film-based lightguides disposed within or adjacent to one or more regions selected from the group: the region between the touchscreen layer and the reflective light modulating pixels, the region on the viewing side of the touchscreen layer, the region between a diffusing layer and the reflective light modulating pixels, the viewing side of the diffusing layer in a reflective display, the region between a diffusing layer and the light modulating pixels, the region between the diffusing layer and the reflective element, the region between the light modulating pixels and a reflective element, the viewing side of a substrate for a component or the light modulating pixels, the reflective display, between the color filters and the spatial light modulating pixels, the viewing side of the color filters, between the color filters and the reflective element, the substrate for the color filter, the substrate for the light modulating pixels, the substrate for the touchscreen, the region between a protective lens and the reflective display, the region between a light extraction layer and the light modulating pixels, the region on the viewing side of a light extraction layer, the region between an adhesive and a component of a reflective display, and between two or more components of a reflective display known in the art. In one embodiment, the film-based lightguide is folded around a first edge of the active area of a reflective spatial light modulator behind a reflective spatial light modulator and one or more selected from the group: a touchscreen connector, touchscreen film substrate, reflective spatial light modulator connector, and reflective spatial light modulator film substrate is folded behind the first edge, a second edges substantially orthogonal to the first edge, or an opposite edge to the first edge. In the aforementioned embodiment, a portion of the lightguide region, light mixing region, or coupling lightguide includes the bend region of the fold and may extend beyond the reflective spatial light modulator flexible connector, reflective spatial light modulator substrate, touchscreen flexible connector or touchscreen flexible substrate.

Light Emitting Device

In one embodiment, a light emitting device comprises: a film lightguide of a lightguide material with a lightguide refractive index $n_{DL}$, including a body having a first surface and an opposing second surface; a plurality of coupling lightguides extending from the body, each coupling lightguide of the plurality of coupling lightguides having an end, the plurality of coupling lightguides folded and stacked such that the ends of the plurality of coupling lightguides define a light input surface; the body of the film comprising a first cladding layer comprising a first material with a first refractive index, $n_{D1}$, a second cladding layer comprising a second material with a second refractive index $n_{D2}$ where $n_{DL} > n_{D2} > n_{D1}$; a plurality of low angle directing features optically coupled to the body of the lightguide; a plurality of light turning features optically coupled to the lightguide, wherein light propagating under total internal reflection at a first angle within the lightguide is redirected by the low angle directing features to a second angle less than the critical angle of an interface between the core lightguide layer and the second layer, a portion of the redirected light propagating through the interface and redirected by the light turning features to an angle within 30 degrees of the thickness direction of the film.

In this embodiment, light propagating within the core layer or region of the film-based lightguide in the light emitting region that undergoes a low angle light redirection, such as by a low angle directing feature, will preferentially leak or exit the core layer or region of the lightguide on the side with the second refractive index since it is higher than the first refractive index and the critical angle is higher. In this embodiment, light deviating from angles higher than the critical angle to smaller angles to the normal of the film surface (or core-layer interface) will first pass the critical angle boundary on the side of the core layer or region optically coupled to the cladding layer or region with the higher refractive index than the cladding layer or region on the opposite side of the core region or layer.

In one embodiment, the low angle directing feature is configured to deviate light by a total angle of deviation less than a maximum first total angle of deviation, $\theta_f$, from the angle of incidence, following the equation: $\theta_f = \theta_{c2} - \theta_{c1}$, where $\theta_{c2}$ is the critical angle between the core layer or region and the second cladding layer or region and can also be expressed as $\theta_{c2} = \sin^{-1}(n_{D2}/n_{DL})$, and $\theta_{c1}$ is the critical angle between the core layer or region and the first cladding layer or region and can be expressed as $\theta_{c1} = \sin^{-1}(n_{D1}/n_{DL})$. In another embodiment, the low angle directing feature is configured to provide a maximum total angle of deviation, $\theta_{max}$ of less than 110% of the maximum first total angle of deviation or $\theta_{max} < 1.1 \times \theta_f$. In another embodiment, the low angle directing feature is configured to provide an average first total angle of deviation, $\theta_{fave}$, from the angle of incidence of $\theta_{fave} = \theta_{c2} - \theta_{c1}$. In another embodiment, the low angle directing feature is configured to provide an average total angle of deviation, $\theta_{ave}$ of less than 110% of the average first total angle of deviation or $\theta_{ave} < 1.1 \times \theta_{fave}$.

For example, in one embodiment, the first material has a refractive index of $n_{D1} = 1.4$, the second material has a refractive index of $n_{D2} = 1.5$, and the core layer or region material has a refractive index of $n_{DL} = 1.6$. In this example, a low angle light directing feature comprises an angled reflective surface wherein the angle of the surface causes a total light deviation less than $\theta_f$ such that the light preferentially escapes the core layer of the lightguide through the higher index cladding layer or region. In this example, $\theta_{c1} = 61$ degree, $\theta_{c2} = 70$ degrees, and thus the maximum first total angle of deviation for optimum coupling into the second cladding region is less than 9 degrees. Since light reflecting from an angled surface undergoes a total angle of deviation of twice the angle of the feature, the angle of the features are chosen to be less than 4.5 degrees $$\left(\frac{\theta_f}{2}\right)$$

from the direction perpendicular to the thickness direction of the film at the feature. In one embodiment the average angle from a direction perpendicular to the thickness direction of the film at the feature of the surface of a reflective low angle directing feature receiving light propagating within the lightguide is less than $$\left(\frac{\theta_f}{2}\right)$$

degrees or less than $$1.1 \times \left(\frac{\theta_f}{2}\right)$$

degrees. In another embodiment, the thickness of the core layer or region of the film-based lightguide is less than 100 microns and the low angle directing feature directs (such as by reflection or refraction, for example) less than one selected from the group 100%, 80%, 60%, 40%, 30%, 20%, 10%, and 5% of the incident light in a single interaction (such as a single reflection or single refraction, for example). In a further embodiment, the light propagating within the lightguide that interacts with the low angle light directing features and propagates to the light turning features interacts with an average of more than 1, 2, 3, 4, 5, 10, 15, or 20 low angle directing features before reaching a light turning feature. In one embodiment, the ratio of the length of the light emitting region in the direction of light propagating from the first side to the second side of the light emitting region to the average thickness of the light emitting region is greater than one selected from the group: 300, 500, 1000, 5,000, 7,000, 10,000, 15,000, and 20,000.

Backlight or Frontlight

In one embodiment, the film-based lightguide illuminates a display, forming an electroluminescent display. In one embodiment, the film based lightguide is a frontlight for a reflective or transflective display. In another embodiment, the film-based lightguide is a backlight for a transmissive or transflective display. Typically, with displays including light emitting lightguides for illumination, the location of the lightguide will determine whether or not it is considered a backlight or frontlight for an electroluminescent display where traditionally a frontlight lightguide is a lightguide disposed on the viewing side of the display (or light modulator) and a backlight lightguide is a lightguide disposed on the opposite side of the display (or light modulator) than the viewing side. However, the frontlight or backlight terminology to be used can vary in the industry depending on the definition of the display or display components, especially in the cases where the illumination is from within the display or within components of the spatial light modulator (such as the cases where the lightguide is disposed in-between the liquid crystal cell and the color filters or in-between the liquid crystal materials and a polarizer in an LCD). In some embodiments, the lightguide is sufficiently thin to be disposed within a spatial light modulator, such as between light modulating pixels and a reflective element in a reflective display. In this embodiment, light can be directed toward the light modulating pixels directly or indirectly by directing light to the reflective element such that is reflects and passes through the lightguide toward the spatial light modulating pixels. In one embodiment, a lightguide emits light from one side or both sides and with one or two light distribution profiles that contribute to the "front" and/or "rear" illumination of light modulating components. In embodiments disclosed herein, where the light emitting region of the lightguide is disposed between the spatial light modulator (or electro-optical regions of the pixels, sub-pixels, or pixel elements) and a reflective component of a reflective display, the light emitting from the light emitting region may propagate directly toward the spatial light modulator or indirectly via directing the light toward a reflective element such that the light reflected passes back through the lightguide and into the spatial light modulator. In this specific case, the terms "frontlight" and "backlight" used herein may be used interchangeably.

In one embodiment, a light emitting display backlight or frontlight includes a light source, a light input coupler, and a lightguide. In one embodiment, the frontlight or backlight illuminates a display or spatial light modulator selected from the group: transmissive display, reflective display, liquid crystal displays (LCD's), MEMs based display, electrophoretic displays, cholesteric display, time-multiplexed optical shutter display, color sequential display, interferometric modulator display, bistable display, electronic paper display, LED display, TFT display, OLED display, carbon nanotube display, nanocrystal display, head mounted display, head-up display, segmented display, passive matrix display, active matrix display, twisted nematic display, in-plane switching display, advanced fringe field switching display, vertical alignment display, blue phase mode display, zenithal bistable device, reflective LCD, transmissive LCD, electrostatic display, electrowetting display, bistable TN displays, micro-cup EPD displays, grating aligned zenithal display, photonic crystal display, electrofluidic display, and electrochromic displays.

LCD Backlight or Frontlight

In one embodiment, a backlight or frontlight suitable for use with a liquid crystal display panel includes at least one light source, light input coupler, and lightguide. In one embodiment, the backlight or frontlight includes a single lightguide wherein the illumination of the liquid crystal panel is white. In another embodiment, the backlight or frontlight includes a plurality of lightguides disposed to receive light from at least two light sources with two different color spectra such that they emit light of two different colors. In another embodiment, the backlight or frontlight includes a single lightguide disposed to receive light from at least two light sources with two different color spectra such that they emit light of two different colors. In another embodiment, the backlight or frontlight includes a single lightguide disposed to receive light from a red, green, and blue light source. In one embodiment, the lightguide includes a plurality of light input couplers wherein the light input couplers emit light into the lightguide with different wavelength spectrums or colors. In another embodiment, light sources emitting light of two different colors or wavelength spectrums are disposed to couple light into a single light input coupler. In this embodiment, more than one light input coupler may be used, and the color may be controlled directly by modulating the light sources.

In a further embodiment, the backlight or frontlight includes a lightguide disposed to receive light from a blue or UV light emitting source and further includes a region including a wavelength conversion material such as a phosphor film. In another embodiment, the backlight includes 3 layers of film lightguides wherein each lightguide illuminates a display with substantially uniform luminance when the corresponding light source is turned on. In this embodiment, the color gamut can be increased by reducing the requirements of the color filters and the display can operate in a color sequential mode or all-colors-on simultaneously mode. In a further embodiment, the light emitting device includes a plurality of lightguides (such as a red, green and blue lightguide) disposed to receive light from a plurality of light sources emitting light with different wavelength spectrums (and thus different colored light) and emit the light from substantially different regions corresponding to different colored sub-pixels of a spatial light modulator (such as an LCD panel), and further includes a plurality of light redirecting elements disposed to redirect light from the lightguides towards the spatial light modulator.

Reflective Display

In one embodiment, a method of producing a display includes: forming an array of coupling lightguides from a lightguide region of a film including a core region and a cladding region by separating the coupling lightguides from each other such that they remain continuous with the lightguide region of the film and include bounding edges at the end of the coupling lightguides; folding the plurality of coupling lightguides such that the bounding edges are stacked; directing light from a light source into the stacked bounding edges such that light from the light source propagates within the core region through the coupling lightguides and lightguide region of the film by total internal reflection; forming light extraction features on or within the core layer in a light emitting region of the lightguide region of the film; disposing a light extracting region on the cladding region or optically coupling a light extracting region to the cladding region in a light mixing region of the lightguide region between the coupling lightguides and the light emitting region; and disposing the light emitting region adjacent a reflective spatial light modulator.

The lightguides disclosed herein may be used to illuminate a reflective display. In one embodiment, a reflective display comprises a first reflective surface and a film-based lightguide comprising a plurality of coupling lightguides. In this embodiment, the reflective display may be a diffusely reflective spatial light modulator or a specularly reflecting spatial light modulator. For example, a diffusely reflective spatial light modulator can include a reflective display such as an electrophoretic particle based reflective display and a specularly reflecting spatial light modulator can include a reflective LCD with specularly reflecting rear electrodes. The reflective spatial light modulator, or a component of the light emitting device, lightguide, or a coating or layer positioned within, may include a light scattering or diffusive surface or volumetric light scattering particles or domains.

In one embodiment, the light emitting device is a frontlight for a watch that comprises a reflective display. In another embodiment, the largest dimension in a plane orthogonal to the thickness direction of the lightguide or display of the light emitting region is less than one selected from the group of 100, 75, 50, 40, 30, and 25 millimeters.

Modes of the Light Emitting Device

In another embodiment, a light emitting device includes one or more modes selected from the group: normal viewing mode, daytime viewing mode, high brightness mode, low brightness mode, nighttime viewing mode, night vision or NVIS compatible mode, dual display mode, monochrome mode, grayscale mode, transparent mode, full color mode, high color gamut mode, color corrected mode, redundant mode, touchscreen mode, 3D mode, field sequential color mode, privacy mode, video display mode, photo display mode, alarm mode, nightlight mode, emergency lighting/sign mode. In a further embodiment, a backlight or frontlight includes a lightguide including light extraction features and a light redirecting element disposed to receive a portion of the light extracted from the lightguide and direct a portion of this light into a predetermined angular range. In another embodiment, the light redirecting element substantially collimates, reduces the angular full-width at half maximum intensity to 60 degrees, reduces the angular full-width at half maximum intensity to 30 degrees, reduces the angular full-width at half maximum intensity to 20 degrees, or reduces the angular full-width at half maximum intensity to 10 degrees, a portion of light from the lightguide and reduces the percentage of cross-talk light from one light extraction region reaching an undesired neighboring pixel, sub-pixel, or color filter. When the relative positions of the light extraction features, light redirecting elements, and pixels, sub-pixels, or color filters are controlled then light from a predetermined light extraction feature can be controlled such that there is little leakage of light into a neighboring pixel, sub-pixel, or color filter. This can be useful in a backlight or frontlight such as a color sequential backlight wherein three lightguides (one for red, green, and blue) extract light in a pattern such that color filters are not needed (or color filters are included and the color quality, contrast or gamut is increased) since the light is substantially collimated and no light or a small percentage of light extracted from the lightguide by a light extraction feature on the red lightguide beneath a pixel corresponding to a red pixel will be directed into the neighboring blue pixel. In one embodiment, the light emitting device is a reflective display including a frontlight including three lightguides, each with a set of light extraction regions wherein the three light extraction regions do not substantially overlap when viewed under magnification looking from the viewing side of the display and the light extraction regions substantially align with individual light modulating pixels on the light emitting display. In this embodiment, color filters are not required and the efficiency of the lightguides and light emitting device can be increased. In one embodiment, the arrangement of light extraction features is aligned with one or more color filters, such as the color filters in an array of color filters. In one embodiment, the arrangement of light extraction features are aligned and positioned within an illumination volume defined by the lateral edges of the color filters in an array of color filters or spatial light modulating pixels and the thickness of the light emitting device in a direction normal to the light emitting area surface.

Other Devices

In one embodiment, the film-based lightguide illuminates a display, phase modulating device, component of an optical communication device, component of a medical device, or component of an analytical device. In another embodiment, a device comprises the film-based lightguide and the one or more light sources emit light with a constant phase wavefront, uniform phase wavefront, predetermined phase wavefront, compensated phase wavefront, or adjustable phase wavefront across the area or at one or more sub-regions of the light input surface area of the light input coupler for the film-based lightguide. In one embodiment, a display device comprises the film-based lightguide, wherein the light output from the light emitting area provides illumination to an amplitude or phase spatial light modulator. In this embodiment, the light output from the light emitting area of the lightguide can have one or more selected from the group: constant phase wavefront, uniform phase wavefront, predetermined phase wavefront, random phase wavefront, compensated phase wavefront, or adjustable phase wavefront across the area or spatially varying across the light emitting area. In one embodiment, a head-mounted display (HMD) comprises the film-based lightguide, wherein the light output from the light emitting area provides illumination to an amplitude or phase spatial light modulator. In one embodiment, the light from the light emitting region provides illumination to the amplitude or phase spatial light modulator as a frontlight or a backlight. In another embodiment, the spatially modulated light from the amplitude or phase spatial light modulator is directed onto the input surface of a light input coupler, propagates through the lightguide film, and is emitted from the lightguide and directed to one or more eyes of the viewer wearing the head-mounted display. In one embodiment, a Head-Up Display (HUD) system comprises the film-based lightguide, wherein the light output from the light emitting area provides illumination to an amplitude or phase spatial light modulator. In one embodiment, the light emitting area of the film-based lightguide is positioned on a surface or within a window or light transmitting substrate. In another embodiment, a wedge projection display comprises a film-based lightguide wherein the light input surface of the light input coupler receives light from a spatial light modulator (amplitude and/or phase modulated light) and the light received by the light input surface propagates through a light mixing region of the lightguide and into a light emitting region of the lightguide. In one embodiment, the wedge projection display comprises a film-based lightguide wherein the thickness of film (or lightguide region of a film) decreases within the light emitting region in the average direction of propagation of the light within the lightguide region of the film, in a direction away from the side where light enters the light emitting region to the opposite side of the light emitting region, or along the direction of propagation of the light traveling within the light emitting region.

Multiple Light Emitting Areas or Displays

In one embodiment, the light emitting device includes two or more light emitting areas or displays defined by regions with one or more properties selected from the group: emit different color gamuts; emit light within different functional areas of the display; emit light with different angular properties; emit light to illuminate a button, key, keyboard area, or other user interface region; have different sizes or shapes; and are positioned on different sides or surfaces of the device. In one embodiment, the light emitting device includes two or more light emitting regions with different use modes or different illumination modes. A different illumination mode can include one or more different light output properties selected from the group: different times in the "on" state or "off" state of illumination; different frequencies of illumination; different durations of illumination; different colors of illumination; different color gamuts; different angular light output profiles; different spatial light output profiles; different spatial luminance uniformity; and different color, luminances or luminous intensity at a specific angle.

Light Emitting Device Assembly

In one embodiment, the film-based lightguide is adhered to a display, component of a display, or other component of a light emitting device using lamination and/or one or more of the following: addition of pressure, addition of heat, laminating a coated layer or region, laminating to a relative position maintaining element, and coating an adhesive onto a substrate or component and joining one component to another. In one embodiment, the adhesive functions as a cladding between the core region of the lightguide and another component and reduces the flux of light absorbed by the RPME due to the lightguide contacting the RPME. In another embodiment, the pressure sensitive adhesive increases the yield strength or impact strength (Izod or Charpy impact strength, for example) of the film-based lightguide, light emitting device, and/or display. In one embodiment, an adhesive is positioned between the lightguide and a reflective film, surface of the relative position maintaining element, or optical component disposed to receive light from the light source and direct it into the input surface of the stack of coupling lightguides.

Uniformity of the Backlight, Frontlight, or Light Emitting Device

In another embodiment, the light source emitting light into an array of coupling lightguides includes light sources of two or more different colors (such as a red, green, and blue LED) and the spatial color non-uniformity, $\Delta u'v'$, along a line parallel to the array of coupling lightguides or perpendicular to the optical axis of the light travelling within the coupling lightguides at the side of the taper closer to the light source along the length of the coupling lightguides) measured on the 1976 u', v' Uniform Chromaticity Scale as described in VESA Flat Panel Display Measurements Standard version 2.0, Jun. 1, 2001 (Appendix 201, page 249) is less than one selected from the group: 0.2, 0.1, 0.05, 0.01, and 0.004. In one embodiment, a light emitting device includes a light source, a light input coupler, and a film-based lightguide wherein the 9-spot sampled spatial color non-uniformity, $\Delta u'v'$, of the light emitting surface of the light emitting device measured on the 1976 u', v' Uniform Chromaticity Scale as described in VESA Flat Panel Display Measurements Standard version 2.0, Jun. 1, 2001 (Appendix 201, page 249) is less than one selected from the group: 0.2, 0.1, 0.05, 0.01, and 0.004 when measured using a spectrometer based spot color meter. In one embodiment, the light emitting from at least one surface of the light emitting device has an angular full-width at half-maximum intensity (FWHM) less than one selected from the group: 120 degrees, 100 degrees, 80 degrees, 60 degrees, 40 degrees, 20 degrees and 10 degrees.

Method of Manufacturing Light Input/Output Coupler

In one embodiment, the lightguide and light input or output coupler are formed from a light transmitting film by creating segments of the film corresponding to the coupling lightguides and translating and bending the segments such that a plurality of segments overlap. In a further embodiment, the input surfaces of the coupling lightguides are arranged to create a collective light input surface by translation of the coupling lightguides to create at least one bend or fold.

Film Production

In one embodiment, the film or lightguide is one selected from the group: extruded film, co-extruded film, cast film, solvent cast film, UV cast film, pressed film, injection molded film, knife coated film, spin coated film, and coated film. In one embodiment, one or two cladding layers are co-extruded on one or both sides of a lightguide region. In another embodiment, tie layers, adhesion promotion layers, materials or surface modifications are disposed on a surface of or between the cladding layer and the lightguide layer. In one embodiment, the coupling lightguides, or core regions thereof, are continuous with the lightguide region of the film as formed during the film formation process. For example, coupling lightguides formed by slicing regions of a film at spaced intervals can form coupling lightguides that are continuous with the lightguide region of the film. In another embodiment, a film-based lightguide with coupling lightguides continuous with the lightguide region can be formed by injection molding or casting a material in a mold including a lightguide region with coupling lightguide regions with separations between the coupling lightguides. In one embodiment, the region between the coupling lightguides and lightguide region is homogeneous and without interfacial transitions such as without limitation, air gaps, minor variations in refractive index, discontinuities in shapes or input-output areas, and minor variations in the molecular weight or material compositions.

In another embodiment, at least one selected from the group: lightguide layer, light transmitting film, cladding region, adhesive region, adhesion promotion region, or scratch resistant layer is coated onto one or more surfaces of the film or lightguide. In another embodiment, the lightguide or cladding region is coated onto, extruded onto or otherwise disposed onto a carrier film. In another embodiment, the carrier film is slit or removed across a region of the coupling lightguides. In this embodiment, the coupling lightguides can be bent or folded to a smaller radius of curvature after the carrier film is removed from the linear fold region.

Relative Position Maintaining Element

In one embodiment, at least one relative position maintaining element substantially maintains the relative position of the coupling lightguides in the region of the first linear fold region, the second linear fold region or both the first and second linear fold regions. In one embodiment, the relative position maintaining element is disposed adjacent the first linear fold region of the array of coupling lightguides such that the combination of the relative position maintaining element with the coupling lightguide provides sufficient stability or rigidity to substantially maintain the relative position of the coupling lightguides within the first linear fold region during translational movements of the first linear fold region relative to the second linear fold region to create the overlapping collection of coupling lightguides and the bends in the coupling lightguides. In a further embodiment, the relative position maintaining element disposed proximal to the first linear fold region has a cross-sectional edge in a plane parallel to the light transmitting film surface disposed proximal to the first linear fold region that includes a substantially linear section oriented at an angle greater than 10 degrees to the first linear fold region for at least one coupling lightguide. In a further embodiment, the relative position maintaining element has saw-tooth-like teeth oriented substantially at 45 degrees to a linear fold region of the coupling lightguides.

Folding and Assembly

In one embodiment, the coupling lightguides are heated to soften the lightguides during the folding or bending step. In another embodiment, the coupling lightguides are folded while they are at a temperature above one selected from the group: 50 degrees Celsius, 70 degrees Celsius, 100 degrees Celsius, 150 degrees Celsius, 200 degrees Celsius, and 250 degrees Celsius.

Folder

In one embodiment, the coupling lightguides are folded or bent using opposing folding mechanisms. In another embodiment, grooves, guides, pins, or other counterparts facilitate the bringing together opposing folding mechanisms such that the folds or bends in the coupling lightguides are correctly folded. In another embodiment, registration guides, grooves, pins, or other counterparts are disposed on the folder to hold in place or guide one or more coupling lightguides or the lightguide during the folding step.

Assembly Order

In one embodiment, the film-based lightguide includes an array of coupling lightguides and the array of coupling lightguides are folded prior to physically or optically coupling the film-based lightguide to the light emitting device, display, or a component thereof. In another embodiment, the array of coupling lightguides are folded after physically or optically coupling the film-based lightguide to the light emitting device, display, or a component thereof. In another embodiment, the light emitting device or display includes a light input coupler including a folded, stacked array of coupling lightguides and the light input coupler is assembled before or after the film-based lightguide is laminated to the display. In one embodiment, the display functions as a relative position maintaining element and adhering the film-based lightguide to the display maintains the relative position of the coupling lightguides during the subsequent folding operation.

The following are more detailed descriptions of various embodiments illustrated in the Figures.

FIG. 1 is a top view of one embodiment of a light emitting device 100 including a light input coupler 101 disposed on one side of a film-based lightguide. The light input coupler 101 includes coupling lightguides 104 and a light source 102 disposed to direct light into the coupling lightguides 104 through a light input surface 103 including light input edges of the coupling lightguides 104. In one embodiment, each coupling lightguide 104 includes a coupling lightguide terminating at a bounding edge. Each coupling lightguide is folded such that the bounding edges of the coupling lightguides are stacked to form the light input surface 103. The light emitting device 100 further includes a lightguide region 106 defining a light mixing region 105, a lightguide 107, and a light emitting region 108. Light from the light source 102 exits the light input coupler 101 and enters the lightguide region 106 of the film. This light spatially mixes with light from different coupling lightguides 104 within the light mixing region 105 as the light propagates through the lightguide 107. In one embodiment, light is emitted from the lightguide 107 in the light emitting region 108 due to light extraction features (not shown).

Figure 2:
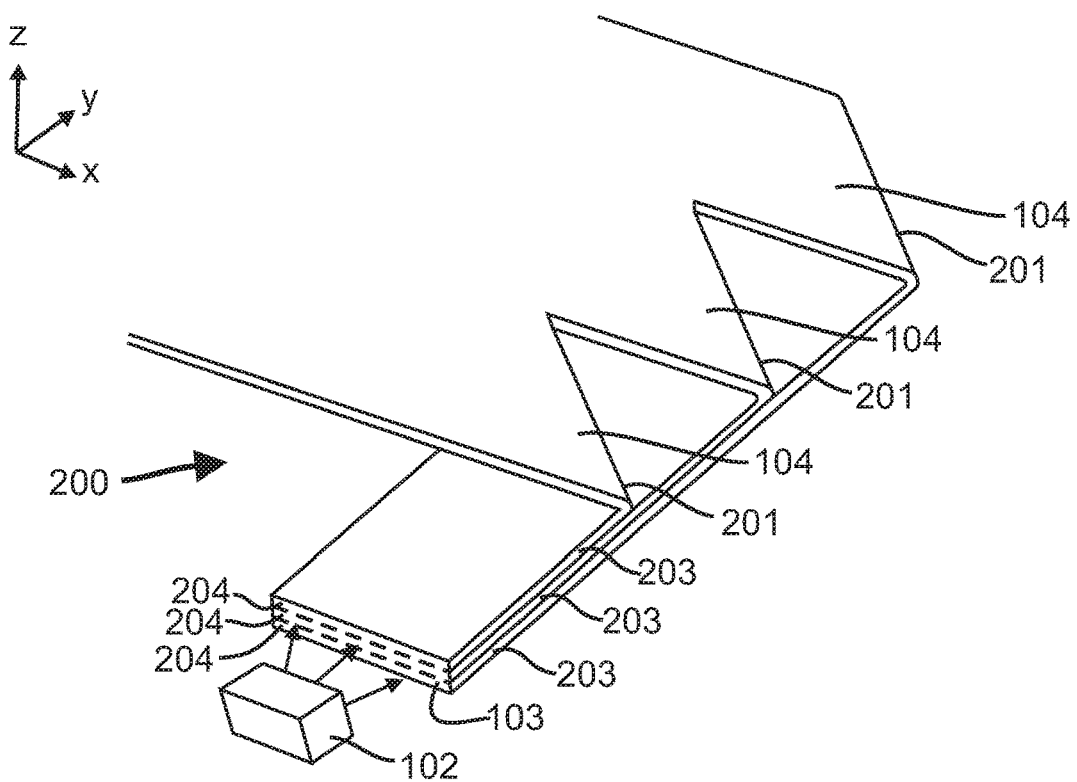
FIG. 2 is a perspective view of one embodiment of a light input coupler with coupling lightguides folded in the −y direction.

FIG. 2 is a perspective view of one embodiment of a light input coupler 200 with coupling lightguides 104 folded in the −y direction. Light from the light source 102 is directed into the light input surface 103 through or along light input edges 204 of the coupling lightguides 104. A portion of the light from the light source 102 propagating within the coupling lightguides 104 with a directional component in the +y direction will reflect in the +x and −x directions from the lateral edges 203 of the coupling lightguides 104 and will reflect in the +z and −z directions from the top and bottom surfaces of the coupling lightguides 104. The light propagating within the coupling lightguides is redirected by the folds 201 in the coupling lightguides 104 toward the −x direction.

Figure 3:
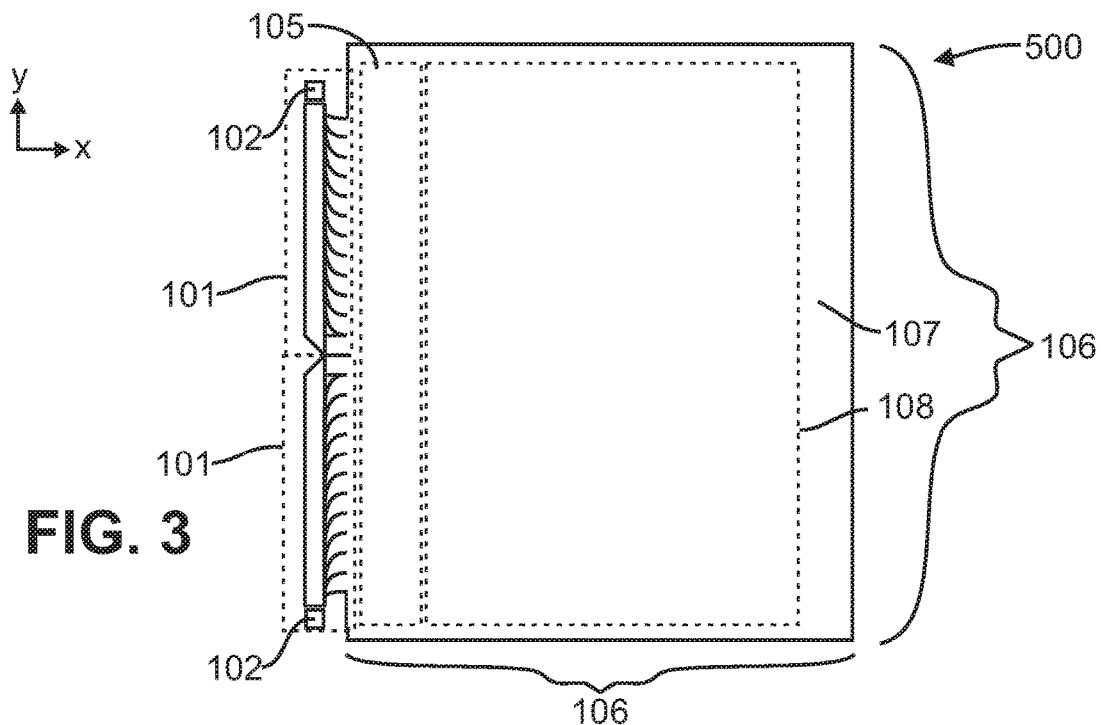
FIG. 3 is a top view of one embodiment of a light emitting device with two light input couplers disposed on the same side of a lightguide wherein the optical axes of the light sources are oriented substantially toward each other.

FIG. 3 is a top view of one embodiment of a light emitting device 500 with two light input couplers 101 disposed on the same side of the lightguide region 106. In this embodiment, the light sources 102 are oriented substantially with the light directed toward each other in the +y and −y directions.

Figure 4:
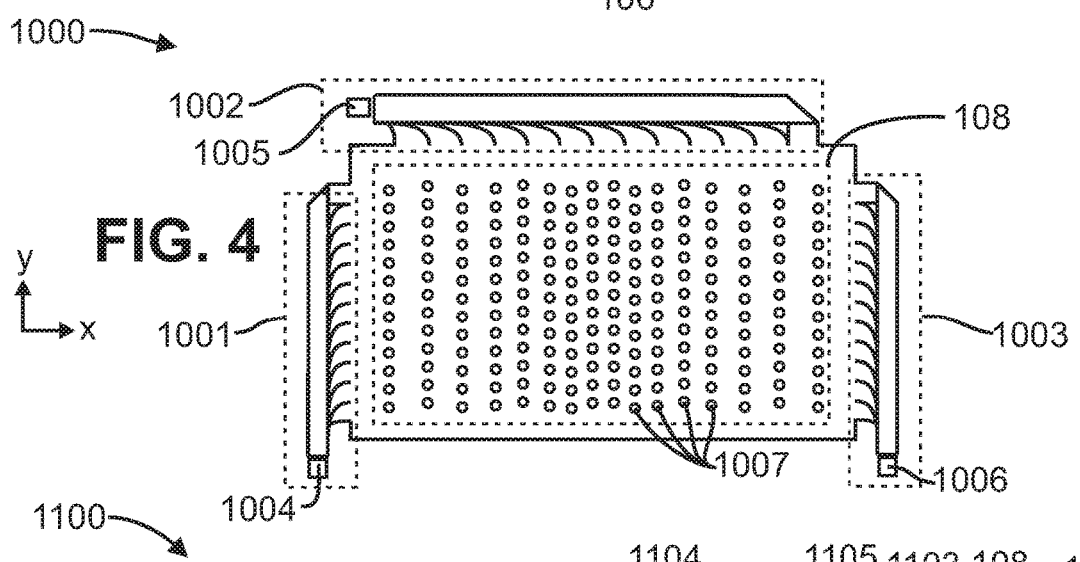
FIG. 4 is a top view of one embodiment of a light emitting device including three light input couplers.

FIG. 4 is a top view of one embodiment of a light emitting backlight 1000 configured to emit red, green, and blue light. The light emitting backlight 1000 includes a red light input coupler 1001, a green light input coupler 1002, and a blue light input coupler 1003 disposed to receive light from a red light source 1004, a green light source 1005, and a blue light source 1006, respectively. Light from each of the light input couplers 1001, 1002, and 1003 is emitted from the light emitting region 108 due to the light extraction features 1007 which redirect a portion of the light to angles closer to the surface normal within the lightguide region 106 such that the light does not remain within the lightguide 107 and exits the light emitting backlight 1000 in a light emitting region 108. The pattern of the light extraction features 1007 may vary in one or more of a size, a space, spacing, a pitch, a shape, and a location within the x-y plane or throughout the thickness of the lightguide in the z direction.

Figure 5:
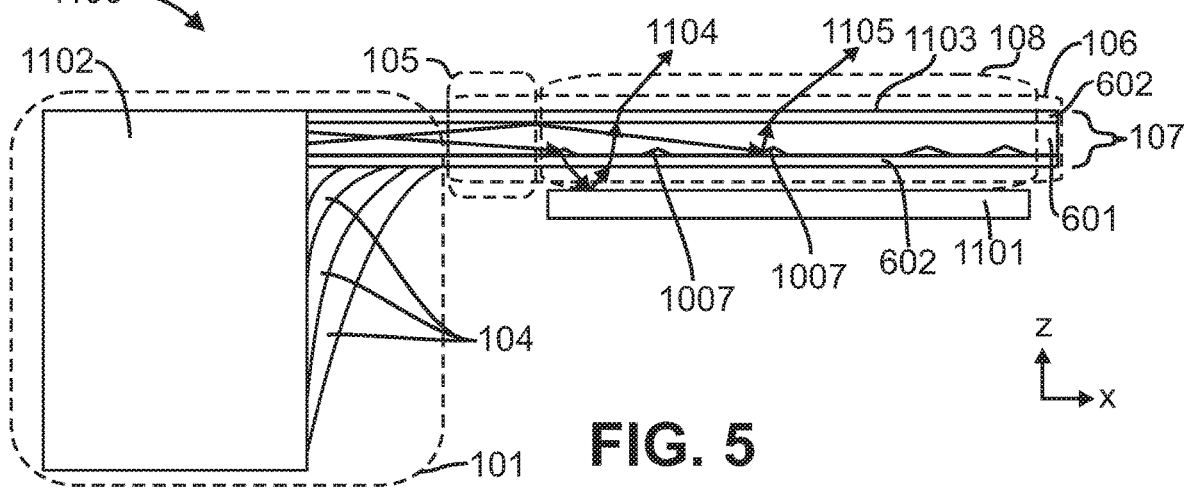
FIG. 5 is a cross-sectional side view of one embodiment of a light emitting device including a light input coupler and lightguide with a reflective optical element disposed adjacent a surface.

FIG. 5 is a cross-sectional side view of one embodiment of a light emitting device 1100 including the light input coupler 101 and the lightguide 107 with a reflective optical element 1101 disposed adjacent the cladding region 602 and a light source 1102 with an optical axis in the +y direction disposed to direct light into the coupling lightguides 104. Light from the light source 1102 propagates through the coupling lightguides 104 within the light input coupler 101, through the light mixing region 105, and through the core layer 601 of the lightguide 107 within light emitting region 108 of the lightguide region 106. Referring to FIG. 5, a first portion of light 1104 reaching the light extraction features 1007 is redirected toward the reflective optical element 1101 at an angle less than the critical angle such that the light can escape the lightguide 107, reflect from the reflective optical element 1101, pass back through the lightguide 107, and exit the lightguide 107 through the light emitting surface 1103 of the light emitting region 108. A second portion of light 1105 reaching the light extraction features 1007 is redirected toward the light emitting surface 1103 at an angle less than the critical angle, escapes the lightguide 107, and exits the lightguide 107 through the light emitting surface 1103 of the light emitting region 108.

FIG. 6 is a perspective view of one embodiment of a light emitting device 1500 wherein the light mixing region 105 of the lightguide 107 wraps around a relative position maintaining element 1501 and a stack of coupling lightguides 104 that extend from the lightguide 107 and are stacked in the y direction. The relative position maintaining element 1501 substantially maintains the relative position of the coupling lightguides 104 during and/or after folding. The light source 102 is operatively coupled to the relative position maintaining element 1501 and directs light into the light input edges 204 of the coupling lightguides 104 such that the light propagates through the coupling lightguides 104, through the light mixing region 105 that is wrapped around the coupling lightguides 104, and exits the lightguide 107 in the light emitting region 108. The light source 102 may, for example, be operatively coupled to the relative position maintaining element 1501 by adhesion, clamping, physical constraint, or another suitable physical coupling device or method. Similarly, one or more coupling lightguides 104, the lightguide 107, or a region of the lightguide 107 such as the light mixing region 105 may be adhered or otherwise operatively coupled to the relative position maintaining element 1501. Operatively coupling one or more elements of the light emitting device 1500 can reduce total device volume, decrease the likelihood of contaminants entering into regions between components, and prevent one or more elements from unwrapping or unfolding. In one embodiment, the lightguide 107 is adhered to itself in the region of the wrap using an adhesive such as a suitable pressure sensitive adhesive that may be a cladding layer. In another embodiment, the light emitting device includes one or more tapered, angled, or non-folding coupling lightguides 104 and the light source 102 is positioned between the planes defined by the lateral edges 1502 of the lightguide 107 (parallel to the x-y planes in FIG. 6) to reduce the dimension of the device in the z direction.

FIG. 7 is a top view of one embodiment of a coupling lightguide 1610a, 1610b, and 1610c in three different positions 1601, 1602, and 1603, respectively. FIG. 7 illustrates the translated distance of the folded coupling lightguide 1610b, 1610c from the fold line 1609 in the extended direction 1614 when folded beginning at a fold point 1608 at 90 degrees for two different radii. In this embodiment, the fold line 1609 is the line including the fold point 1608 at which the coupling lightguides (such as 1610b, 1610c) begin to fold and, in this embodiment, is perpendicular to the extended direction 1614 of the coupling lightguides 1610b, 1610c for a 90 degree fold. In this embodiment, the width of the coupling lightguide 1610a, 1610b, 1610c is shown reduced for illustrative purposes and clarity. The coupling lightguide 1610a extends from the lightguide 107 in the extended direction 1614 (parallel to the −x direction) in an unfolded position 1601 (shown in dotted lines). The coupling lightguide 1610b in the second position 1602 is folded to a first radius of curvature in the +z direction and +y direction to result in a 90-degree fold (the coupling lightguide axis 1612 is 90 degrees from the extended direction 1614). In the second position 1602 (shown in dotted lines), the coupling lightguide 1610b has a first radius of curvature, R1. In the third position 1603, the coupling lightguide 1610c has a second radius of curvature, R2 larger than first radius of curvature R1. The first translated distance, D1, in the extended direction (in the x-y plane) of the midpoint 1606 of the coupling lightguide 1610b for the second position 1602 is:

$$D_1 = \frac{\sqrt{2}}{2} \times \pi \times R_1.$$

The second translated distance, D2, in the extended direction (in the x-y plane) of the midpoint 1604 of the coupling lightguide 1610c for the third position 1603 is:

$$D_2 = \frac{\sqrt{2}}{2} \times \pi \times R_2.$$

With a larger radius of curvature, R2, the coupling lightguide 1610c at the third position 1603 is translated a larger distance (D2>D1) from the fold line 1609. An array of coupling lightguides extending in the extended direction 1614 and positioned along the fold line 1609 in the +y direction from the fold point 1608 is staggered laterally (x direction) due to variations in radii of curvature.

FIG. 8 is a top view of one embodiment of a light input coupler 1700 including a film-based lightguide 107 with staggered coupling lightguides 1701, 1702, 1703, 1704, and 1705. In this embodiment, the coupling lightguides 1701, 1702, 1703, 1704, and 1705 extend from the lightguide 107 in an extended direction 1614 (parallel to the −x direction) and are folded in the +z and −y directions around the 45 degree angled teeth 1707 of a relative positioning maintaining element 3301. The coupling lightguides 1701, 1702, 1703, 1704, and 1705 are folded along the fold line 1609 and for clarity shown extending past a cut line 1706 where the coupling lightguides would normally be cut (or would be cut initially during fabrication from the film-based lightguide 107). In this embodiment, the coupling lightguides 1701, 1702, 1703, 1704, and 1705 have staggered light input surfaces 1708 translated in the extended direction 1614 perpendicular to the fold line 1609. The first coupling lightguide 1701 is translated from the fold line 1609 by a first translated distance D1. The fifth coupling lightguide 1705 is translated from the fold line 1609 by a fifth translated distance D5. Because the radius of curvature of the fifth coupling lightguide 1705 is larger than the radius of curvature of the first coupling lightguide 1701, the fifth translated distance D5 is larger than the first translated distance D1.

FIG. 9 is a top view of one embodiment of a light emitting device 2300 including a plurality of coupling lightguides 104 with a plurality of first reflective surface edges 3908 and a plurality of second reflective surface edges 3907 within each coupling lightguide 104. In the embodiment shown in FIG. 9, three light sources 102 are disposed to couple light into respective light input edges 204 at least partially defined by respective first reflective surface edges 3908 and second reflective surface edges 3907.

FIG. 10 is an enlarged perspective view of the coupling lightguides 104 of FIG. 9 with the light input edges 204 disposed between the first reflective surface edges 3908 and the second reflective surface edges 3907. The light sources 102 are omitted in FIG. 10 for clarity.

FIG. 11 is a top view of one embodiment of a film-based lightguide 4900 including an array of tapered coupling lightguides 4902 formed by cutting regions in a lightguide 107. The array of tapered coupling lightguides 4902 are formed in a first direction (y direction as shown) with an array dimension length, d1, which is less than a parallel dimension length, d2, of the light emitting region 108 of the lightguide 107. A compensation region 4901 is defined within the film-based lightguide 4900 and does not include tapered coupling lightguides 4902 extending therefrom. In this embodiment, the compensation region 4901 provides a volume having sufficient length in the y direction to place a light source (not shown) such that the light source does not extend past the lower edge 4903 of the lightguide 107. The compensation region 4901 of the light emitting region 108 may have a higher density of light extraction features (not shown) to compensate for the lower input flux directly received from the tapered coupling lightguides 4902 into the light emitting region 108. In one embodiment, a substantially uniform luminance or light flux output per area in the light emitting region 108 is achieved despite the lower level of light flux received by the light extraction features within the compensation region 4901 of the light emitting region 108 by, for example, increasing the light extraction efficiency or area ratio of the light extraction features to the area without light extraction features within one or more regions of the compensation region 4901, increasing the width of the light mixing region 105 between the tapered coupling lightguides 4902 and the light emitting region 108, decreasing the light extraction efficiency or the average area ratio of the light extraction features to the areas without light extraction features in one or more regions of the light emitting region 108 outside the compensation region 4901, or any suitable combination thereof.

Figure 12:
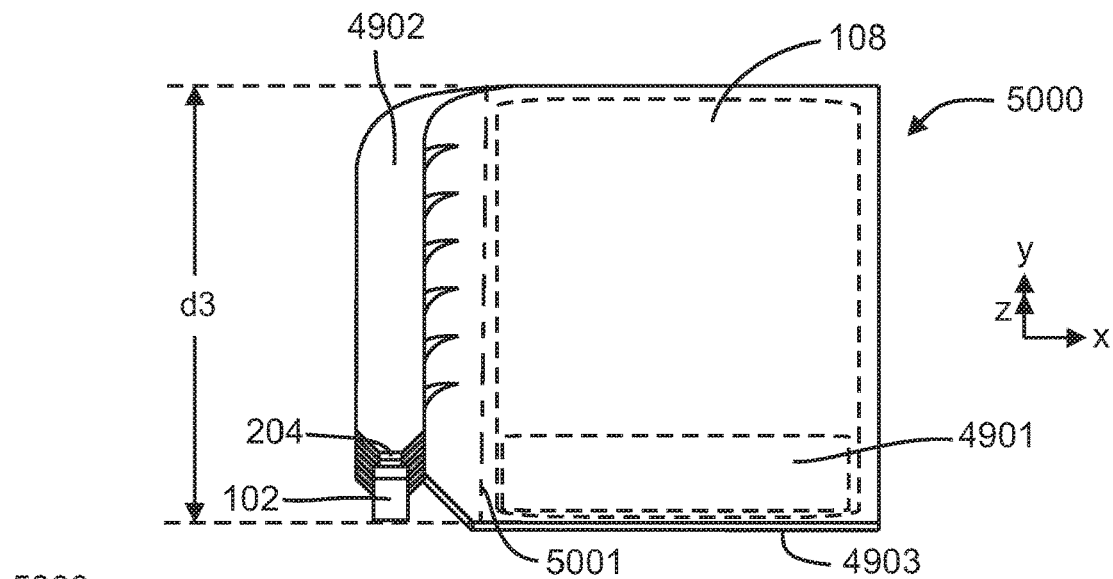
FIG. 12 is a perspective top view of a light emitting device of one embodiment including the film-based lightguide of FIG. 11 and a light source.

FIG. 12 is a perspective top view of one embodiment of a light emitting device 5000 including the film-based lightguide 4900 shown in FIG. 11 and a light source 102. In this embodiment, the tapered coupling lightguides 4902 are folded in the −y direction toward the light source 102 such that the light input edges 204 of the tapered coupling lightguides 4902 are disposed to receive light from the light source 102. Light from the light source 102 propagating through the tapered coupling lightguides 4902 exits the tapered coupling lightguides 4902 and enters into the light emitting region 108 generally propagating in the +x direction while expanding in the +y and −y directions. In this embodiment, the light source 102 is disposed within the region that did not include a tapered coupling lightguide 4902 and the light source 102 does not extend in the y direction past a lower edge 4903 of the light emitting device 5000. By not extending past the lower edge 4903, the light emitting device 5000 has a shorter overall width in the y direction. Furthermore, the light emitting device 5000 can maintain the shorter dimension, d3, in the y direction (shown in FIG. 12) when the tapered coupling lightguides 4902 and the light source 102 are folded under (−z direction and then +x direction) the light emitting region 108 along the fold (or bend) line 5001.

Figure 13:
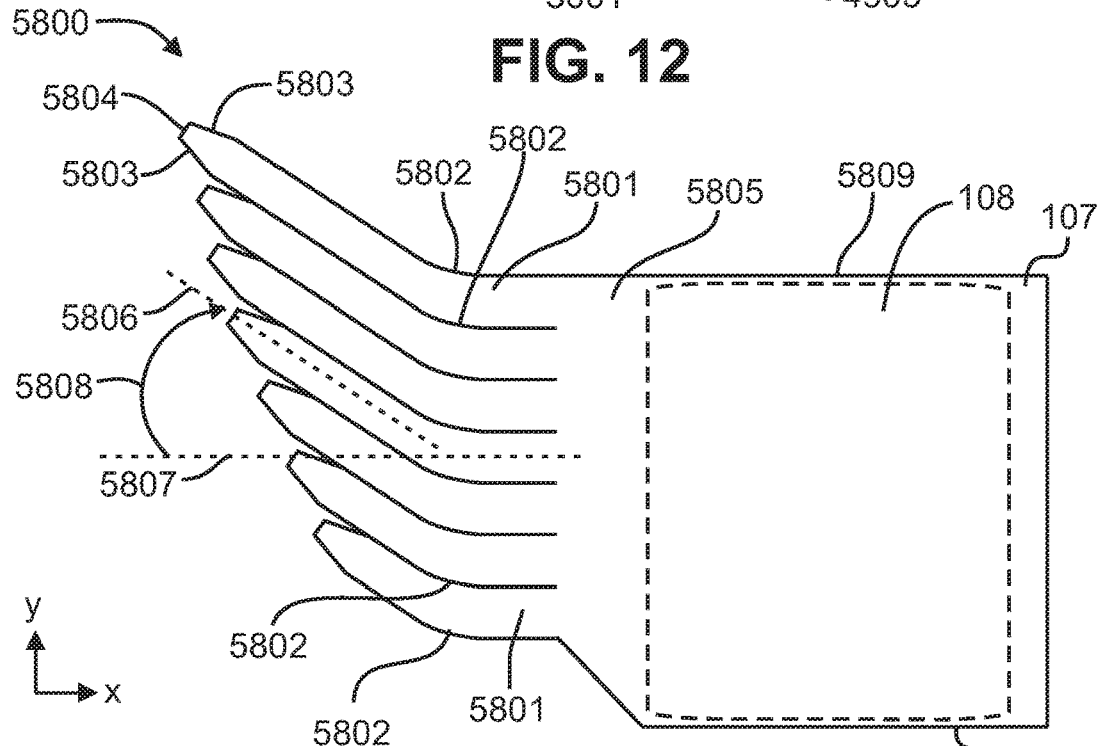
FIG. 13 is top view of one embodiment of a film-based lightguide including an array of oriented coupling lightguides with tapered light collimating lateral edges adjacent the input surface and light turning edges between the light input surface and the light mixing region of the film-based lightguide.

FIG. 13 is top view of one embodiment of a film-based lightguide 5800 including an array of oriented coupling lightguides 5801 oriented parallel to a first direction 5806 at a coupling lightguide orientation angle 5808 from the second direction 5807 perpendicular to the array direction (y-direction) of the array of oriented coupling lightguides 5801 at the light mixing region 5805. The array of oriented coupling lightguides 5801 includes tapered light collimating lateral edges 5803 adjacent the light input surface 5804 and light turning lateral edges 5802 between the light input surface 5804 and the light mixing region 5805 of the film-based lightguide 107. In this embodiment, light from a light source (not shown) disposed to emit light into the light input surface 5804 when the array of oriented coupling lightguides 5801 are folded propagates with its optical axis parallel to the first direction 5806 of the array of oriented coupling lightguides 5801 and the optical axis is turned by the light turning lateral edges 5802 such that the optical axis is substantially parallel to the second direction 5807 perpendicular to the array direction (y-direction) of the array of oriented coupling lightguides 5801 at the light mixing region 5805. In this embodiment, when the oriented coupling lightguides 5801 are folded, the light source can be positioned between the planes (parallel to the z direction) including the lateral edges (5809, 5810) of the lightguide 107 such that a device or display including the light emitting device with the film-based lightguide 5800 does not require a large frame or a border region extending significantly past the lateral edges (5809, 5810) of the film-based lightguide in the y direction (as folded once or when the array of oriented coupling lightguides 5801 are folded and the light source, the array of oriented coupling lightguides 5801, and the light mixing region 5805 are folded behind the light emitting region 108 of the film based lightguide 107). The array of oriented coupling lightguides 5801 permit the light source to be positioned between the planes including the lateral edges (5809, 5810) of the film-based lightguide and the light turning lateral edges 5802 redirect the optical axis of the light toward the second direction 5807 perpendicular to the array direction (y-direction) of the array of oriented coupling lightguides 5801 at the light mixing region 5805 such that the optical axis of the light is oriented substantially parallel to the second direction 5807 when the light is extracted by light extraction features (not shown) with light redirecting surface oriented substantially parallel to the array direction (y direction) of the array of oriented coupling lightguides 5801.

Figure 14:
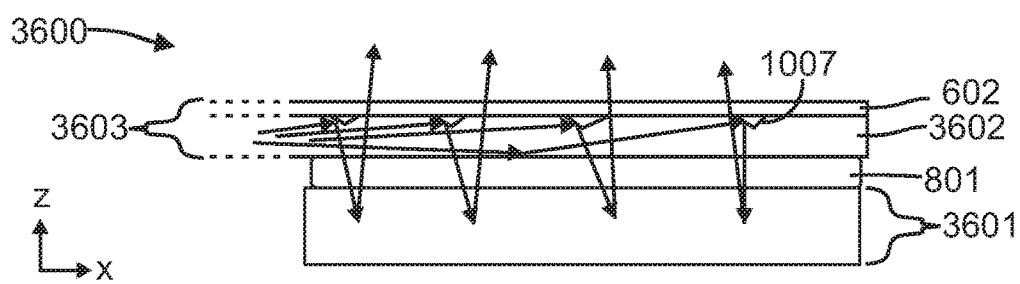
FIG. 14 is a cross-sectional side view of one embodiment of a spatial display including a frontlight.

FIG. 14 is a cross-sectional side view of one embodiment of a spatial display 3600 including a frontlight 3603 optically coupled to a reflective spatial light modulator 3601. The frontlight 3603 includes a film-based lightguide 3602 with the light extracting features 1007 that direct light to the reflective spatial light modulator 3601 at angles near the surface normal of the reflective spatial light modulator 3601. In one embodiment, the reflective spatial light modulator 3601 is an electrophoretic display, a microelectromechanical system (MEMS)-based display, or a reflective liquid crystal display. In one embodiment, the light extraction features 1007 direct one of 50%, 60%, 70%, 80%, and 90% of the light exiting the frontlight 3603 toward the reflective spatial light modulator 3601 within an angular range of 60 degrees to 120 degrees from the light emitting surface of the frontlight 3603.

Figure 15:
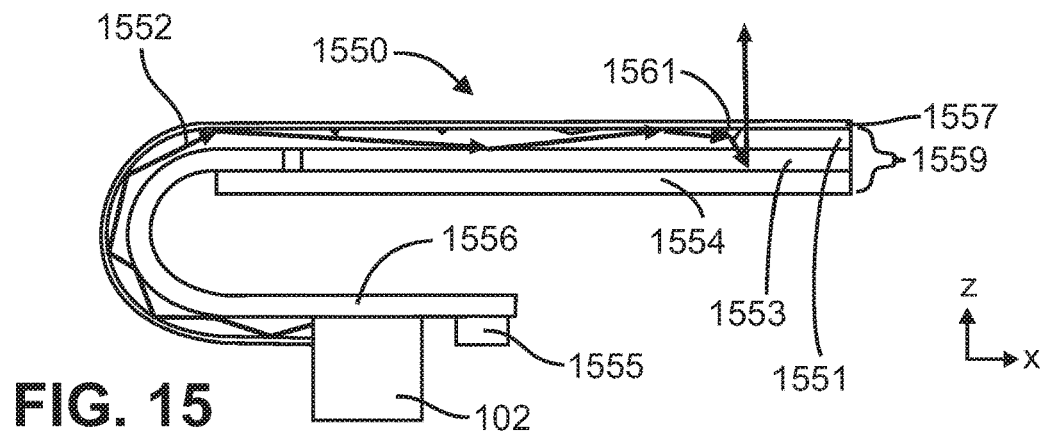
FIG. 15 is a cross-sectional side view of one embodiment of a light emitting display including a lightguide that further functions as a top substrate for a reflective spatial light modulator.

FIG. 15 is a cross-sectional side view of one embodiment a light emitting display 1550 with a film-based lightguide 1551 physically coupled to a flexible display connector 1556. In this embodiment, the reflective spatial light modulator 1559 includes a bottom substrate 1554 and the film-based lightguide 1551 is a top substrate. Light 1552 from the light source 102 physically coupled to the flexible display connector 1556 is directed into the film-based lightguide 1551 and is redirected by light extraction features 1561 to the active layer 1553 where the light 1552 reflects and passes back through the film-based lightguide 1551, and the upper cladding layer 1557, and exits the light emitting display 1550.

Figure 16:
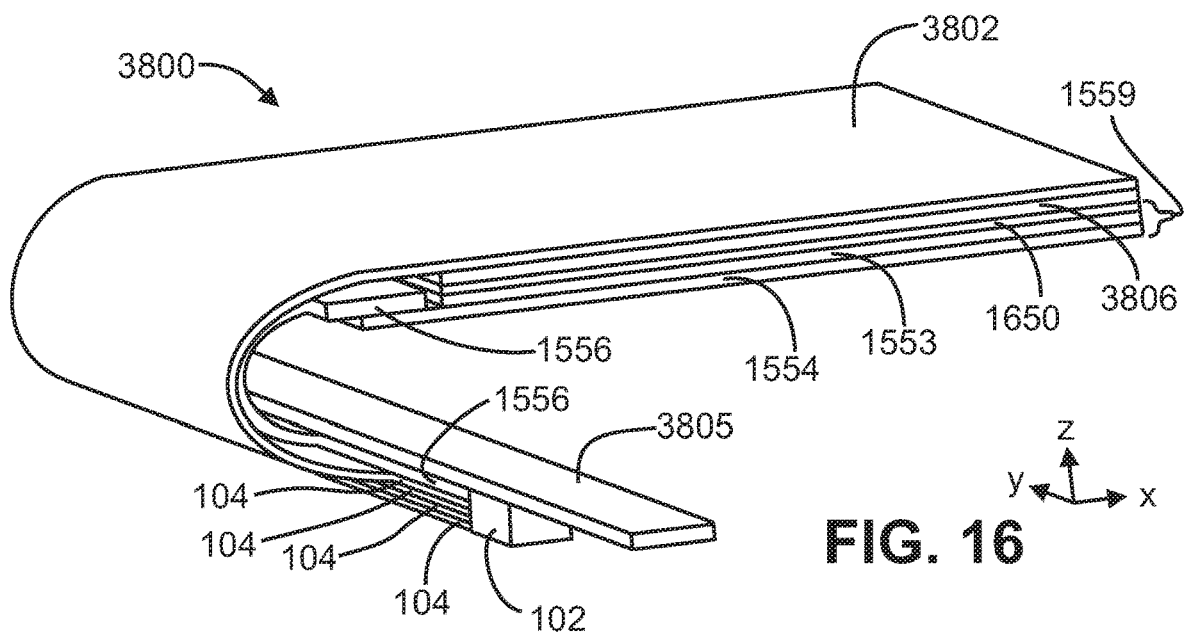
FIG. 16 is a perspective view of one embodiment of a light emitting device including a film-based lightguide that further functions as a top substrate for the reflective spatial light modulator with the light source disposed on a circuit board physically coupled to the flexible connector.

FIG. 16 is a perspective view of one embodiment of a light emitting device 3800 including a film-based lightguide 3802 physically coupled to a flexible display connector 1556 for the reflective spatial light modulator 1559 with a light source 102 disposed on a circuit board 3805 physically coupled to the flexible display connector 1556. In this embodiment, the reflective spatial light modulator 1559 includes an active layer 1553 positioned between a bottom substrate 1554 and a top substrate 1650. The top substrate 1650 of the reflective spatial light modulator 1559 is optically coupled to the film-based lightguide 3802 using an adhesive cladding layer 3806.

Figure 17:
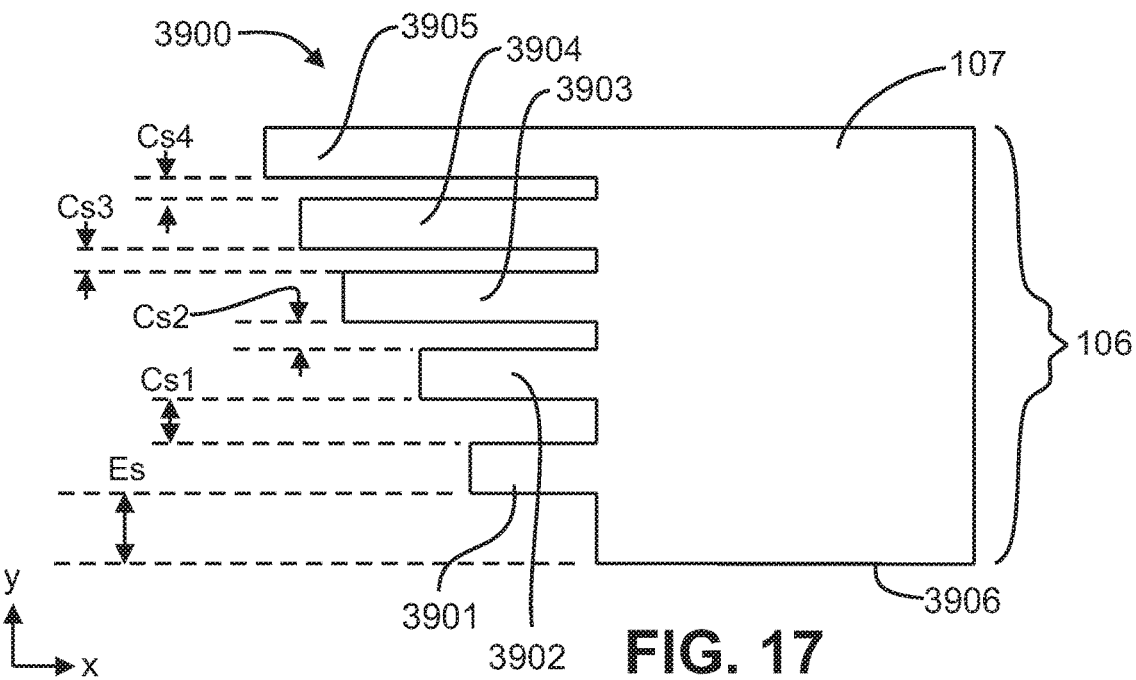
FIG. 17 is a top view of one embodiment of a film-based lightguide including an array of coupling lightguides with varying separation distances between adjacent coupling lightguides.

FIG. 17 is a top view of one embodiment of a film-based lightguide 3900 including an array of coupling lightguides 3901, 3902, 3903, 3904, 3905 extended from a lightguide region 106 of a lightguide 107. The first coupling lightguide 3901 has an edge separation distance (Es) from the lateral edge 3906 of the adjacent side of the film-based lightguide 3900. In this embodiment, the separation distance of the coupling lightguides (Cs1, Cs2, Cs3, Cs4) along the side of the film-based lightguide varies. The first coupling lightguide separation distance (Cs1) between the first coupling lightguide 3901 and the second coupling lightguide 3902 is larger than the second separation distance (Cs2) between the second coupling lightguide 3902 and the third coupling lightguide 3903. The third coupling lightguide separation distance (Cs3) between the third coupling lightguide 3903 and the fourth coupling lightguide 3904 is larger than the fourth separation distance (Cs4) between the fourth coupling lightguide 3904 and the fifth coupling lightguide 3905. As shown in FIG. 17, Cs1>Cs2>Cs3>Cs4, however, the varying spacing does not need to be continuously decreasing along a side of a film based lightguide 107 and other increasing, decreasing or variations of separation distances may be used in other embodiments. In other embodiments, the separation distances (Cs1, Cs2, Cs3, Cs4) along the side of the film-based lightguide are averaged to determine an average cut width, cw, wherein the average cut width, cw, of the coupling lightguides at the light mixing region is less than one selected from the group: 300, 250, 100, 75, 50, and 25 micrometers in the width direction (parallel to the y direction and array direction).

Figure 18:
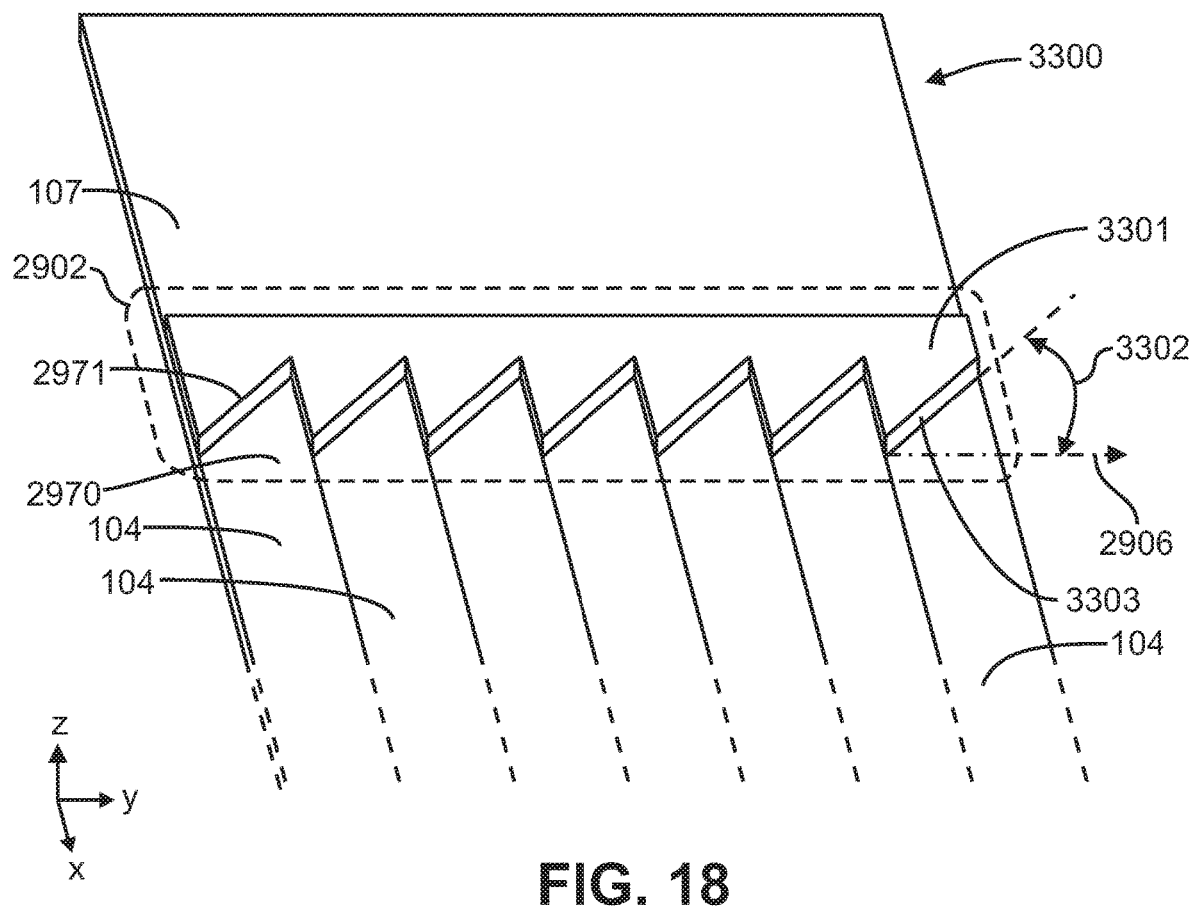
FIG. 18 is a perspective view of one embodiment of a light input coupler and lightguide including a relative position maintaining element disposed proximate a linear fold region.

FIG. 18 is a perspective view of one embodiment of a light input coupler and lightguide 3300 including a relative position maintaining element 3301 disposed proximal to a linear fold region 2902. In this embodiment, the relative position maintaining element 3301 has a cross-sectional edge 2971 in a plane (x-y plane as shown) parallel to the light transmitting film surface 2970 disposed proximal to the linear fold region 2902 that includes a substantially linear section 3303 oriented at an angle 3302 greater than 10 degrees to the direction 2906 parallel to the linear fold region 2902 for at least one coupling lightguide 104. In one embodiment, a substantially linear section 3303 is disposed at an angle of about 45 degrees to a direction parallel to the linear fold region 2902.

Figure 19:
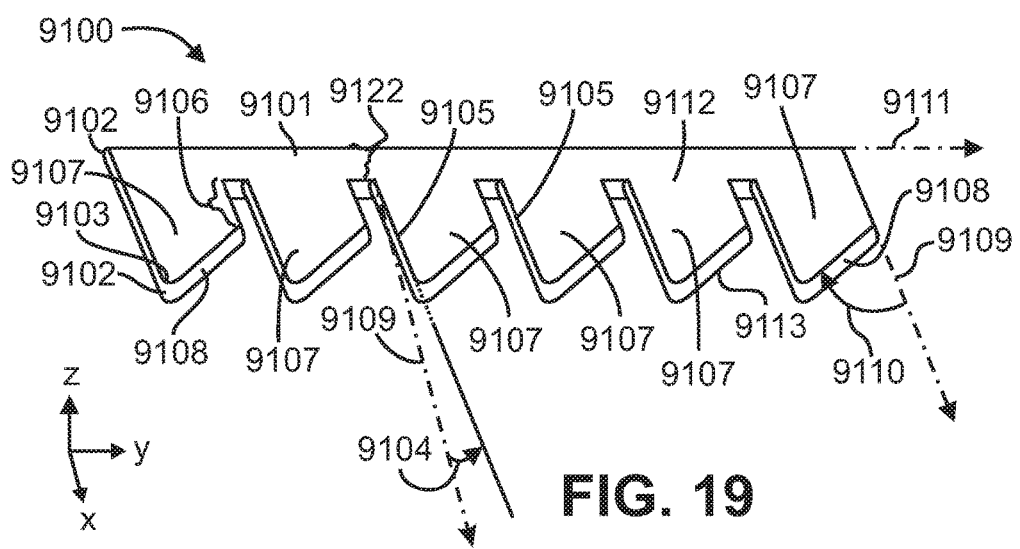
FIG. 19 is a perspective view of one embodiment of a relative position maintaining element (RPME) including a spine and truncated angled teeth.

FIG. 19 is a perspective view of one embodiment of a relative position maintaining element (RPME) 9100 including a spine 9101 defined within a spine region 9122 and angled teeth 9107 extending from the spine 9101 in the teeth extended direction 9109 (parallel to the +x direction) orthogonal to the array direction 9111 (parallel to they direction) of the angled teeth 9107. In this embodiment, the angled teeth 9107 include first edges 9108 oriented at a first tooth edge angle 9110 from the teeth extended direction 9109 and second edges 9105 oriented at a second tooth edge angle 9104 from the teeth extended direction 9109 in the x-y plane. The first edges 9108 and the second edges 9105 have curved edge profiles 9102 in the z direction. The curved edge profile 9102 can, for example, reduce the likelihood of tearing a coupling lightguide (not shown) by eliminating a sharp angle between the edges 9108, 9105 and the top surfaces 9112 and bottom surfaces 9113 of the RPME 9100. The curved edge profile 9102 permits a greater contact surface area (the curved edge profile 9102) for a coupling lightguide (not shown) folded around the edges such that the force due to tension is spread over a larger area than a 90 degree flat edges (where the force is typically concentrated along the linear edge interface between the surfaces) and therefore the coupling lightguide is less likely to tear. The intersection between the first edges 9108 and the second edges 9105 is a curved intersection 9103 in a cross-sectional plane parallel to the x-y plane. The curved intersection 9103 prevents a sharp intersection between the first edges 9108 and the second edges 9105 that could cause a tear in a coupling lightguide during assembly, folding, or stacking. In the embodiment shown in FIG. 19, the angled teeth 9107 have a truncated section 9106 between the spine 9101 and the first edges 9108. The truncated section 9106 of the angled teeth 9107 allows for a higher angular and/or positional tolerance for coupling lightguides (not shown) to position themselves against the first edges 9108 when they are folded around the angled teeth 9107. In this embodiment, for example, there is no corner formed from an intersection between the first edges 9108 and the second edges 9105 and the coupling lightguides could slide along the first edge 9108 and past the first edge 9108 (toward the spine 9101) without being stopped by a corner at an intersection between the first edges 9108 and the second edges 9105 at the spine 9101.

Figure 20:
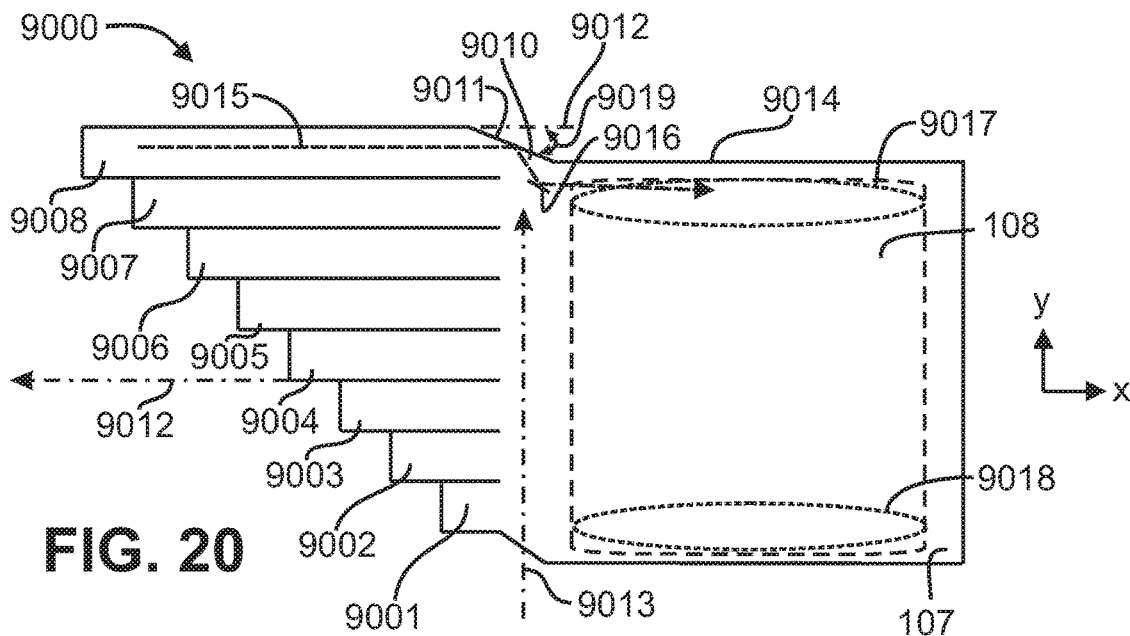
FIG. 20 is a top view of one embodiment of a film-based lightguide including a light mixing region extending past the light emitting region.

FIG. 20 is a top view of one embodiment of a film-based lightguide 9000 including coupling lightguides 9001, 9002, 9003, 9004, 9005, 9006, 9007, and 9008 cut from a lightguide 107 and separated from the light emitting region 108 by a light mixing region 9010. The light mixing region 9010 extends past the light emitting region 108 far lateral edge 9014 in a first direction 9013 orthogonal to the extended direction 9012 of the coupling lightguides 9001, 9002, 9003, 9004, 9005, 9006, 9007, and 9008. Light 9015 propagating through the eighth coupling lightguide 9008 (shown as light 9015 propagating before the coupling lightguides 9001, 9002, 9003, 9004, 9005, 9006, 9007, and 9008 folded in the +z and −y direction for clarity) reflects from an angled light mixing region lateral edge 9011 toward the light emitting region 108. The angled light mixing region lateral edge 9011 is oriented at a first extended orientation angle 9019 to the extended direction 9012 to direct light 9015 from the light mixing region 9010 toward the light emitting region 108 of the lightguide 107. In this embodiment, light 9015 totally internally reflects from an internal light directing edge 9016 formed by a cut in the lightguide 107, to direct it closer to the far area 9017 (the area of the light emitting region 108 further from the light input surface (not shown) of the folded and stacked coupling lightguides 9001, 9002, 9003, 9004, 9005, 9006, 9007, and 9008 when they are folded in the +z and −y direction) of the light emitting region 108 closer to the light emitting region far lateral edge 9014. In this embodiment, the eighth coupling lightguide 9008 can direct more light to the far area 9017 of the light emitting region 108 to increase the light flux arriving to the far area to compensate for the reduced light flux relative to the near area 9018 of the light emitting region 108 due to more flux being absorbed in the longer coupling lightguides (the eighth coupling lightguide 9008 and the seventh coupling lightguide 9007, for example) than the shorter coupling lightguides (the first coupling lightguide 9001 and the second coupling lightguide 9002, for example).

Figure 21:
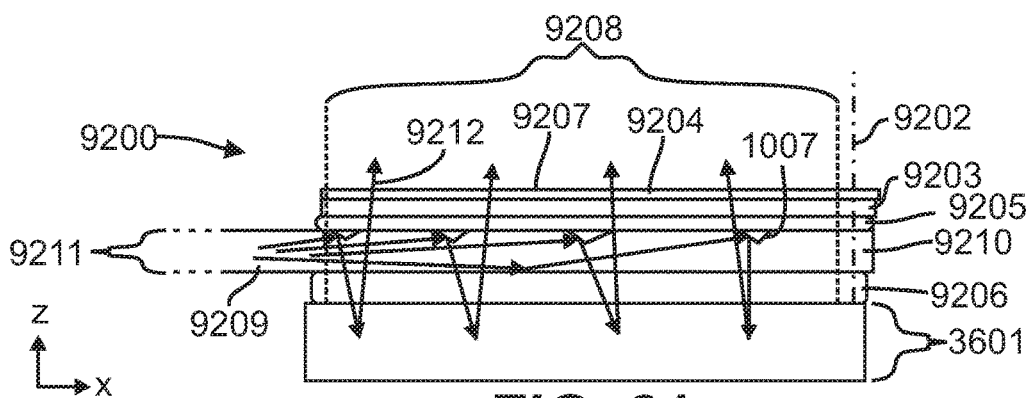
FIG. 21 is a cross-sectional side view of a portion of one embodiment of a spatial display illuminated by a frontlight including a film-based lightguide optically coupled to a reflective spatial light modulator and a scratch resistant hardcoating on a hardcoating substrate optically coupled to the film-based lightguide.

FIG. 21 is a cross-sectional side view of a portion of one embodiment of a spatial display 9200 illuminated by a frontlight 9211 including a film-based lightguide 9210 optically coupled to a reflective spatial light modulator 3601 using an adhesive 9206 (such as an acrylate-based pressure sensitive adhesive) in the active area 9208 of the reflective spatial light modulator 3601. After exiting the light source (not shown) and the folded, stacked coupling lightguides (not shown) light 9212 exits the light mixing region 9209 of the film-based lightguide 9210 and reflects from the light extracting features 1007 on the surface of the film-based lightguide 9210 toward the reflective spatial light modulator 3601 at angles near the surface normal 9202 of the reflective spatial light modulator 3601. The light 9212 reflects from the reflective spatial light modulator 3601 and passes back through the film-based lightguide 9210 and out of the spatial display 9200. A scratch resistant hardcoating 9204 on a hardcoating substrate 9203 protects the outer top surface 9207 of the spatial display 9200 and is optically coupled to the film-based lightguide 9210 using an adhesive 9205 (such as a silicone-based pressure sensitive adhesive). In this embodiment, the adhesive 9205 between the hardcoating substrate 9203 and the film-based lightguide 9210, and the adhesive 9206 between the film-based lightguide 9210 and the reflective spatial light modulator 3601 also function as cladding layers for the film-based lightguide 9210 and are shown partially coated in a region extended in the active area of the display but not coated completely across the light mixing region 9209 of the film-based lightguide 9210.

Figure 22:
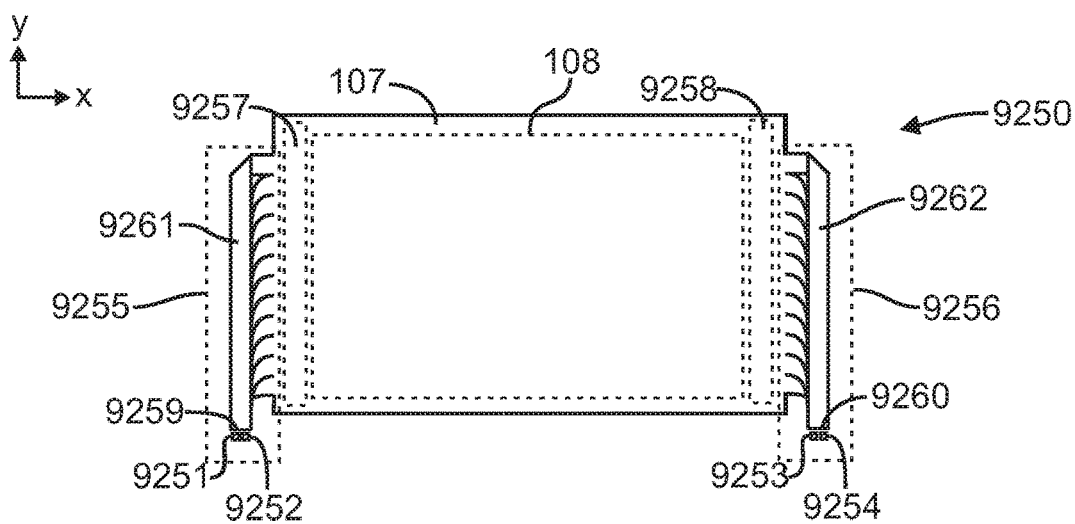
FIG. 22 is a top view of one embodiment of a light emitting device including light sources and photodetectors in two light input couplers.

FIG. 22 is a top view of one embodiment of a light emitting device 9250 with a first light input coupler 9255 and second light input coupler 9256 positioned on opposite sides of the lightguide 107. The first light input coupler 9255 includes a first stacked array of coupling lightguides 9261. The first light input coupler 9255 also includes a first light source 9251 positioned to emit light into a first light input surface 9259 of the first stacked array of coupling lightguides 9261 and a first photodetector 9252 positioned receive light from the first light input surface 9259. The second light input coupler 9256 includes a second stacked array of coupling lightguides 9262. The second light input coupler 9256 also includes a second light source 9253 positioned to emit light into a second light input surface 9260 of the second stacked array of coupling lightguides 9262 and a second photodetector 9254 positioned receive light from the second light input surface 9260. In this embodiment, the second photodetector 9254 can detect light from the first light source 9251 that propagates through the first stacked array of coupling lightguides 9261, a first light mixing region 9257, the light emitting region 108, a second light mixing region 9258, and the second stacked array of coupling lightguides 9262. Similarly, the first photodetector 9252 can detect light from the second light source 9253 that propagates through the second stacked array of coupling lightguides 9262, the second light mixing region 9258, the light emitting region 108, the first light mixing region 9257, and the first stacked array of coupling lightguides 9261. For example, in one embodiment, the first light source 9251 is briefly turned on while the second light source 9253 is turned off and the second photodetector 9254 measures the intensity of light received after passing through the regions of the lightguide 107. By comparing the relative intensity of light over time, the electrical power provided to the first light source 9251 can be increased to account for light output degradation of the first light source 9251 and/or increased light absorption through the film-based lightguide 107 (such as from the film yellowing over time) to substantially maintain a constant light output from the light emitting region 108 of the light emitting device 9250 (such as, for example, a constant luminance of the light emitting region 108 or a constant luminous intensity from the light emitting region 108 at zero degrees from the surface normal to the light emitting region 108). Similarly, the relative intensity of the light reaching the first photodetector 9252 from the second light source 9253 can be evaluated and the electrical power provided to the second light source 9253 may be adjusted accordingly to maintain a substantially constant light output from the light emitting region 108 of the light emitting device 9250. In one embodiment, the first light source 9251 includes a light emitting diode emitting light in a first wavelength bandwidth; and the second light source 9253 includes a light emitting diode emitting light in a second wavelength bandwidth. In another embodiment, the first photodetector 9252 includes a light emitting diode driven in reverse mode to detect light intensity within the second wavelength bandwidth; and/or the second photodetector 9254 includes a light emitting diode driven in reverse mode to detect light intensity within the first wavelength bandwidth.

Figure 23:
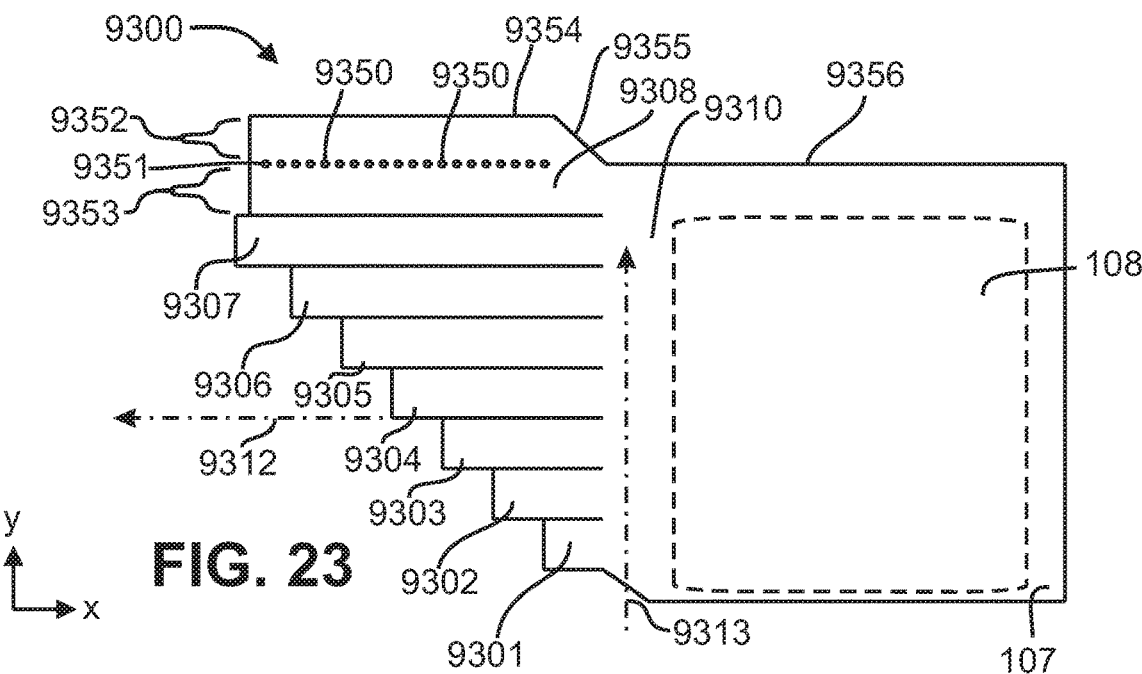
FIG. 23 is a top view of one embodiment of a film-based lightguide including an array of coupling lightguides and a sacrificial coupling lightguide including a perforation line.

FIG. 23 is a top view of one embodiment of a film-based lightguide 9300 including an array of coupling lightguides 9301, 9302, 9303, 9304, 9305, 9306, and 9307 in an array direction 9313 extended from the lightguide 107 in an extended direction 9312 and separated from the light emitting region 108 by a light mixing region 9310. The film-based lightguide 9300 further includes a sacrificial coupling lightguide 9308 including a perforation line 9351 defined by a linear array of perforations 9350 cut from the lightguide 107. The perforation line 9351 separates the top cover region 9353 from the side cover region 9352. In this embodiment, the far lateral edge 9354 of the sacrificial coupling lightguide 9308 extends past the lateral edge 9356 of the light emitting region 108 and includes an angled edge 9355. Also, the sacrificial coupling lightguide 9308 does not extend past the seventh coupling lightguide 9307 in the extended direction 9312.

Figure 24:
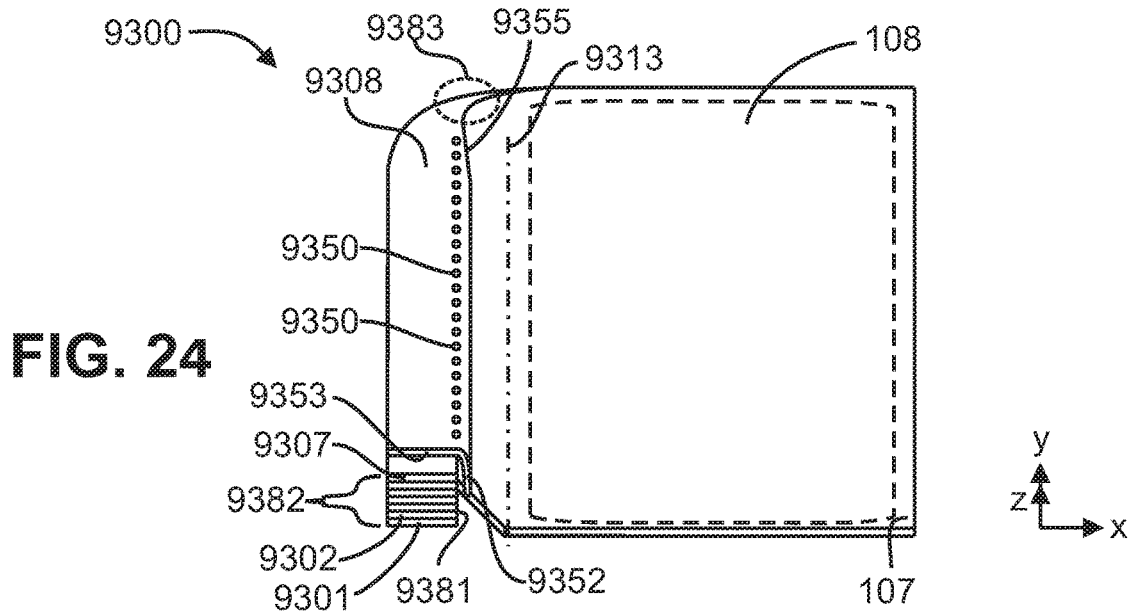
FIG. 24 is a perspective view of the film-based lightguide of FIG. 23 wherein the array of coupling lightguides and the sacrificial coupling lightguide are folded and stacked.

FIG. 24 is a perspective view of the film-based lightguide 9300 of FIG. 23 wherein the array of coupling lightguides 9301, 9302, 9303, 9304, 9305, 9306, and 9307 are folded and stacked in the −y direction and the +z direction to form a light input surface 9382 to receive light from a light source (not shown). The sacrificial coupling lightguide 9308 is also folded in the −y and +z direction such that the top cover region 9353 is positioned above the stack of coupling lightguides 9301, 9302, 9303, 9304, 9305, 9306, and 9307. The side cover region 9352 is bent along the perforation line 9351 in the −z direction such that the side cover region 9352 is positioned adjacent the lateral edges 9381 of the coupling lightguides 9301, 9302, 9303, 9304, 9305, 9306, and 9307. Since the sacrificial coupling lightguide 9308 does not extend past the seventh coupling lightguide 9307 in the extended direction 9312 before folding (as shown in FIG. 23), the sacrificial coupling lightguide 9308 does not extend to the light input surface 9382 after folding and does not receive a substantial amount of light from the light source (not shown) positioned adjacent the light input surface 9382. Light that is intentionally or unintentionally coupled into the sacrificial coupling lightguide 9308 can be directed into the light emitting region 108 by total internal reflection from the angled edge 9355. The angled edge 9355 of the sacrificial coupling lightguide 9308 permits the side cover region 9352 to be folded down (−z direction) without interfering with the fold region 9383 of the sacrificial coupling lightguide 9308. In this embodiment, the sacrificial coupling lightguide 9308 can protect the top, seventh coupling lightguide 9307 and the lateral edges 9381 of the coupling lightguides 9301, 9302, 9303, 9304, 9305, 9306, and 9307. In another embodiment, a wrap (not shown) extends around the top cover region 9353 and side cover region 9352 of the sacrificial coupling lightguide 9308 such that the wrap does not coupled light out of the top, seventh coupling lightguide 9307 or the lateral edges 9381 of the coupling lightguides 9301, 9302, 9303, 9304, 9305, 9306, and 9307.

Figure 25:
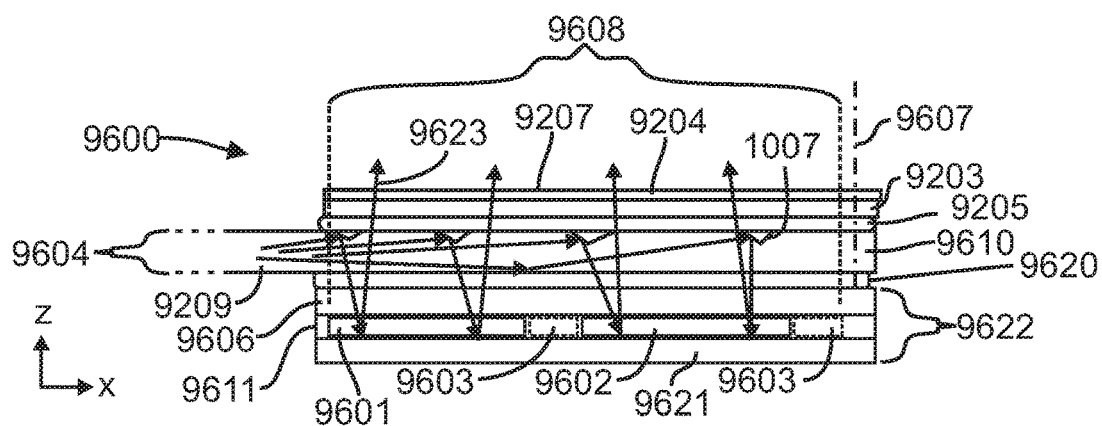
FIG. 25 is a cross-sectional side view of a portion of one embodiment of a spatial display illuminated by a frontlight including a film-based lightguide adhered and optically coupled to a color reflective display such that the light from the frontlight is directed toward the color filters of the color reflective display.

FIG. 25 is a cross-sectional side view of a portion of one embodiment of a spatial display 9600 illuminated by a frontlight 9604 including a film-based lightguide 9610. The film-based lightguide 9610 is optically coupled to a color reflective display 9622 including a color filter substrate 9606, a color filter layer 9611, and a reflective spatial light modulator 9621. In this embodiment, the film-based lightguide 9610 is adhered and optically coupled to the color reflective display 9622 using an adhesive 9620 (such as an optically clear pressure sensitive adhesive) to adhere the film-based lightguide 9610 to the color filter substrate 9606 in the active area 9608 of the color reflective display 9622. The color filter layer 9611 includes an array of first color filters 9601 and second color filters 9602 separated by inactive areas 9603 (areas without color filters 9601) of the color filter layer 9611. Light 9623, after exiting the light source (not shown) and the folded, stack coupling lightguides (not shown), propagating through the frontlight 9604 exits the film-based lightguide 9610 by reflecting from the light extracting features 1007 on the surface of the film-based lightguide 9610 toward the color reflective display 9622 at angles near the surface normal 9607 of the color reflective display 9622. The light 9623 is directed toward the first color filters 9601 and second color filters 9602 due to the physical and optical properties (such as position and facet angle) of the light extraction features 1007. In one embodiment, the light 9623 does not pass through the inactive areas 9603 of the color filter layer 9611. In another embodiment, by aligning the light extraction features 1007 with the first color filters 9601 and the second color filters 9602 and directing the light 9623 through the first color filters 9601 and second color filters 9602 at an angle near the surface normal 9607 of the color reflective display 9622, light 9623 is not directed to the inactive areas 9603 of the color filter layer 9611 where it could be absorbed. In the embodiment illustrated in FIG. 25, a scratch resistant hardcoating 9204 on a hardcoating substrate 9203 protects the outer top surface 9207 of the spatial display 9600 and is optically coupled to the film-based lightguide 9610 using an adhesive 9205 (such as a silicone-based pressure sensitive adhesive). In one embodiment, the adhesive 9205 between the hardcoating substrate 9203 and the film-based lightguide 9610, and the adhesive 9620 between the film-based lightguide 9610 and the color filter substrate 9606 also function as cladding layers for the film-based lightguide 9610 in the active area 9608 of the color reflective display 9622.

FIG. 26 is a top view of one embodiment of a light emitting device 9400 including a first light input coupler 9407 coupling light into a sub-display light emitting region 9402 of the film-based lightguide 107. The light emitting device 9400 further includes a second light input coupler 9408 and third light input coupler 9409 coupling light into a main display light emitting region 9401 of the film-based lightguide 107. Internal light directing edges 9410 defined by a cut 9412 in the lightguide 107 are positioned between the sub-display light emitting region 9402 and the main display light emitting region 9401 to reflect a portion of the light that would otherwise propagate from the sub-display light emitting region 9402 to the main display light emitting region 9401, or from the main display light emitting region 9401 to the sub-display light emitting region 9402. In another embodiment, a light absorbing material is optically coupled to the film-based lightguide 107 in the region between the sub-display light emitting region 9402 and the main display light emitting region 9401 to absorb light that would couple between the regions. For example, in one embodiment, a black plastic strip or reflective aluminum strip is positioned within the cut 9412.

FIG. 27 is a top view of one embodiment of a light emitting device 9500 including a main display 9501 and a sub-display 9502 illuminated by the light emitting device 9400 of FIG. 26. In this embodiment, the sub-display 9502 can provide information with a different use-mode or illumination mode. For example, in one embodiment, the sub-display 9502 provides icons 9503 and 9504 that may be illuminated for shorter time periods than the main display 9501 or can be illuminated by a single white light emitting diode in the first light input coupler 9407 which is different, for example, from red, green, and blue light emitting diodes providing illumination with a larger color gamut in the second light input coupler 9408 and third light input coupler 9409. In another embodiment, a first film-based lightguide and second film based lightguide (separated in at least their light emitting regions) are used to illuminate a main display and sub-display, respectively.

Figure 28:
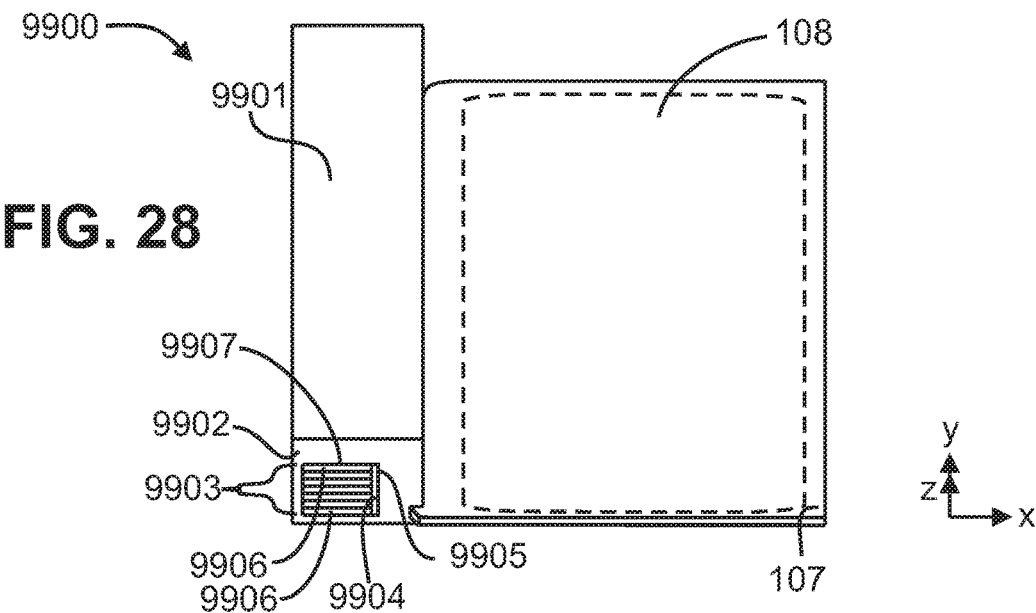
FIG. 28 is a perspective view of one embodiment of a wrapped lightguide including a film based lightguide, an array of coupling lightguides positioned within a cavity of a light input coupler housing, and a conformal wrap material inserted into the cavity.

FIG. 28 is a perspective view of one embodiment of a wrapped lightguide 9900 including a film based lightguide 107 and a light input coupler 9901. The light input coupler 9901 includes an array of coupling lightguides 9906 extending from the lightguide 107 that are folded and stacked to define a light input surface 9903. The coupling lightguides 9906 are positioned within a cavity 9905 of a light input coupler housing 9902. A conformal wrap material 9904 is inserted into the cavity 9905 that hardens or sets to maintain their relative positions, protect, and provide a low refractive index cladding for the coupling lightguides 9906. In on embodiment, the conformal wrap material 9904 is injected into the cavity 9905 of the light input coupler housing 9902 after the light input coupler housing 9902 is positioned around the coupling lightguides 9906. Also, in this embodiment, the light input surface 9903 of the coupling lightguides 9906 extends through an opening 9907 in the light input coupler housing 9902 such that the light input surface 9903 can receive light input.

Figure 29:
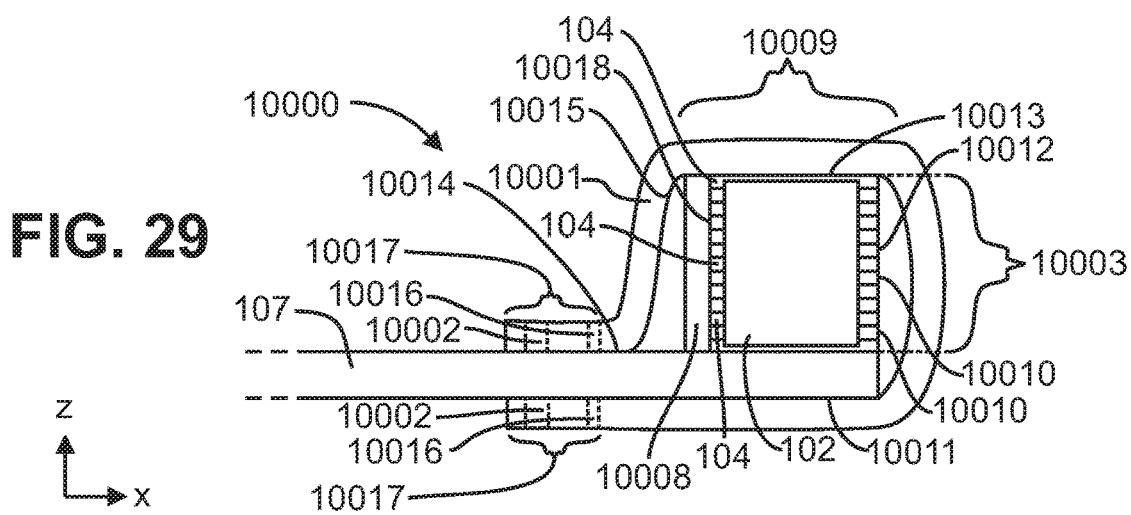
FIG. 29 is a cross-sectional side view of a portion of one embodiment of a light emitting device including the light source, the lightguide, a light input coupler, and a flexible wrap positioned around the folded, stacked array of coupling lightguides; and the wrap includes alignment guide holes in alignment guide regions and perforations that can be used to remove the alignment guide regions of the wrap.

FIG. 29 is a cross-sectional side view of a portion of one embodiment of a light emitting device 10000 including the light source 102, the lightguide 107, and a light input coupler 10009. The light input coupler 10009 includes the array of coupling lightguides 104 extended from the lightguide 107, folded around a RPME 10008, and stacked with the coupling lightguide 104 ends defining a light input surface 10003 positioned to receive light from the light source 102. The coupling lightguides 104 are aligned laterally (x direction) against a spine edge 10018 of the RPME 10008. The light emitting device 10000 further includes a flexible wrap 10001 positioned around the folded, stacked array of coupling lightguides 104. In one embodiment, the flexible wrap 10001 can physically protect the coupling lightguides 104 from scratches or contamination, maintain the relative position of the coupling lightguides 104 (such as to hold them in a compressed stack to occupy a small volume), intentionally couple out of the lightguide 107 light propagating within the cladding of the lightguide 107, or block stray light from exiting the light input coupler 10009. The wrap 10001 includes alignment guide holes 10002 in alignment guide regions 10017 that can be used to position the wrap 10001 in a folding device (not shown) such that it can be aligned to the lightguide 107, light input coupler 10009, or a component of the light input coupler 10009 during assembly. The wrap 10001 also includes perforations 10016 that can be used to remove the alignment guide regions 10017 of the wrap 10001 including the alignment guide holes 10002. For example, in one embodiment the alignment guide regions 10017 of the wrap 10001 are removed after adhering the wrap 10001 to the lightguide 107. The light emitting device 10000 further includes: a first surface 10011 of the lightguide 107 on the opposite side of the lightguide 107 than the stack of coupling lightguides 104; a surface 10012 including the lateral edges 10010 of the coupling lightguides 104; a third surface 10013 including the outer surface of the coupling lightguide 104 in the stack of coupling lightguides 104 furthest from the lightguide 107; and a fourth surface 10014 of the lightguide 107 on the same side of the lightguide 107 as the stack of coupling lightguides 104. In one embodiment, the flexible wrap 10001 includes a tape with an adhesive on the inner surface 10015 that adheres to one or more surfaces selected from the group: the first surface 10011, the second surface 10012, the third surface 10013, and the fourth surface 10014. In one embodiment, the wrap 10001 adheres to the first surface 10011 and the fourth surface 10014 and holds the coupling lightguides 104 together and toward the lightguide 107 in the z direction. In one embodiment, the wrap 10001 does not contact the second surface 10012 and there is an air gap between the lateral edges 10010 of the coupling lightguides 104 such that the wrap 10001 does not couple light out of the lateral edges 10010 of the coupling lightguides 104.

Figure 30:
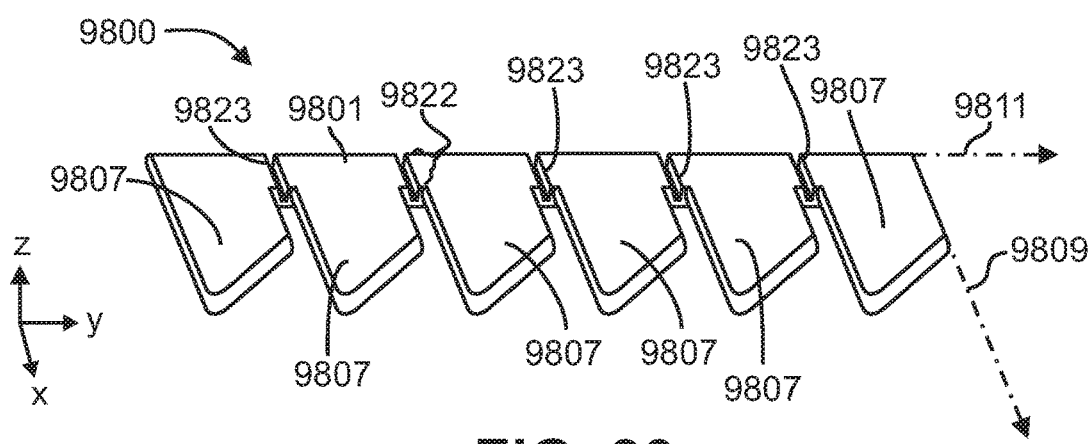
FIG. 30 is a perspective view of one embodiment of a relative position maintaining element (RPME) including a spine, angled teeth, and grooves in the spine region between the angled teeth such that the RPME can be bent and/or snapped and broken apart along the grooves.

FIG. 30 is a perspective view of one embodiment of a relative position maintaining element (RPME) 9800 including a spine 9801 defined within a spine region 9822 and angled teeth 9807 extending from the spine 9801 in the teeth extended direction 9809 (parallel to the +x direction) orthogonal to the array direction 9811 (parallel to the y direction) of the angled teeth 9807. The RPME 9800 includes grooves 9823 parallel to the teeth extended direction 9809 in the spine region 9822 between the angled teeth 9807 such that the RPME 9800 can be snapped and broken apart along the grooves 9823. In another embodiment, the RPME 9800 includes one or more separation mechanisms defined by perforations (not shown) in the spine region 9822 of the RPME 9800 such that the RPME 9800 can be snapped and broken apart along the one or more perforations.

Figure 31:
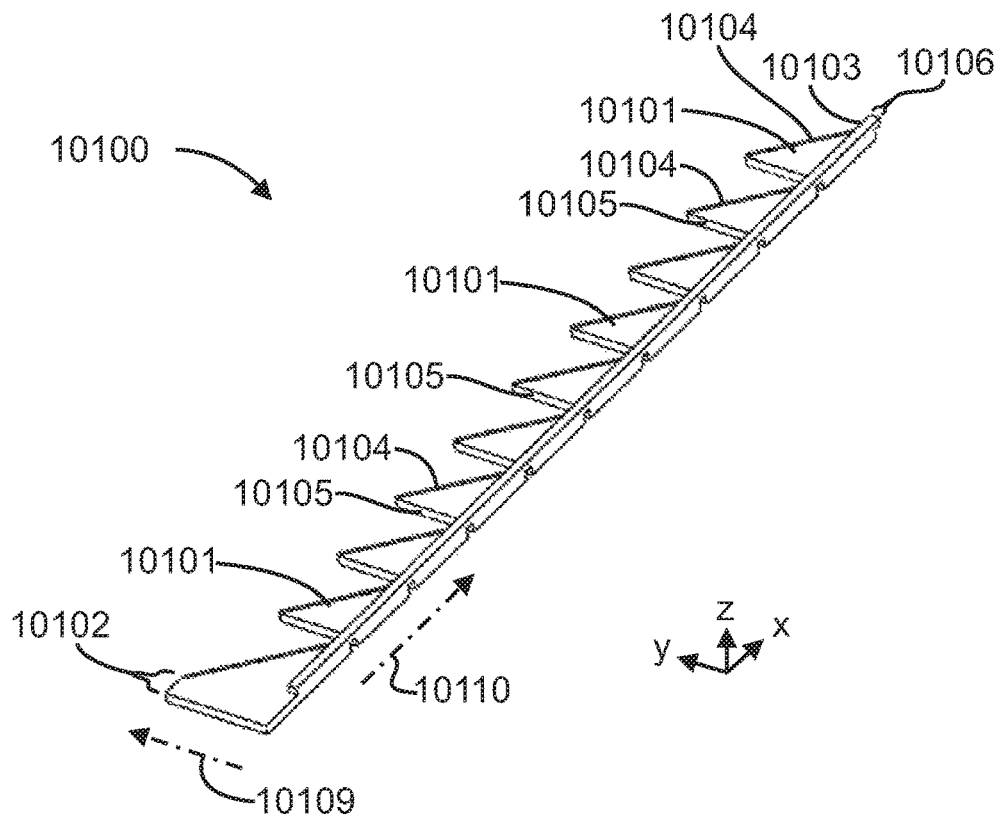
FIGS. 31, 32, and 33 are different perspective views of one embodiment of a relative position maintaining element including a spine and angled teeth that extend from beneath the spine.
Figure 32:
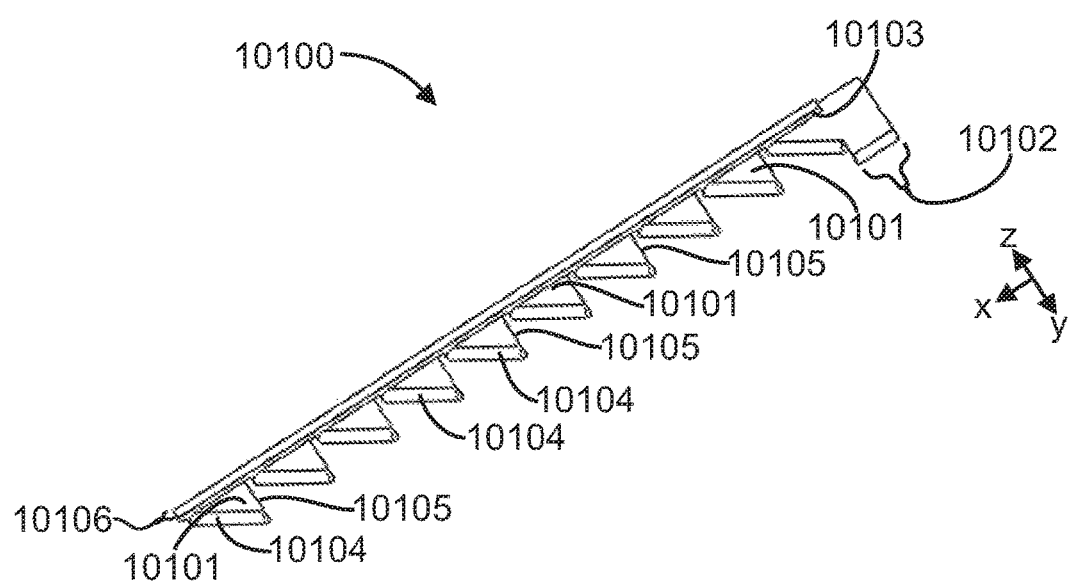
Figure 33:
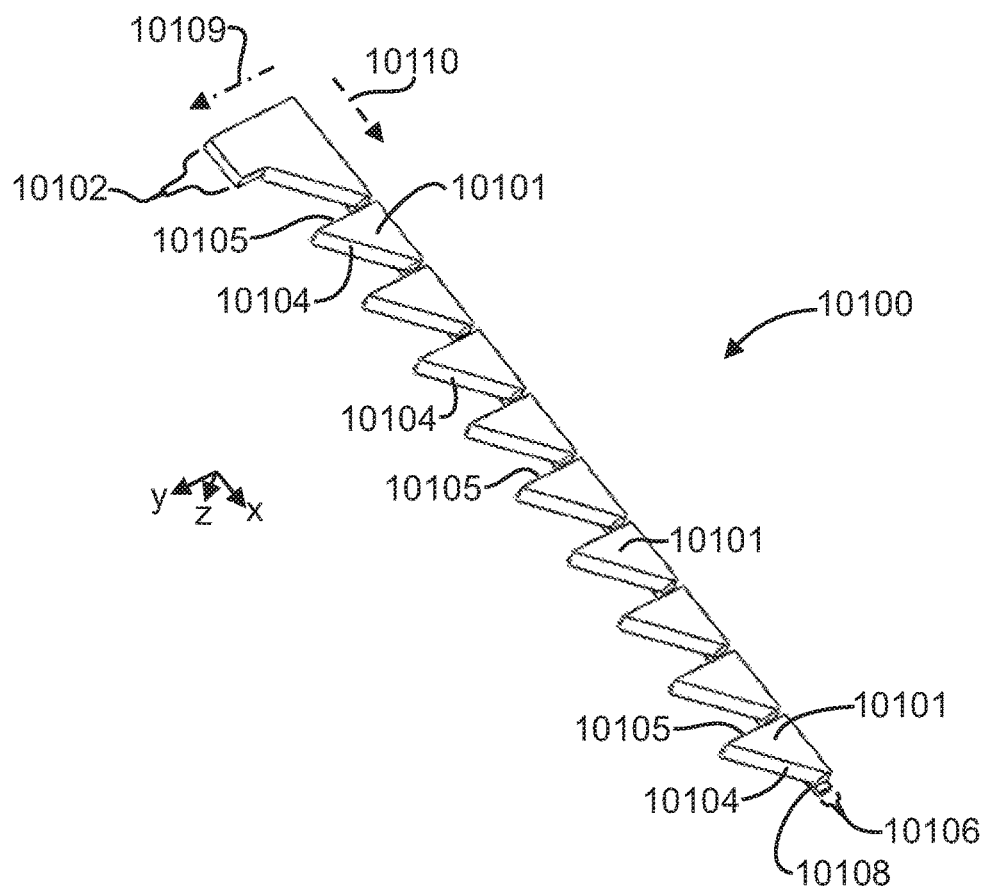

FIGS. 31, 32, and 33 are perspective views of one embodiment of a relative position maintaining element (RPME) 10100 including a spine 10106 and angled teeth 10101 extending in the teeth extended direction 10109 (parallel to the +y direction) orthogonal to the array direction 10110 (parallel to the x direction) of the angled teeth 10101. The angled teeth 10101 include first edges 10104 and second edges 10105. The first edges 10104 have curved edge profiles in the z direction. In this embodiment, the angled teeth 10101 extend from the spine 10106 that connects them together and are positioned beneath the spine 10106 (shown most clearly in FIG. 33 where one can see the angled teeth 10101 extending past the spine in the x-y plane). By starting the angled teeth 10101 from beneath the spine 10106, the volume of the RPME 10100 is reduced because the length of the RPME 10100 in the y direction is reduced relative to extending the angled teeth 10101 from the lateral edge 10108 of the spine 10106. In this embodiment, the angled teeth 10101 of the RPME 10100 are physically coupled by a spine 10106 that does not extend past the angled teeth 10101 in the x-y plane. The RPME 10100 further includes a platform region 10102 whereupon one or more elements of a light emitting device (such as for example, coupling lightguides, light sources, collimating optics, and reflective films) could be adhered to the RPME 10100.

Figure 34:
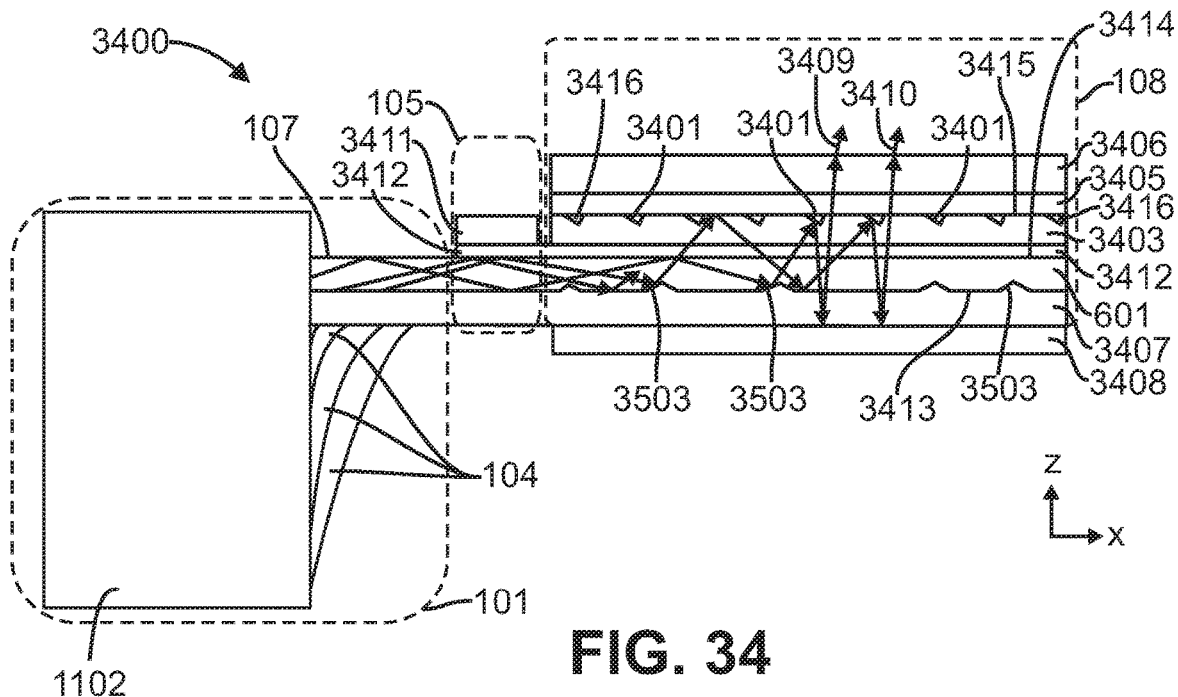
FIG. 34 is a cross-sectional side view of one embodiment of a light emitting device comprising low angle light directing features.

FIG. 34 is a cross-sectional side view of one embodiment of a light emitting device 3400 comprising the light input coupler 101, a film-based lightguide 107 comprising a core layer 601 of a core material with a core refractive index $n_{DL}$ optically coupled to a reflective spatial light modulator 3408 using a first pressure sensitive adhesive layer 3407 comprising a first material with a first refractive index $n_{D1}$. A light source 1102 with an optical axis parallel to the +y direction (into the page) is positioned to emit light into the folded stack of coupling lightguides 104. The film-based lightguide 107 comprises a plurality of low angle directing features 3503 on the lower surface 3413 of the core layer 601 of the film-based lightguide 107 and is optically coupled to a light turning film 3403 on the upper surface 3414 of the core layer 601 using a second pressure sensitive adhesive layer 3412 comprising a second material with a second refractive index $n_{D2}$. The light turning film 3403 comprises a plurality of light turning features 3401 on the top surface 3415 of the light turning film 3403 opposite the second pressure sensitive adhesive layer 3412. A third pressure sensitive adhesive layer 3405 optically couples a cover layer 3406 (such as a protective PET film or touchscreen film, for example) to the light turning film 3403 over a portion of the top surface 3415 such that air gaps 3416 are formed at the light turning features 3401. A light mixing region 105 is positioned between the light input coupler 101 and the light emitting region 108 of the light emitting device 3400. An opaque layer 3411 is optically coupled to the film-based lightguide 107 in the light mixing region 105 using the second pressure sensitive adhesive layer 3412. In this embodiment, the opaque layer 3411 is a light absorbing layer that absorbs at least 70% of the light within a wavelength range between 400 nanometers and 700 nanometers that reaches the opaque layer 3411 through the second pressure sensitive adhesive layer 3412. In this embodiment, first light 3409 and second light 3410 from the light source 1102 propagate through the coupling lightguides 104 within the light input coupler 101, totally internally reflect within the core layer 601 of the film-based lightguide 107 and propagate through the light mixing region 105 and into the light emitting region 108 of the film-based lightguide 107. First light 3409 reflects from a low angle directing feature 3503 to a second angle in the core layer 601 of the lightguide smaller than the incident angle by an average total angle of deviation of less than 20 degrees. In this embodiment, the second angle is less than the critical angle for the interface between the core layer 601 and second pressure sensitive adhesive layer 3412. In this embodiment, $n_{DL} > n_{D2} > n_{D1}$ such that the first light 3409 and the second light 3410 preferentially escape a total internal reflection condition within the core layer 601 of the film-based lightguide 107 on the upper surface 3414 of the core layer 601 since the refractive index, $n_{D2}$, of the second pressure sensitive adhesive layer 3412 is greater than the refractive index, $n_{D1}$, of the first pressure sensitive adhesive layer 3407. After transmitting from the core layer 601 into the second pressure sensitive adhesive layer 3412, the first light 3409 propagates into the light turning film 3403 and totally internally reflects from a light turning feature 3401 (due to the air gap 3416 of low refractive index material between the light turning feature 3401 and the third pressure sensitive adhesive layer) in the light turning film 3403 to an angle within 30 degrees from the thickness direction (parallel to the z direction in this embodiment) of the film-based lightguide 107. The first light 3409 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, does not interact a second time with a light turning feature 3401, and is emitted from the light emitting device 3400 in the light emitting region 108.

After being redirected by the low angle directing feature 3503, the second light 3410 propagates from the core layer 601 into the second pressure sensitive adhesive layer 3412 and into the light turning film 3403. The second light 3410 does not intersect a light turning feature 3401 on the first pass and totally internally reflects from the top surface 3415 of the light turning film 3403 between the light turning features 3401 and propagates back through the light turning film 3403, through the second pressure sensitive adhesive layer 3412, through the core layer 601 and totally internally reflects at the interface between the core layer 601 and the first pressure sensitive adhesive layer 3407, passes back through the aforementioned layers in reverse order and totally internally reflects from a light turning feature 3401 (due to the air gap 3416 of low refractive index material between the light turning feature 3401 and the third pressure sensitive adhesive layer) in the light turning film 3403 to an angle within 30 degrees from the thickness direction (parallel to the z direction in this embodiment) of the film-based lightguide 107. The second light 3410 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, and is emitted from the light emitting device 3400 in the light emitting region 108.

Figure 35:
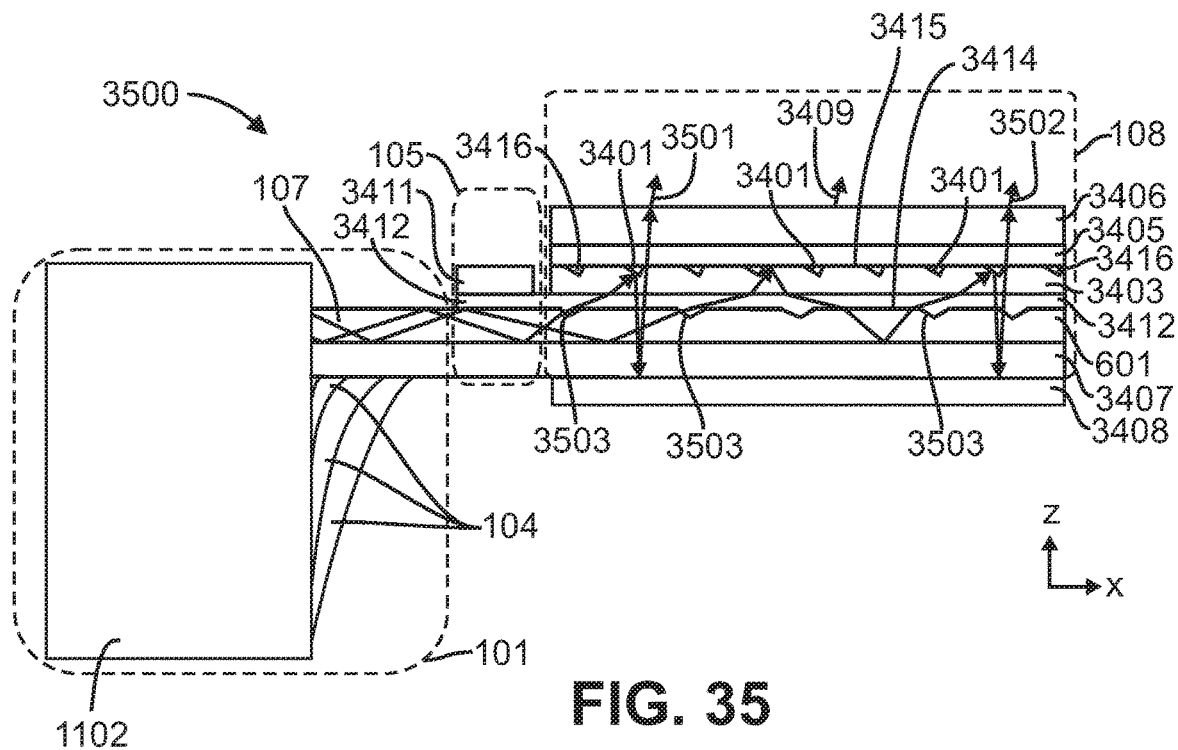
FIG. 35 is a cross-sectional side view of one embodiment of a light emitting device comprising light turning features.

FIG. 35 is a cross-sectional side view of one embodiment of a light emitting device 3500 comprising the light input coupler 101, a film-based lightguide 107 comprising a core layer 601 of a core material with a core refractive index $n_{DL}$ optically coupled to a reflective spatial light modulator 3408 using a first pressure sensitive adhesive layer 3407 comprising a first material with a first refractive index $n_{D1}$. A light source 1102 with an optical axis parallel to the +y direction (into the page) is positioned to emit light into the folded stack of coupling lightguides 104. The film-based lightguide 107 comprises a plurality of low angle directing features 3503 which are refractive on the upper surface 3414 of the core layer 601 of the film-based lightguide 107 and is optically coupled to a light turning film 3403 on the upper surface 3414 of the core layer 601 using a second pressure sensitive adhesive layer 3412 comprising a second material with a second refractive index $n_{D2}$. The light turning film 3403 comprises a plurality of light turning features 3401 on the top surface 3415 of the light turning film 3403 opposite the second pressure sensitive adhesive layer 3412. A third pressure sensitive adhesive layer 3405 optically couples a cover layer 3406 (such as a protective PET film or touchscreen film, for example) to the light turning film 3403 over a portion of the top surface 3415 such that air gaps 3416 are formed at the light turning features 3401. A light mixing region 105 is positioned between the light input coupler 101 and the light emitting region 108 of the light emitting device 3500. An opaque layer 3411 is optically coupled to the film-based lightguide 107 in the light mixing region 105 using the second pressure sensitive adhesive layer 3412. In this embodiment, the opaque layer 3411 is a light absorbing layer that absorbs at least 70% of the light within a wavelength range between 400 nanometers and 700 nanometers that reaches the opaque layer 3411 through the second pressure sensitive adhesive layer 3412. In this embodiment, first light 3501 and second light 3502 from the light source 1102 propagate through the coupling lightguides 104 within the light input coupler 101, totally internally reflect within the core layer 601 of the film-based lightguide 107 and propagate through the light mixing region 105 and into the light emitting region 108 of the film-based lightguide 107. First light 3501 refracts to a new angle smaller than the incident angle by an average total angle of deviation of less than 20 degrees at a low angle directing feature 3503 that is refractive such that it propagates out of the core layer 601 of the lightguide. In this embodiment, a portion of the light from within the core layer 601 that intersects a low angle directing feature 3503 which is refractive may transmit through the low angle directing feature 3503 and a portion may reflect from the low angle directing feature 3503. In this embodiment, $n_{DL} > n_{D2} > n_{D1}$ such that a portion of the light that reflects from the low angle directing feature 3503 may reflect at a total angle of deviation of less than 20 degrees such that it reflects from the boundary between the core layer 601 and the first pressure sensitive adhesive layer 3407 and exits the core layer 601 at the upper surface 3414 of the core layer 601. After crossing the interface between the core layer 601 and the second pressure sensitive adhesive, the first light 3501 then propagates through the second pressure sensitive adhesive layer 3412 into the light turning film 3403 and totally internally reflects from a light turning feature 3401 (due to the air gap 3416 of low refractive index material between the light turning feature 3401 and the third pressure sensitive adhesive layer) in the light turning film 3403 to an angle within 30 degrees from the thickness direction (parallel to the z direction in this embodiment) of the film-based lightguide 107. The first light 3501 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, does not interact a second time with a light turning feature 3401, and is emitted from the light emitting device 3500 in the light emitting region 108.

After being redirected by the low angle directing feature 3503, the second light 3502 propagates through the second pressure sensitive adhesive layer 3412 and into the light turning film 3403. The second light 3502 does not intersect a light turning feature 3401 on the first pass and totally internally reflects from the top surface 3415 of the light turning film 3403 between the light turning features 3401 and propagates back through the light turning film 3403, through the second pressure sensitive adhesive layer 3412, through the core layer 601 and totally internally reflects at the interface between the core layer 601 and the first pressure sensitive adhesive layer 3407, passes back through the aforementioned layers in reverse order and totally internally reflects from a light turning feature 3401 in the light turning film 3403 (due to the air gap 3416 of low refractive index material between the light turning feature 3401 and the third pressure sensitive adhesive layer) to an angle within 30 degrees from the thickness direction (parallel to the z direction in this embodiment) of the film-based lightguide 107. The second light 3502 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, and is emitted from the light emitting device 3500 in the light emitting region 108.

Figure 36:
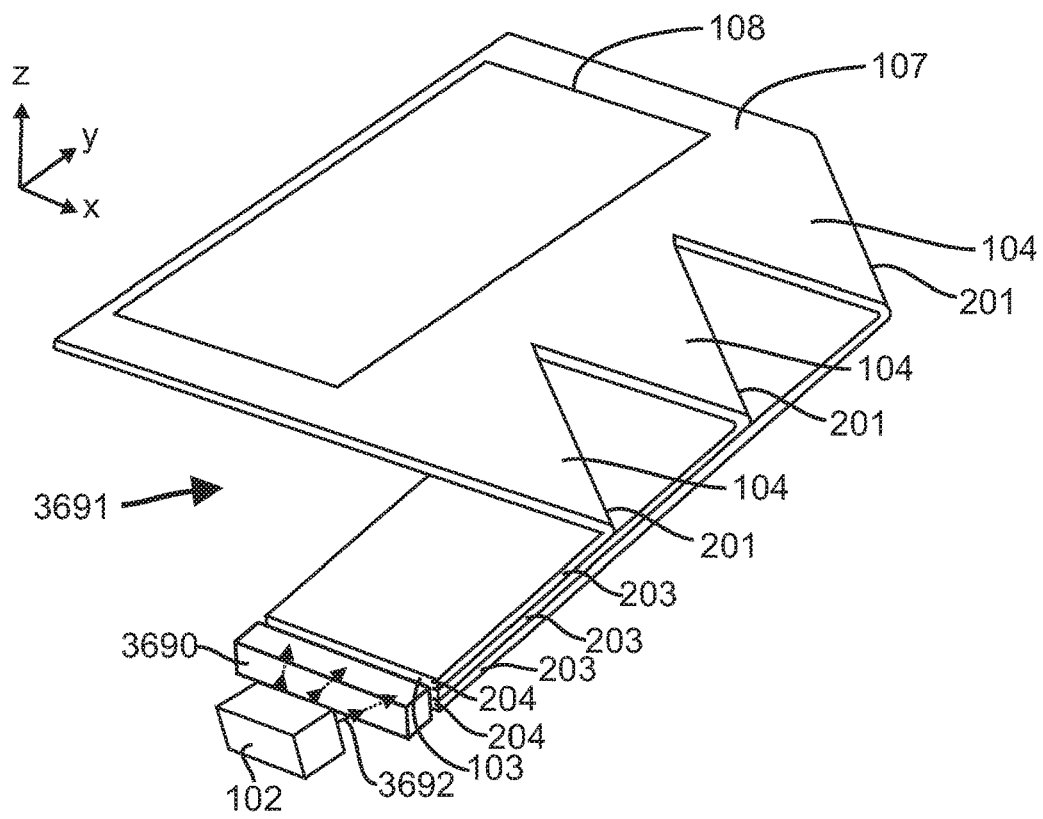
FIG. 36 is a perspective view of one embodiment of a light emitting device comprising a phase compensation element.

FIG. 36 is a perspective view of one embodiment of a light emitting device 3691 comprising a light input coupler 200 with coupling lightguides 104 folded in the −y direction. Light 3692 from the light source 102 is directed through a phase compensation optical element 3690 into the light input surface 103 through or along light input edges 204 of the coupling lightguides 104. A portion of the light from the light source 102 propagating within the coupling lightguides 104 with a directional component in the +y direction will reflect in the +x and −x directions from the lateral edges 203 of the coupling lightguides 104 and will reflect in the +z and −z directions from the top and bottom surfaces of the coupling lightguides 104. The light propagating within the coupling lightguides is redirected by the folds 201 in the coupling lightguides 104 toward the −x direction and the light emitting region 108 of the lightguide 107. In this embodiment, the phase compensation optical element 3690 pre-compensates for the phase deviation of the light propagating through the coupling lightguides 104 and the lightguide 107 such that a uniform or pre-determined spatial phase output profile of light emitting from the light emitting region 108 of the light emitting device 3691 is achieved.

Figure 37:
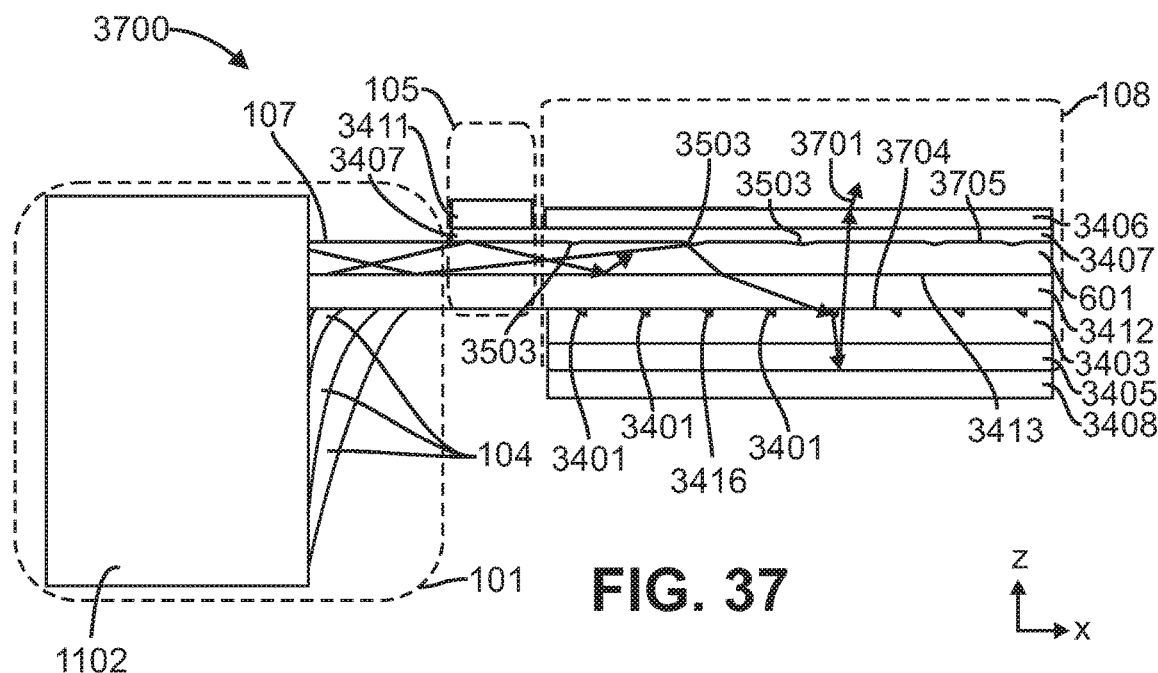
FIG. 37 is a cross-sectional side view of one embodiment of a light emitting device comprising light turning features and low angle directing features.

FIG. 37 is a cross-sectional side view of one embodiment of a light emitting device 3700 comprising the light input coupler 101, a film-based lightguide 107 comprising a core layer 601 of a core material with a core refractive index $n_{DL}$ optically coupled to a light turning film 3403 over a portion of the top surface 3704 of the light turning film 3403 (such that air gaps 3416 are formed at the light turning features 3401) using a second pressure sensitive adhesive layer 3412 comprising a second material with a second refractive index $n_{D2}$. The reflective spatial light modulator 3408 is optically coupled to the light turning film 3403 using a third pressure sensitive adhesive layer 3405. The light turning film 3403 comprises a plurality of light turning features 3401 on the top surface 3705 of the light turning film 3403 opposite the third pressure sensitive adhesive layer 3405. A light source 1102 with an optical axis parallel to the +y direction (into the page) is positioned to emit light into the folded stack of coupling lightguides 104. The film-based lightguide 107 comprises a plurality of low angle directing features 3503 on the top surface 3705 of the core layer 601 of the film-based lightguide 107 and is optically coupled to a cover layer 3406 (such as a protective PET film or touchscreen film, for example) using a first pressure sensitive adhesive layer 3407 comprising a first material with a first refractive index nm.

A light mixing region 105 is positioned between the light input coupler 101 and the light emitting region 108 of the light emitting device 3700. An opaque layer 3411 is optically coupled to the film-based lightguide 107 in the light mixing region 105 using the first pressure sensitive adhesive layer 3407. In this embodiment, the opaque layer 3411 is a light absorbing layer that absorbs at least 70% of the light within a wavelength range between 400 nanometers and 700 nanometers that reaches the opaque layer 3411 through the first pressure sensitive adhesive layer 3407. In this embodiment, first light 3701 from the light source 1102 propagates through the coupling lightguides 104 within the light input coupler 101, totally internally reflect within the core layer 601 of the film-based lightguide 107 and propagates through the light mixing region 105 and into the light emitting region 108 of the film-based lightguide 107. First light 3701 reflects from a low angle directing feature 3503 to a second angle in the core layer 601 of the lightguide smaller than the incident angle by an average total angle of deviation of less than 20 degrees. In this embodiment, the second angle is less than the critical angle for the interface between the core layer 601 and second pressure sensitive adhesive layer 3412. In this embodiment, $n_{DL}>n_{D2}>n_{D1}$ such that the first light 3701 preferentially escapes a total internal reflection condition within the core layer 601 of the film-based lightguide 107 on the lower surface 3413 of the core layer 601 since the refractive index, $n_{D2}$, of the second pressure sensitive adhesive layer 3412 is greater than the refractive index, $n_{D1}$, of the first pressure sensitive adhesive layer 3407. After transmitting from the core layer 601 into the second pressure sensitive adhesive layer 3412, the first light 3409 propagates into the light turning film 3403 and totally internally reflects from a light turning feature 3401 in the light turning film 3403 to an angle within 30 degrees from the thickness direction (parallel to the z direction in this embodiment) of the film-based lightguide 107. The first light 3409 then propagates through the third pressure sensitive adhesive layer 3405 and reflects from the reflective spatial light modulator 3408, passes back through the aforementioned layers in the reverse order, does not interact a second time with a light turning feature 3401, and is emitted from the light emitting device 3700 in the light emitting region 108.

Figure 38:
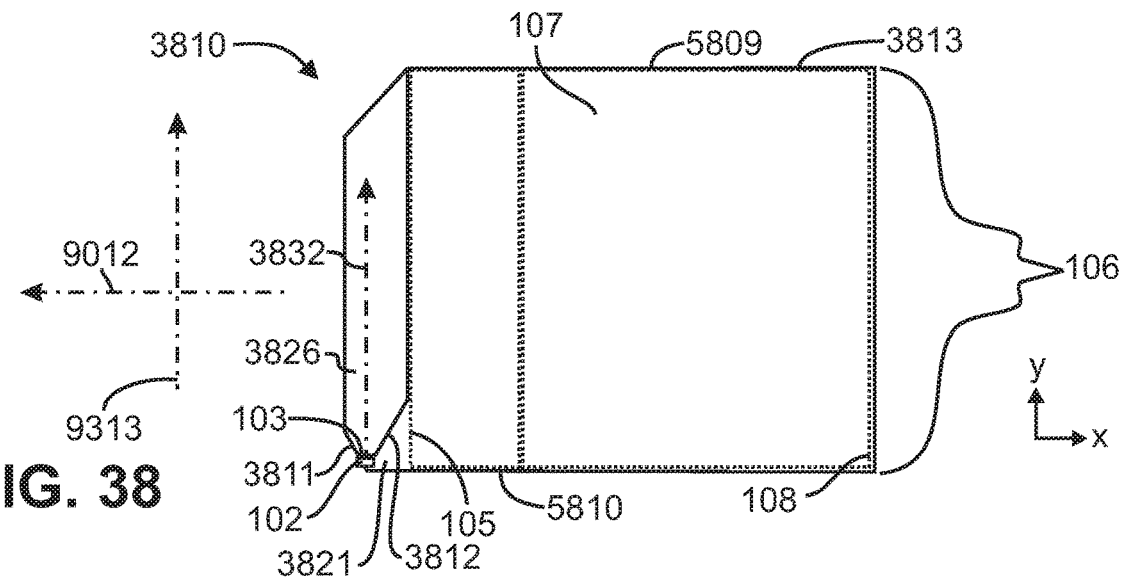
FIG. 38 is a top view of one embodiment of a light emitting device comprising a film-based lightguide with coupling lightguides with reduced width, offset light input edges.

FIG. 38 is a top view of one embodiment of a light emitting device 3810 comprising a film-based lightguide 3813 comprising an array of coupling lightguides including a first coupling lightguide 3821, second coupling lightguide 3822, third coupling lightguide 3823, fourth coupling lightguide 3824, fifth coupling lightguide 3825, and sixth coupling lightguide 3826 (shown unfolded in FIG. 39) arrayed in an array direction 9313 and extending in an extended direction 9012 from a lightguide region 106 comprising a light mixing region 105 and a light emitting region 108. The lightguide 107 comprises lateral edges (5809, 5810). The light source 102 is positioned between the lateral edges (5809, 5810) when the coupling lightguides (3821, 3822, 3823, 3824, 3825, 3826) are folded and the light source 102 is positioned to emit light into the light input surface 103. The light emitting device 3810 further comprises a light source 102 disposed to direct light into the coupling lightguides 104 through a light input surface 103 defined by a stack of reduced width, offset, light input edges 3833a, 3833b, 3833b, 3833c, 3833d, 3833e of the coupling lightguides 3821, 3822, 3823, 3824, 3825, 3826, respectively (shown in FIG. 39 and FIG. 40). Each coupling lightguide (3821, 3822, 3823, 3824, 3825, 3826) is folded ninety degrees along an angled fold 3814 oriented 45 degrees from the array direction 9313 such that the reduced width, offset, light input edges 3833a, 3833b, 3833b, 3833c, 3833d, 3833e of the coupling lightguides are stacked to form the light input surface 103. Each coupling lightguide (3821, 3822, 3823, 3824, 3825, 3826) is tapered inward toward the middle region of the coupling lightguide in the array direction, tapered toward the respective reduced width, offset, light input edge (3833a, 3833b, 3833b, 3833c, 3833d, 3833e) and toward the light source 102 (when folded), and comprises a reduced width, offset, light input edge 3833a, 3833b, 3833b, 3833c, 3833d, 3833e between a first lateral edge 3811 and a second lateral edge 3812 oriented at angles from the array direction 9313 greater than 0 degrees that redirect a portion of the light from the light source 102 at wider angles to the optical axis 3832 of the light source 102 (parallel to the extended direction 9012 when the coupling lightguides (3821, 3822, 3823, 3824, 3825, 3826) are not folded) to smaller angles closer to the optical axis 3832 of the light source 102. As shown in FIG. 38 (see also FIG. 40B), the light input surface 103 and the first reduced width, offset, light input edge 3833a (see also FIG. 39, FIG. 40A, and FIG. 40B) of the first coupling lightguide 3821 is positioned between the inner lateral edge 3829 and the outer lateral edge 3830 of the first coupling lightguide 3821 when the first coupling lightguide 3821 is folded along the angled fold 3814.

Figure 39:
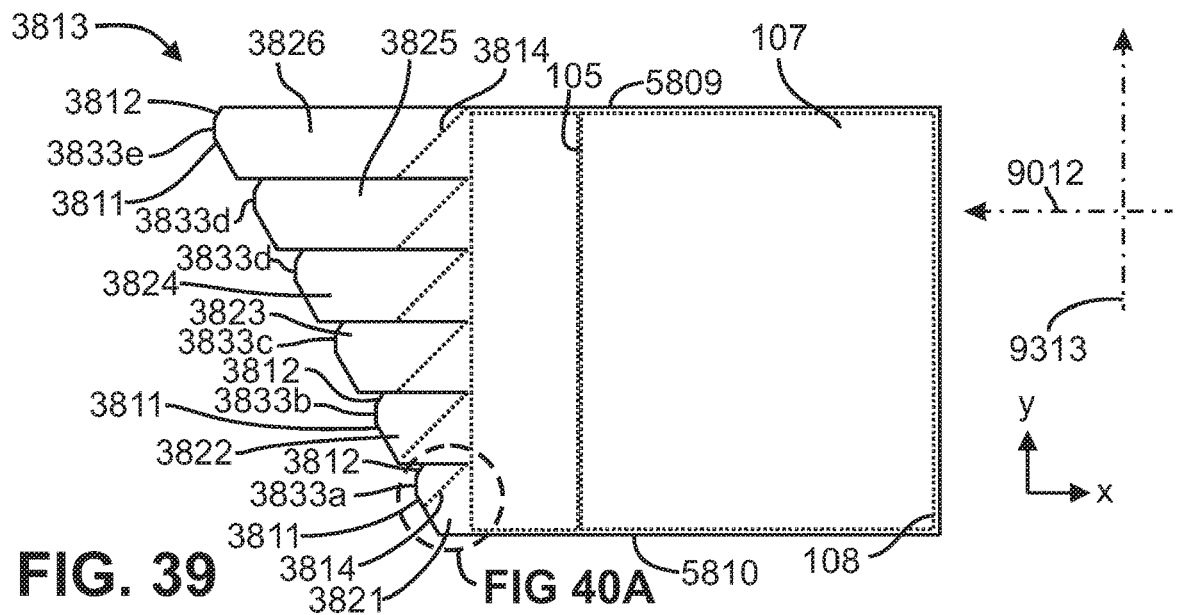
FIG. 39 is a top view of the light emitting device of the film-based lightguide of FIG. 38 not folded.

FIG. 39 is a top view of the film-based lightguide 3813 of FIG. 38 with each of the coupling lightguides (3821, 3822, 3823, 3824, 3825, 3826) in a planar form and not folded (such as prior to folding) along their angled fold 3814.

Figure 40A:
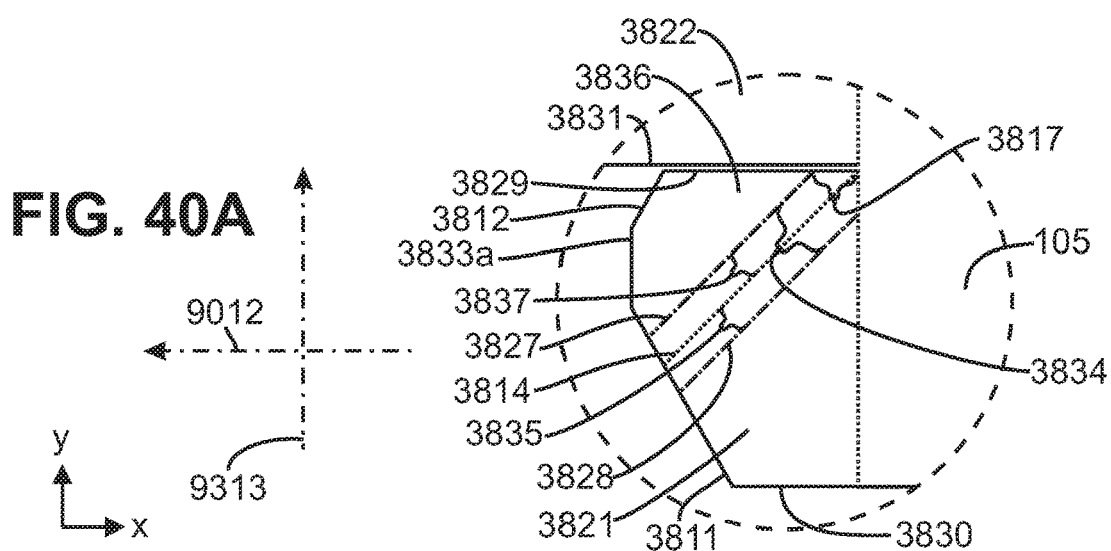
FIG. 40A is a close-up top view of the first coupling lightguide of FIG. 39.

FIG. 40A is a close-up top view of the first coupling lightguide 3821 of the film-based lightguide 3813 of FIG. 39. The reduced width, offset, light input edges 3833a, 3833b, 3833b, 3833c, 3833d, 3833e are offset from the center of the coupling lightguides (3821, 3822, 3823, 3824, 3825, 3826) in the width direction of the coupling lightguides (parallel to the array direction 9313 when unfolded in this embodiment). The first coupling lightguide 3821 comprises an outer lateral edge 3830 and an inner lateral edge 3829. The outer lateral edge 3831 of the second coupling lightguide 3822 is also shown. When the first coupling lightguide 3821 is folded along the angled fold 3814, the first line 3827 and the second line 3828 define the boundaries of a curved region 3834 of the first coupling lightguide 3821 that is curved (in a plane comprising the thickness direction of the film-based lightguide 3813 corresponding to the z direction out of the page in FIG. 40) when the first coupling lightguide 3821 folded. The first line 3827 is parallel with the angled fold 3814 and is located a curved extension length 3817 from the angled fold 3814 in the extended direction 9012 where the curved extension length 3817 for the first coupling lightguide 3821 is $\sqrt{2}/2 \times \pi \times R_1$ where $R_1$ is the radius of curvature of the angled fold 3814 of the first coupling lightguide 3821. The second line 3828 is parallel with the angled fold 3814 and is located a curved extension length 3817 from the angled fold 3814 in a direction opposite to the extended direction 9012 (+x direction in FIG. 40). The first distance 3837 between the first line 3827 and the angled fold 3814 in a direction orthogonal to the first line 3827 and the angled fold 3814 is $\pi/2 \times R_1$ where $R_1$ is the radius of curvature of the angled fold 3814 of the first coupling lightguide 3821. The second distance 3835 between the second line 3828 and the angled fold 3814 in a direction orthogonal to the second line 3828 and the angled fold 3814 is $$\frac{\pi}{2} \times R_1$$

where $R_1$ is the radius of curvature of the angled fold 3814 of the first coupling lightguide 3821 when folded such as shown in FIG. 38.

The first reduced width, offset, light input edge 3833a of the first coupling lightguide 3821 is offset from the outer lateral edge 3830 in the array direction 9313, offset in the extended direction 9012 from the first line 3827 and has a width in the width direction (parallel to the array direction 9313) of the first coupling lightguide 3821 when unfolded less than the width of the first coupling lightguide 3821 at the light mixing region 105. The first planar region 3836 of the first coupling lightguide 3821 is the region of the first coupling lightguide 3821 between the inner lateral edge 3829 of the first coupling lightguide 3821 and the first line 3827 that is a first curved extension length from the angled fold 3814 in the extended direction 9012. In this embodiment, the first reduced width, offset, light input edge 3833a is positioned within the first planar region 3836. The first lateral edge 3811 passes through the curved region 3834 and the angled fold 3814 and thus, the first lateral edge 3811 is reducing the angular width of the light from the light source 102 in FIG. 38 through the fold. In another embodiment, multiple reduced width, offset light input edges may be positioned in the first planar region 3836 to receive light from multiple light sources when folded.

Figure 40B:
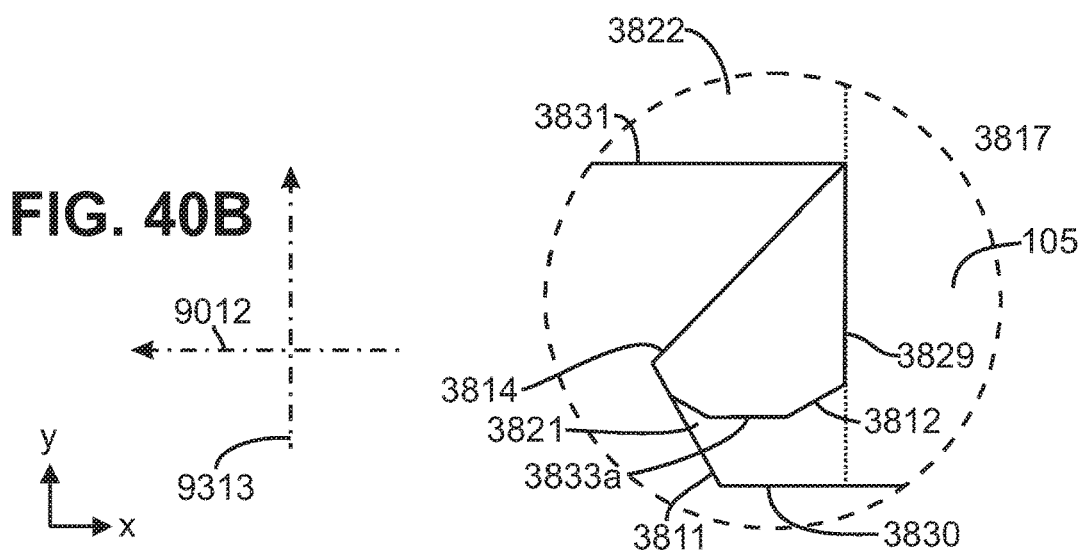
FIG. 40B is a close-up view of the first coupling lightguide of FIG. 39 with the first coupling lightguide folded.

FIG. 40B is a close-up top view of the first coupling lightguide 3821 folded at the angled fold 3814. As shown in FIG. 38 and FIG. 40B, the first reduced width, offset, light input edge 3833a of the first coupling lightguide 3821 is offset from the outer lateral edge 3830 in the array direction 9313 and positioned above the first coupling lightguide 3821 when the first coupling lightguide 3821 is folded along the angled fold 3814.

Figure 41:
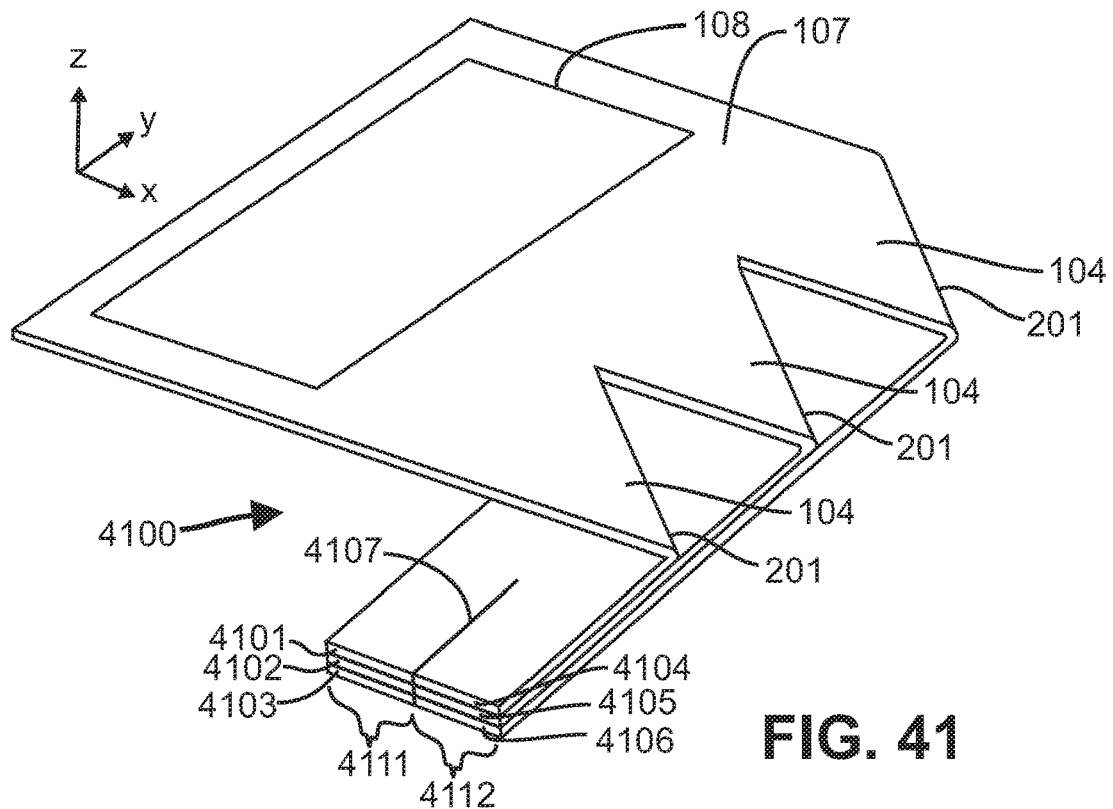
FIG. 41 is a perspective view of a film-based lightguide comprising coupling lightguides and sub-coupling lightguides.

FIG. 41 is a perspective view of one embodiment of a cut film-based lightguide 4100 including coupling lightguides 104 folded at folds 201 in the same direction (−y direction) and stacked in the z direction. Each of the coupling lightguides 104 is cut along a line 4107 from their end such that collectively they form a first sub-coupling lightguide stack 4111 of first sub-coupling lightguides (4101, 4102, 4103) adjacent a second sub-coupling lightguide stack 4112 of second sub-coupling lightguides (4104, 4105, 4106).

Figure 42:
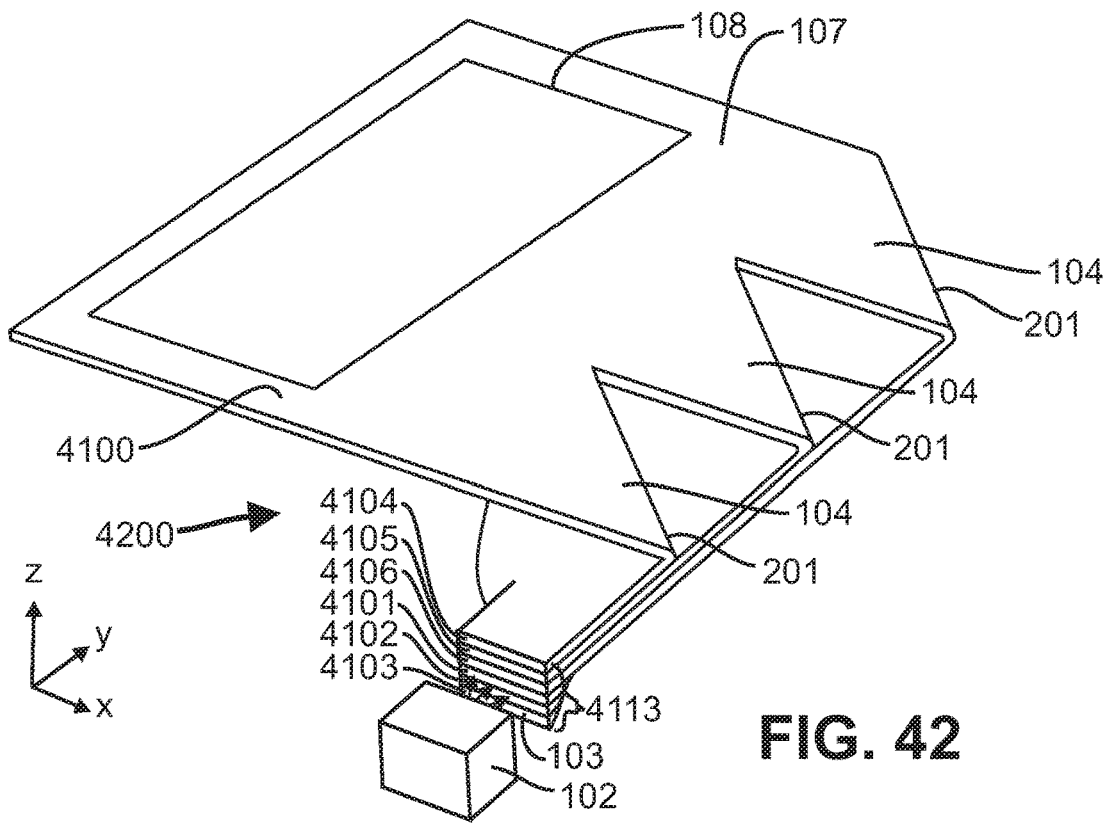
FIG. 42 is a perspective view of a portion of a light emitting device comprising the film-based lightguide of FIG. 41.

FIG. 42 is a perspective view of a light emitting device 4200 comprising the cut film-based lightguide 4100 of FIG. 41 and a light source 102. The first sub-coupling lightguide stack 4111 is positioned or moved such that the first sub-coupling lightguide stack 4111 is positioned below the second sub-coupling lightguide stack 4112 without folding the first sub-coupling lightguides (4101, 4102, 4103) and the second sub-coupling lightguides (4104, 4105, 4106). The first sub-coupling lightguides (4101, 4102, 4103) and the second sub-coupling lightguides (4104, 4105, 4106) are positioned in a single combined stack 4113 such that their ends (light input ends or bounding edges) are parallel and define a light input surface 103 and their lateral edges are parallel at the light input surface 103. Light from the light source 102 is directed into the light input surface 103 and propagates through the first sub-coupling lightguides (4101, 4102, 4103) and the second sub-coupling lightguides (4104, 4105, 4106), through the coupling lightguides 104 and into the light emitting region 108 of the film-based lightguide 107 where it leaves the film-based lightguide 107.

Figure 43:
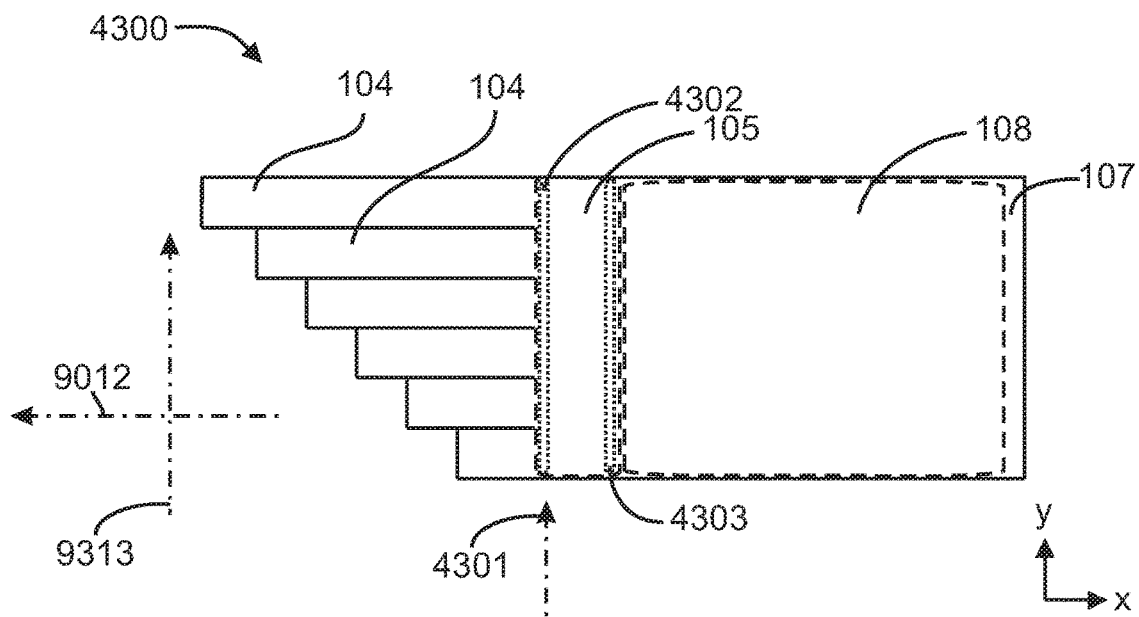
FIG. 43 is a top view of one embodiment of a film-based lightguide indicating uniformity measurement regions.

FIG. 43 is a top view of one embodiment of a film-based lightguide 107 including an array of coupling lightguides 104 extending from a side of the film-based lightguide 107. The film-based lightguide 107 comprises a light mixing region 105 between the array of coupling lightguides 104 and a light emitting region 108. The array of coupling lightguides 104 are arrayed in an array direction 9313 parallel to the y direction and extended in an extended direction 9012 parallel to the x direction. The width of the light mixing region 105 is the dimension of the light mixing region 105 in the width direction 4301 (parallel to the array direction in this embodiment) perpendicular to the extended direction 9012 and the thickness direction (the z direction out of the page). The uniformity of light propagating in the film-based lightguide 107 when the coupling lightguides 104 are folded and stacked to receive light from a light source may be evaluated in the region 4302 just after the array of coupling lightguides 104 or in the second region 4303 just prior to the light emitting region 108.

Figure 44:
FIG. 44 is a cross-sectional side view of a reflective display comprising an object in an edge region of the reflective display.

FIG. 44 is a cross-sectional side view of a reflective display 4400 comprising a reflective spatial light modulator 3601 positioned between a film-based lightguide 107 and at least a portion of a light input coupler 101 in the z direction. A cover layer 3406 (such as a protective PET film or touchscreen film, glass cover, glass touchscreen, for example) is positioned above the film-based lightguide 107 in the z direction opposite the reflective spatial light modulator 3601. Light from the light input coupler 101 propagates into the film-based lightguide 107 through an array of coupling lightguides, is extracted from the film-based lightguide 107 toward the active area of the reflective spatial light modulator 3601 where the light is modulated and reflected back through the film-based lightguide 107 and through the cover layer 3406. The cover layer 3406 extends past a lateral edge 4401 of the reflective spatial light modulator 3601 (such as the edge a reflective LCD), and a first object 4402 (such as a housing, holder, and/or mechanical fastener) is positioned below the cover layer 3406 in the thickness direction of the film-based lightguide 107 and along a side (lateral edge 4401) of the reflective spatial light modulator 3601 (such as adjacent an edge of a reflective LCD and below a cover lens comprising a touchscreen layer). The edge region 4403 of the reflective display 4400 is defined between the lower surface 4404 of the cover layer 3406 (in the thickness direction of the film-based lightguide 107 parallel to the z direction) and the lower surface 4406 of the reflective spatial light modulator 3601, and between a lateral edge 4401 of the reflective spatial light modulator 3601 and a distance from the lateral edge 4401 of the reflective spatial light modulator 3601 in a first direction 4405 in a plane (x-y plane) orthogonal to the thickness direction (z direction) equal to the distance the cover layer 3406 extends past the lateral edge 4401 in the first direction 4405. The first object 4402 is positioned in the edge region 4403 and may comprise all or a portion of one or more of the following elements: relative position maintaining element; one or more light sources positioned to emit light that propagates into a light input surface comprising a stack of coupling lightguides; a light redirecting optical element; a light collimating optical element; a printed circuit board comprising electrical components for the light source, an electrical driver for the reflective spatial light modulator 3601, a touchscreen, a microprocessor; a flexible printed circuit comprising electrical components for the light source, reflective spatial light modulator 3601, touchscreen, and/or microprocessor; and a thermal transfer element or heatsink thermally coupled to one or more light sources, electrical heat-dissipating elements, microprocessors, and/or reflective spatial light modulator drivers. In some embodiments, the cover layer 3406 is laminated or adhered to the film-based lightguide 107.

Figure 45:
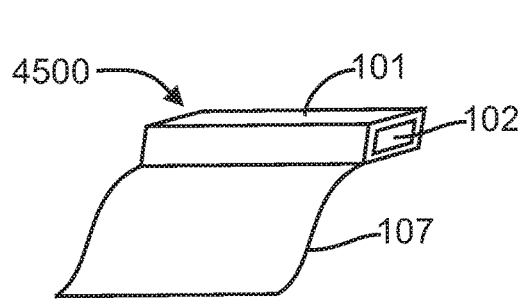
FIG. 45 is a perspective view of a film-based lightguide system comprising a film-based lightguide and a light input coupler comprising a light source.

FIG. 45 is a perspective view of a film-based lightguide system 4500 comprising a film-based lightguide 107 and a light input coupler 101 comprising a light source 102.

Figure 46:
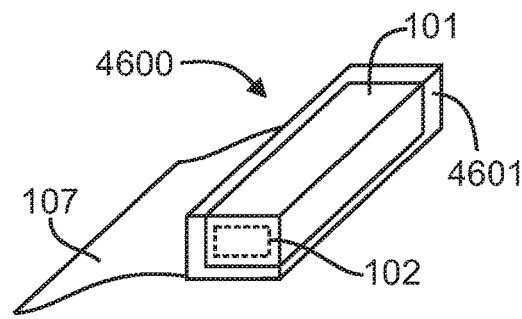
FIG. 46 is a perspective view of a film-based lightguide system comprising the film-based lightguide system of FIG. 45 and a metal heat sink formed along the side of the light input coupler and the light source.

FIG. 46 is a perspective view of a film-based lightguide system 4600 comprising the film-based lightguide system 4500 of FIG. 45 and a metal heat sink 4601 formed along the side of the light input coupler 101 and the light source 102, and bent or extruded along multiple sides of the optical coupling system or light input coupler 101.

FIG. 47 is a perspective view of a light emitting device 4700 comprising a film-based lightguide 107 comprising folded, stacked coupling lightguides 104 (outlined in dashed lines) within a coupling lightguide housing 4707 wherein their stacked ends define a light input surface 103 disposed to receive light from two light sources 102. The light sources 102 are thermally coupled (such as using a thermally conductive epoxy) to a thermal transfer element 4701. A thermal transfer element holder 4710 comprising a first cavity 4713 and a second cavity 4714 and the coupling lightguide housing 4707 are mounted on carrier substrate 4706 such that their positions relative to each other are fixed. Heat from the light sources 102 is conducted through the thermal transfer element 4701 and dissipated to the environment, dissipated within the first cavity 4713 and/or the second cavity 4714, and/or further conducted to the thermal transfer element holder 4710. When the thermal transfer element 4701 is translated in a direction parallel to direction of the optical axes 4702 of the light sources 102 (parallel to the +x axis in this embodiment), the thermal transfer element 4701 extends along the side of the coupling lightguides 104, the light sources 102 are positioned between the light input surface 103 and the thermal transfer element 4701, and the light from the light sources 102 propagates through the light input surface 103, through the coupling lightguides 104, and into the film-based lightguide where it may exit in a light emitting region 108. The thermal transfer element 4701 has a first dimension 4705 behind the light sources 102 in a direction (−x direction) opposite the optical axes 4702 of the light sources 102, a second dimension 4704 in a direction (parallel to they direction) orthogonal to the optical axes 4702 of the light sources 102 and the thickness direction (z direction) of the stacked coupling lightguides 104, and extends a third dimension 4703 alongside the one or more light sources 102 in a direction parallel to the optical axes 4702 of the light sources 102, past the one or more light sources 102, and past the light input surface 103 of the stack of coupling lightguides 104. In this embodiment, the thermal transfer element 4701 comprises a first extension 4711 and a second extension 4712 that extend past the light sources 102 in a direction (+x direction) parallel to the optical axes 4702 of the light sources. When the thermal transfer element 4701 is translated in a direction (+x direction) parallel to the optical axes 4702 of the light sources 102, the first extension 4711 mates into the first cavity 4713 and the second extension 4712 mates into the second cavity 4714 such that when the first extension 4711 and the second extension 4712 are fully inserted into first cavity 4713 and the second cavity 4714 of the thermal transfer element holder 4710, respectively, the location of the light sources 102 in the direction (x direction) parallel to the optical axes 4702, the thickness direction (z direction) of the stacked coupling lightguides 104, and the direction (y direction) orthogonal to the direction of the optical axes 4702 and the thickness direction is registered relative to the light input surface 103. In one embodiment, the thermal transfer element holder 4710, the coupling lightguide housing 4707, and/or the carrier substrate 4706 comprise and/or are a part of a relative position maintaining element for the coupling lightguides 104.

FIG. 48 is a cross-sectional side view of one embodiment of a light emitting device 4800 comprising a light input coupler 101, a film-based lightguide 107 comprising a core layer 601 of a core material with a core refractive index $n_{DL}$ optically coupled to a reflective spatial light modulator 3408 using a first pressure sensitive adhesive layer 3407 comprising a first material with a first refractive index $n_{D1}$. A light source 1102 with an optical axis parallel to the +y direction (into the page) is positioned to emit light into the folded stack of coupling lightguides 104. The film-based lightguide 107 comprises a plurality of low angle directing features 4801 comprising a printed light scattering material on the lower surface 3413 of the core layer 601 of the film-based lightguide 107 and is optically coupled to a light turning film 3403 on the upper surface 3414 of the core layer 601 using a second pressure sensitive adhesive layer 3412 comprising a second material with a second refractive index $n_{D2}$. The light turning film 3403 comprises a plurality of light turning features 3401 on the top surface 3415 of the light turning film 3403 opposite the second pressure sensitive adhesive layer 3412. A third pressure sensitive adhesive layer 3405 comprising a third material with a third refractive index $n_{D3}$ optically couples a cover layer 3406 (such as a protective PET film or touchscreen film, for example) to the light turning film 3403 over a portion of the top surface 3415 such that air gaps 3416 are formed at the light turning features 3401. A light mixing region 105 is positioned between the light input coupler 101 and the light emitting region 108 of the light emitting device 4800. An opaque layer 3411 is optically coupled to the film-based lightguide 107 in the light mixing region 105 using the second pressure sensitive adhesive layer 3412. In this embodiment, the opaque layer 3411 is a light absorbing layer that absorbs at least 70% of the light within a wavelength range between 400 nanometers and 700 nanometers that reaches the opaque layer 3411 through the second pressure sensitive adhesive layer 3412. In this embodiment, first light 3409 and second light 3410 from the light source 1102 propagate through the coupling lightguides 104 within the light input coupler 101, totally internally reflect within the core layer 601 of the film-based lightguide 107 and propagate through the light mixing region 105 and into the light emitting region 108 of the film-based lightguide 107. First light 3409 reflects from a low angle directing feature 4801 to a second angle in the core layer 601 of the lightguide smaller than the incident angle by an average total angle of deviation of less than 20 degrees. In this embodiment, the second angle is less than the critical angle for the interface between the core layer 601 and second pressure sensitive adhesive layer 3412. In this embodiment, $n_{DL} > n_{D2} > n_{D1}$ such that the first light 3409 and the second light 3410 preferentially escape a total internal reflection condition within the core layer 601 of the film-based lightguide 107 on the upper surface 3414 of the core layer 601 since the refractive index, $n_{D2}$, of the second pressure sensitive adhesive layer 3412 is greater than the refractive index, $n_{D1}$, of the first pressure sensitive adhesive layer 3407. In this embodiment, the refractive index, $n_{D3}$, of the third pressure sensitive adhesive layer 3405 is less than or equal to the refractive index, $n_{D1}$, of the first pressure sensitive adhesive layer 3407 at the sodium wavelength. After transmitting from the core layer 601 into the second pressure sensitive adhesive layer 3412, the first light 3409 propagates into the light turning film 3403 and totally internally reflects from a light turning feature 3401 (due to the air gap 3416 of low refractive index material between the light turning feature 3401 and the third pressure sensitive adhesive layer) in the light turning film 3403 to an angle within 30 degrees from the thickness direction (parallel to the z direction in this embodiment) of the film-based lightguide 107. The first light 3409 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, does not interact a second time with a light turning feature 3401, and is emitted from the light emitting device 4800 in the light emitting region 108.

After being redirected by the low angle directing feature 4801, the second light 3410 propagates from the core layer 601 into the second pressure sensitive adhesive layer 3412 and into the light turning film 3403. The second light 3410 does not intersect a light turning feature 3401 on the first pass and totally internally reflects from the top surface 3415 of the light turning film 3403 between the light turning features 3401 and propagates back through the light turning film 3403, through the second pressure sensitive adhesive layer 3412, through the core layer 601 and totally internally reflects at the interface between the core layer 601 and the first pressure sensitive adhesive layer 3407, passes back through the aforementioned layers in reverse order and totally internally reflects from a light turning feature 3401 (due to the air gap 3416 of low refractive index material between the light turning feature 3401 and the third pressure sensitive adhesive layer) in the light turning film 3403 to an angle within 30 degrees from the thickness direction (parallel to the z direction in this embodiment) of the film-based lightguide 107. The second light 3410 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, and is emitted from the light emitting device 4800 in the light emitting region 108.

FIG. 49 is a close-up view of a light turning feature 3401 of the light emitting device 4800 of FIG. 48. The light turning feature 3401 comprises a first angled surface 4803 and a second angled surface 4804. In this embodiment, the third pressure sensitive adhesive layer 3405 is in contact with a portion 4805 of the surface of the first angled surface 4803. In some embodiments, the area of the portion 4805 is reduced by reducing the thickness of the third pressure sensitive adhesive layer 3405, increasing the viscosity of the third material, or by other means disclosed herein.

Figure 50:
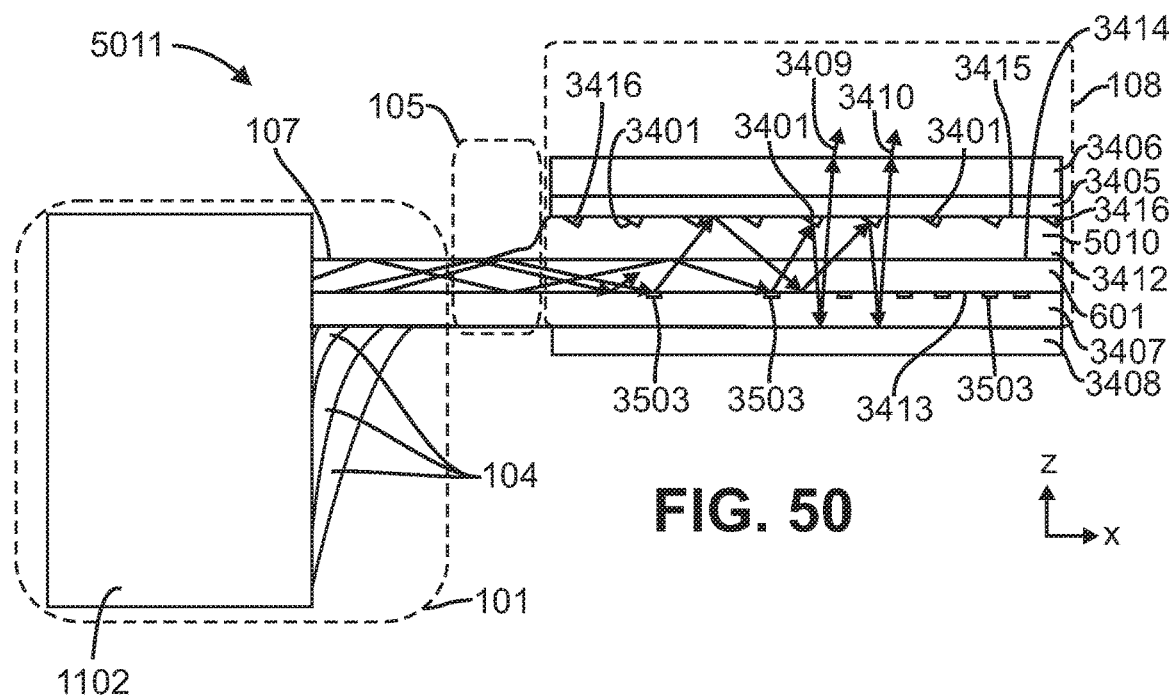
FIG. 50 is a cross-sectional side view of one embodiment of a light emitting device comprising a light turning film formed by coating a light turning film material on the upper surface of the core layer.

FIG. 50 is a cross-sectional side view of one embodiment of a light emitting device 5011 comprising a light input coupler 101, a film-based lightguide 107 comprising a core layer 601 of a core material with a core refractive index $n_{DL}$ optically coupled to a reflective spatial light modulator 3408 using a first pressure sensitive adhesive layer 3407 comprising a first material with a first refractive index $n_{D1}$. A light source 1102 with an optical axis parallel to the +y direction (into the page) is positioned to emit light into the folded stack of coupling lightguides 104. The film-based lightguide 107 comprises a plurality of low angle directing features 4801 comprising a printed light scattering material on the lower surface 3413 of the core layer 601 of the film-based lightguide 107. A light turning film 5010 is formed by coating a light turning film material with a refractive index, $n_{Dt}$, on the upper surface 3414 of the core layer 601. The coating of the light turning film 5010 in this embodiment tapers (reduces in thickness) in the light mixing region 105 and does not extend onto the coupling lightguides 104. The light turning film 5010 comprises a plurality of light turning features 3401 on the top surface 3415 of the light turning film 5010 opposite the core layer 601. A third pressure sensitive adhesive layer 3405 comprising a third material with a third refractive index $n_{D3}$ optically couples a cover layer 3406 (such as a protective PET film or touchscreen film, for example) to the light turning film 5010 over a portion of the top surface 3415 such that air gaps 3416 are formed at the light turning features 3401. A light mixing region 105 is positioned between the light input coupler 101 and the light emitting region 108 of the light emitting device 5011. In this embodiment, first light 3409 and second light 3410 from the light source 1102 propagate through the coupling lightguides 104 within the light input coupler 101, totally internally reflect within the core layer 601 of the film-based lightguide 107 and propagate through the light mixing region 105 and into the light emitting region 108 of the film-based lightguide 107. First light 3409 reflects from a low angle directing feature 4801 to a second angle in the core layer 601 of the lightguide smaller than the incident angle by an average total angle of deviation of less than 20 degrees. In this embodiment, the second angle is less than the critical angle for the interface between the core layer 601 and the light turning film 5010. In this embodiment, $n_{DL} > n_{Dr} > n_{D1}$ such that the first light 3409 and the second light 3410 preferentially escape a total internal reflection condition within the core layer 601 of the film-based lightguide 107 on the upper surface 3414 of the core layer 601 since the refractive index, $n_{Dr}$, of the light turning film 5010 is greater than the refractive index, $n_{D1}$, of the first pressure sensitive adhesive layer 3407. In this embodiment, the refractive index, $n_{D3}$, of the third pressure sensitive adhesive layer 3405 is less than or equal to the refractive index, $n_{Dr}$, of the light turning film at the sodium wavelength. After transmitting from the core layer 601 into the light turning film 5010, the first light 3409 totally internally reflects from a light turning feature 3401 (due to the air gap 3416 of low refractive index material between the light turning feature 3401 and the third pressure sensitive adhesive layer) in the light turning film 5010 to an angle within 30 degrees from the thickness direction (parallel to the z direction in this embodiment) of the film-based lightguide 107. The first light 3409 then propagates back through the light turning film 5010, the core layer 601, and the first pressure sensitive adhesive layer 3407, reflects from the reflective spatial light modulator 3408, passes back through the aforementioned layers in the reverse order, does not interact a second time with a light turning feature 3401, and is emitted from the light emitting device 5011 in the light emitting region 108.

After being redirected by the low angle directing feature 4801, the second light 3410 propagates from the core layer 601 into the light turning film 5010. The second light 3410 does not intersect a light turning feature 3401 on the first pass and totally internally reflects from the top surface 3415 of the light turning film 5010 between the light turning features 3401 and propagates back through the light turning film 5010, through the core layer 601 and totally internally reflects at the interface between the core layer 601 and the first pressure sensitive adhesive layer 3407, passes back through the aforementioned layers in reverse order and totally internally reflects from a light turning feature 3401 (due to air gap 3416 of low refractive index material between the light turning feature 3401 and the third pressure sensitive adhesive layer) in the light turning film 5010 to an angle within 30 degrees from the thickness direction (parallel to the z direction in this embodiment) of the film-based lightguide 107. The second light 3410 then propagates back through the light turning film 5010, the core layer 601, and the first pressure sensitive adhesive layer 3407, reflects from the reflective spatial light modulator 3408, passes back through the aforementioned layers in the reverse order, and is emitted from the light emitting device 5011 in the light emitting region 108.

Figure 51:
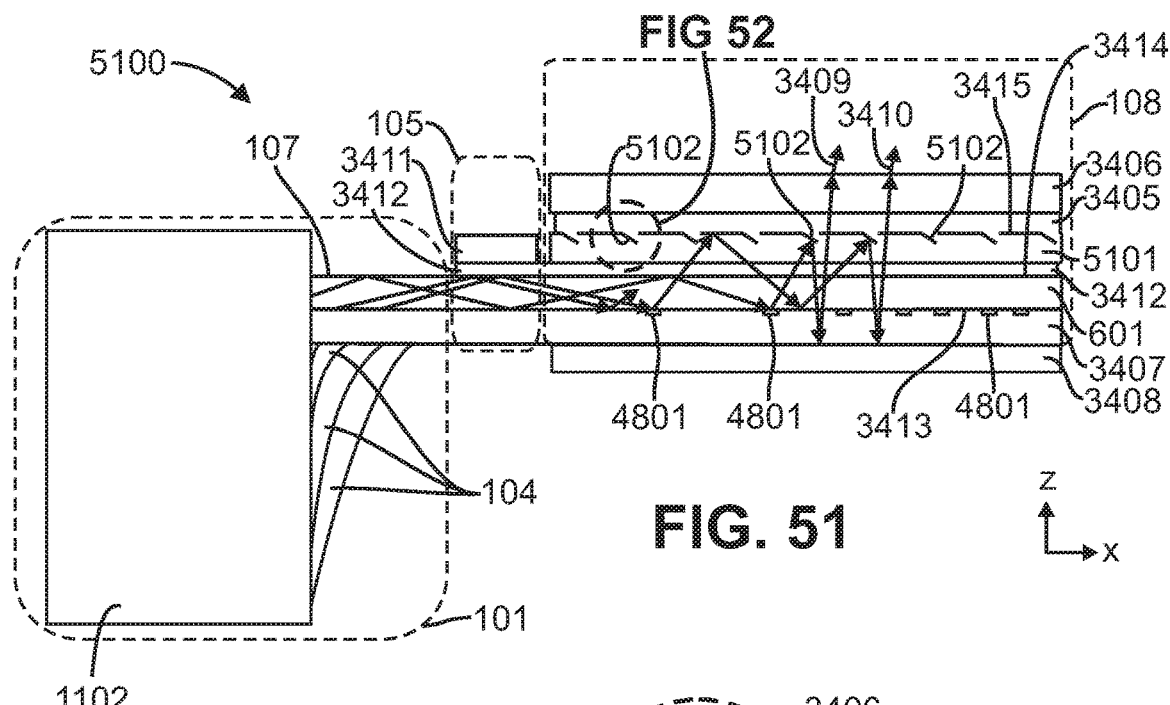
FIG. 51 is a cross-sectional side view of one embodiment of a light emitting device comprising a coating or layer positioned on the first angled surface of a base layer of the light turning film.

FIG. 51 is a cross-sectional side view of one embodiment of a light emitting device 5100 comprising a light input coupler 101, a film-based lightguide 107 comprising a core layer 601 of a core material with a core refractive index $n_{DL}$ optically coupled to a reflective spatial light modulator 3408 using a first pressure sensitive adhesive layer 3407 comprising a first material with a first refractive index $n_{D1}$. A light source 1102 with an optical axis parallel to the +y direction (into the page) is positioned to emit light into the folded stack of coupling lightguides 104. The film-based lightguide 107 comprises a plurality of low angle directing features 4801 comprising a printed light scattering material on the lower surface 3413 of the core layer 601 of the film-based lightguide 107 and is optically coupled to a light turning film 5101 on the upper surface 3414 of the core layer 601 using a second pressure sensitive adhesive layer 3412 comprising a second material with a second refractive index $n_{D2}$. The light turning film 5101 comprises a base layer 5104 of a fourth material with a fourth refractive index, $n_{D4}$. The top surface 3415 of the light turning film 5101 (opposite the second pressure sensitive adhesive layer 3412) comprises a coating or layer 5105 (see FIG. 52) of a fifth material with a fifth refractive index, $n_{D5}$, on a plurality of light turning features 5102 embossed or otherwise formed on the base layer 5104 of the fourth material. A third pressure sensitive adhesive layer 3405 comprising a third material with a third refractive index $n_{D3}$ optically couples a cover layer 3406 (such as a protective PET film or touchscreen film, for example) to the top surface 3415 of the light turning film 5101 and fills in the recessed portion of a light turning feature 5102. The coating or layer 5105 on the plurality of light turning features 5102 is positioned on the first angled surface 4803 of the base layer 5104 and is not coated on the second angled surface 4804 of the base layer 5104. The coating or layer 5105 may be created on the first angled surface 4803 with little or no coating on the second angled surface 4804 by organic (or inorganic) vapor deposition where the deposition is oriented at an angle greater than 0 degrees to the planar portion of the top surface of the base layer 5104 of the light turning film 5101 between the light turning features 5102, for example. In this embodiment shown in FIG. 51, the fifth refractive index, $n_{D5}$ is less than the fourth refractive index, $n_{D4}$ such that total internal reflection may occur at the interface between the fourth refractive index material and the fifth refractive index material at the first angled surface 4803 of the light turning features 5102. In one embodiment, the third refractive index $n_{D3}$ is equal to the fourth refractive index, $n_{D4}$, greater than the fourth refractive index, $n_{D4}$, or less than the fourth refractive index, $n_{D4}$, by not more than 0.01. In this embodiment, by coating only the first angled surface 4803 of the light turning features 5102, not or minimally coating the second angled surface 4804 of the light turning features 5102 (and optionally coating or adding the coating or layer 5105 on the planar portions 5103 or portions of the top surface of the base layer 5104 between the light turning features 5102), and by choosing materials with optimized refractive indexes for the base layer 5104 of the light turning film 5101 comprising the light turning features 5102, the coating or layer 5105 on the first angled surface 4803 of the light turning features 5102, and the third pressure sensitive adhesive layer 3405, the refraction or reflection at the interface between the base layer 5104 of the light turning film 5101 and the third pressure sensitive adhesive layer 3405 at the second angled surface 4804 is reduced or eliminated. In one embodiment, the refractive index difference between the fourth material and the fifth material $(n_{D4}-n_{D5})$ is greater than the refractive index difference between the fourth material and the third material $(n_{D4}-n_{D3})$. The light turning features 5102 comprise a coating or layer 5105 conformal with the first angled surface 4803 of the base layer 5104 of the light turning film 5101 such that the coating or layer 5105 is an angled planar region of the fifth material with a refractive index, $n_{D5}$, less than the refractive index, $n_{D4}$, of the fourth material of the base layer 5104 of the light turning film 5101 comprising the light turning features 5102. In other embodiments (not shown), the thickness of the coating or layer 5105 on the second angled surface 4804 is less than 2 micrometers or less than 500 nanometers.

A light mixing region 105 is positioned between the light input coupler 101 and the light emitting region 108 of the light emitting device 5100. An opaque layer 3411 is optically coupled to the film-based lightguide 107 in the light mixing region 105 using the second pressure sensitive adhesive layer 3412. In this embodiment, the opaque layer 3411 is a light absorbing layer that absorbs at least 70% of the light within a wavelength range between 400 nanometers and 700 nanometers that reaches the opaque layer 3411 through the second pressure sensitive adhesive layer 3412. In this embodiment, first light 3409 and second light 3410 from the light source 1102 propagate through the coupling lightguides 104 within the light input coupler 101, totally internally reflect within the core layer 601 of the film-based lightguide 107 and propagate through the light mixing region 105 and into the light emitting region 108 of the film-based lightguide 107. First light 3409 reflects from a low angle directing feature 4801 to a second angle in the core layer 601 of the lightguide smaller than the incident angle by an average total angle of deviation of less than 20 degrees. In this embodiment, the second angle is less than the critical angle for the interface between the core layer 601 and second pressure sensitive adhesive layer 3412. In this embodiment, $n_{DL} > n_{D2} > n_{D1}$ such that the first light 3409 and the second light 3410 preferentially escape a total internal reflection condition within the core layer 601 of the film-based lightguide 107 on the upper surface 3414 of the core layer 601 since the refractive index, $n_{D2}$, of the second pressure sensitive adhesive layer 3412 is greater than the refractive index, $n_{D1}$, of the first pressure sensitive adhesive layer 3407. In one embodiment, the refractive index, $n_{D3}$, of the third pressure sensitive adhesive layer 3405 is less than or equal to the refractive index, $n_{D1}$, of the first pressure sensitive adhesive layer 3407 at the sodium wavelength. After transmitting from the core layer 601 into the second pressure sensitive adhesive layer 3412, the first light 3409 propagates into the light turning film 5101 and totally internally reflects from a light turning feature 5102 (due to the refractive index, $n_{D5}$, of the coating or layer 5105 at the first angled surface 4803 of the light turning feature 5102 being less than the refractive index, $n_{D4}$, of the fourth material of the base layer 5104 of the light turning film 5101) in the light turning film 5101 to an angle within 30 degrees from the thickness direction (parallel to the z direction in this embodiment) of the film-based lightguide 107. The first light 3409 then propagates back through the light turning film 5101, the second pressure sensitive adhesive layer 3412, the core layer 601, and the first pressure sensitive adhesive layer 3407, reflects from the reflective spatial light modulator 3408, passes back through the aforementioned layers in the reverse order, does not interact a second time with a light turning feature 5102, and is emitted from the light emitting device 5100 in the light emitting region 108.

After being redirected by the low angle directing feature 4801, the second light 3410 propagates from the core layer 601 into the second pressure sensitive adhesive layer 3412 and into the light turning film 5101. The second light 3410 does not intersect a light turning feature 5102 on the first pass and totally internally reflects from the interface between the base layer 5104 and the coating or layer 5105 at the top surface 3415 (which may be planar) of the light turning film 5101 between the light turning features 5102 and propagates back through the light turning film 5101, through the second pressure sensitive adhesive layer 3412, through the core layer 601 and totally internally reflects at the interface between the core layer 601 and the first pressure sensitive adhesive layer 3407, passes back through the aforementioned layers in reverse order and totally internally reflects from the light turning feature 5102 at the interface between the base layer 5104 and the coating or layer 5105 at the first angled surface 4803 of the light turning feature 5102 in the light turning film 5101 to an angle within 30 degrees from the thickness direction (parallel to the z direction in this embodiment) of the film-based lightguide 107. The second light 3410 then propagates back through the light turning film 5101, the second pressure sensitive adhesive layer 3412, the core layer 601, and the first pressure sensitive adhesive layer 3407, reflects from the reflective spatial light modulator 3408, passes back through the aforementioned layers in the reverse order, and is emitted from the light emitting device 5100 in the light emitting region 108.

Figure 52:
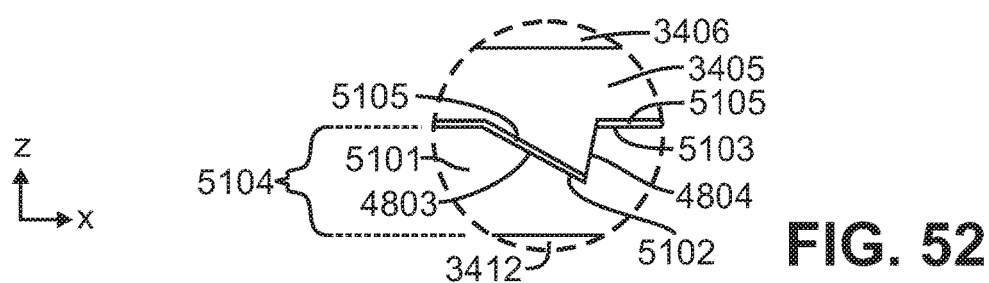
FIG. 52 is a close-up view of an area around a light turning feature of the light emitting device of FIG. 51.

FIG. 52 is a close-up view of an area around a light turning feature 5102 of the light emitting device 5100 of FIG. 51. The light turning feature 5102 comprises a first angled surface 4803 and a second angled surface 4804. The first angled surface 4803 and the top surface of the base layer 5104 of the light turning film 5101 comprise a coating or layer 5105.

Figure 53:
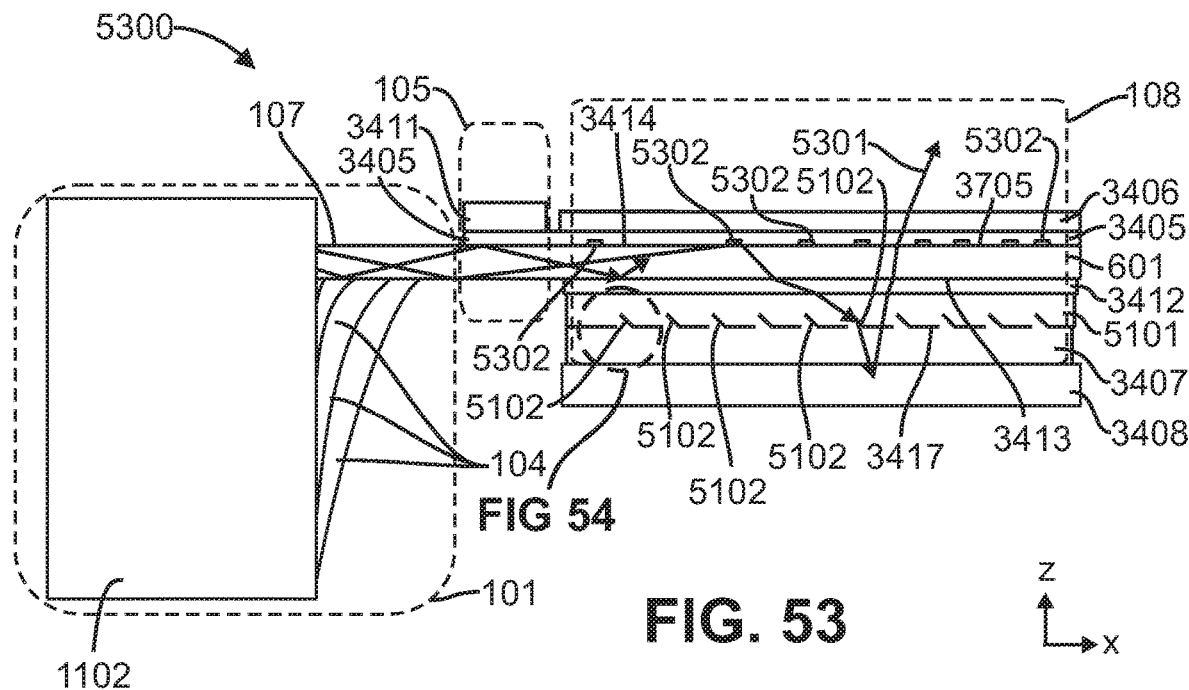
FIG. 53 is a cross-sectional side view of one embodiment of a light emitting device comprising a coating or layer positioned on the first angled surface of a base layer of a light turning film positioned between a core layer and a reflective spatial light modulator.

FIG. 53 is a cross-sectional side view of one embodiment of a light emitting device 5300 comprising a light input coupler 101, a film-based lightguide 107 comprising a core layer 601 of a core material with a core refractive index $n_{DL}$ optically coupled to a light turning film 5101 on the lower surface 3413 of the core layer 601 using a second pressure sensitive adhesive layer 3412 comprising a second material with a second refractive index $n_{D2}$. The film-based lightguide 107 comprises a plurality of low angle directing features 5302 comprising a printed light material on the upper surface 3414 of the core layer 601 of the film-based lightguide 107. A third pressure sensitive adhesive layer 3405 comprising a third material with a third refractive index $n_{D3}$ optically couples a cover layer 3406 (such as a protective PET film or touchscreen film, for example) to the upper surface 3414 of the core layer 601. A light source 1102 with an optical axis parallel to the +y direction (into the page) is positioned to emit light into the folded stack of coupling lightguides 104.

The light turning film 5101 comprises a base layer 5104 of a fourth material with a fourth refractive index, $n_{D4}$. The lower surface 3417 of the light turning film 5101 (opposite the second pressure sensitive adhesive layer 3412) comprises a coating or layer 5105 (see FIG. 54) of a fifth material with a fifth refractive index, $n_{D5}$, on a plurality of light turning features 5102 embossed or otherwise formed on the base layer 5104 of the fourth material. A reflective spatial light modulator 3408 is optically coupled to the lower surface 3417 of the light turning film 5101 using a first pressure sensitive adhesive layer 3407 comprising a first material with a first refractive index nm. The first pressure sensitive adhesive layer 3407 fills in the recessed portion of the light turning feature 5102.

The coating or layer 5105 on the plurality of light turning features 5102 is positioned on the first angled surface 4803 of the base layer 5104 and is not coated on the second angled surface 4804 of the base layer 5104. The coating or layer 5105 may be created on the first angled surface 4803 with little or no coating on the second angled surface 4804 by organic (or inorganic) vapor deposition where the deposition is oriented at an angle greater than 0 degrees to the planar portion of the top surface of the base layer 5104 of the light turning film 5101 between the light turning features 5102, for example. In this embodiment shown in FIG. 53, the fifth refractive index, $n_{D5}$ is less than the fourth refractive index, $n_{D4}$ such that total internal reflection may occur at the interface between the fourth refractive index material and the fifth refractive index material at the first angled surface 4803 of the light turning features 5102. In one embodiment, the first refractive index nm is equal to the fourth refractive index, $n_{D4}$, greater than the fourth refractive index, $n_{D4}$, or less than the fourth refractive index, $n_{D4}$, by not more than 0.01. In this embodiment, by coating only the first angled surface 4803 of the light turning features 5102, not or minimally coating the second angled surface 4804 of the light turning features 5102 (and optionally coating or adding the coating or layer 5105 on the planar portions 5103 or portions of the top surface of the base layer 5104 between the light turning features 5102), and by choosing materials with optimized refractive indexes for the base layer 5104 of the light turning film 5101 comprising the light turning features 5102, the coating or layer 5105 on the first angled surface 4803 of the light turning features 5102, and the first pressure sensitive adhesive layer 3407, the refraction or reflection at the interface between the base layer 5104 of the light turning film 5101 and the first pressure sensitive adhesive layer 3407 at the second angled surface 4804 is reduced or eliminated. In one embodiment, the refractive index difference between the fourth material and the fifth material ($n_{D4}-n_{D5}$) is greater than the refractive index difference between the fourth material and the first material ($n_{D4}-n_{D1}$). The light turning features 5102 comprise a coating or layer 5105 conformal with the first angled surface 4803 of the base layer 5104 of the light turning film 5101 such that the coating or layer 5105 is an angled planar region of the fifth material with a refractive index, $n_{D5}$, less than the refractive index, $n_{D4}$, of the fourth material of the base layer 5104 of the light turning film 5101 comprising the light turning features 5102. In other embodiments (not shown), the thickness of the coating or layer 5105 on the second angled surface 4804 is less than 2 micrometers or less than 500 nanometers.

A light mixing region 105 is positioned between the light input coupler 101 and the light emitting region 108 of the light emitting device 5300. An opaque layer 3411 is optically coupled to the film-based lightguide 107 in the light mixing region 105 using the third pressure sensitive adhesive layer 3405. In this embodiment, the opaque layer 3411 is a light absorbing layer that absorbs at least 70% of the light within a wavelength range between 400 nanometers and 700 nanometers that reaches the opaque layer 3411 through the third pressure sensitive adhesive layer 3405. In this embodiment, first light 5301 from the light source 1102 propagates through the coupling lightguides 104 within the light input coupler 101, totally internally reflect within the core layer 601 of the film-based lightguide 107 and propagate through the light mixing region 105 and into the light emitting region 108 of the film-based lightguide 107. First light 5301 reflects from a low angle directing feature 5302 to a second angle in the core layer 601 of the lightguide smaller than the incident angle by an average total angle of deviation of less than 20 degrees. In this embodiment, the second angle is less than the critical angle for the interface between the core layer 601 and second pressure sensitive adhesive layer 3412. In this embodiment, $n_{DL}>n_{D2}>n_{D3}$ such that the first light 3409 preferentially escapes a total internal reflection condition within the core layer 601 of the film-based lightguide 107 on the lower surface 3413 of the core layer 601 since the refractive index, $n_{D2}$, of the second pressure sensitive adhesive layer 3412 is greater than the refractive index, $n_{D3}$, of the third pressure sensitive adhesive layer 3405. After transmitting from the core layer 601 into the second pressure sensitive adhesive layer 3412, the first light 5301 propagates into the light turning film 5101 and totally internally reflects from a light turning feature 5102 (due to the refractive index, $n_{D5}$, of the coating or layer 5105 at the first angled surface 4803 of the light turning feature 5102 being less than the refractive index, $n_{D4}$, of the fourth material of the base layer 5104 of the light turning film 5101) in the light turning film 5101 to an angle within 30 degrees from the thickness direction (parallel to the z direction in this embodiment) of the film-based lightguide 107 toward the reflective spatial light modulator 3408. The first light 5301 then reflects from the reflective spatial light modulator 3408, passes back through the first pressure sensitive adhesive layer 3407, the light turning film 5101, the second pressure sensitive adhesive layer 3412, the core layer 601, does not interact a second time with a light turning feature 5102, passes through the third pressure sensitive adhesive layer 3405 and the cover layer 3406, and is emitted from the light emitting device 5300 in the light emitting region 108. In one embodiment, the refractive index, $n_{D3}$, of the third pressure sensitive adhesive layer 3405 is less than or equal to the refractive index, $n_{D1}$, of the first pressure sensitive adhesive layer 3407 at the sodium wavelength.

In one embodiment, a light emitting device (such as a frontlight for a reflective display, for example) comprises a film-based lightguide with the surfaces of the film defining a first lightguide, the first lightguide is optically coupled to a light redirecting optical element or other film and one or more surfaces of the light redirecting optical element or other film in combination with a surface of the first lightguide define a second lightguide, wherein the second lightguide may comprise the first lightguide. In one embodiment, a reflective display comprises a lightguide wherein an effective thickness of the lightguide bounded by total internal reflection interfaces is increased for totally internally reflected light within the core layer that is frustrated by the plurality of light extraction features such that it passes through the first cladding layer and totally internally reflects at one of the total internal reflection interfaces of a light redirecting optical element. In a further embodiment, a first lightguide and a second lightguide comprise the core layer, the second lightguide defined by a portion of the frustrated totally internally reflected light from the first lightguide propagating by total internal reflection between a surface of the first lightguide and an area of a surface of the light redirecting optical element, wherein the light redirecting features of a light redirecting optical element occupy less than 50% of the surface of the light redirecting optical element, the area of the surface of the light redirecting element is defined between the light redirecting features and reflects by total internal reflection a second portion of the frustrated totally internally reflected light from the light extraction features back through a first cladding layer and into a core layer of the first lightguide where it totally internally reflects from the surface of the first lightguide and is subsequently reflected by a light redirecting feature toward a reflective spatial light modulator.

Figure 54:
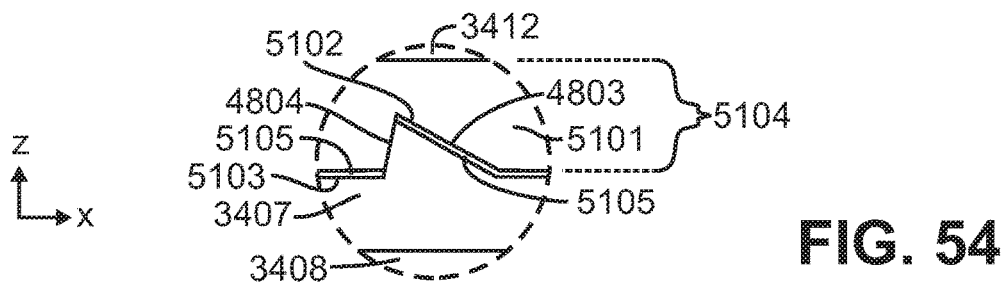
FIG. 54 is a close-up view of an area around a light turning feature of the light emitting device of FIG. 53.

FIG. 54 is a close-up view of an area around a light turning feature 5102 of the light emitting device 5300 of FIG. 53. The light turning feature 5102 comprises a first angled surface 4803 and a second angled surface 4804. The first angled surface 4803 and the bottom surface of the base layer 5104 of the light turning film 5101 comprise a coating or layer 5105.

In one embodiment, a light emitting device comprises: a film lightguide of a lightguide material with a refractive index $n_{DL}$, including a body having a first surface and an opposing second surface; a plurality of coupling lightguides extending from the body, each coupling lightguide of the plurality of coupling lightguides having an end, the plurality of coupling lightguides folded and stacked such that the ends of the plurality of coupling lightguides define a light input surface; the body of the film comprising a first core layer comprising a first material with a first refractive index, $n_{D1}$, a second layer comprising a second material with a second refractive index $n_{D2}$ where $n_{DL}>n_{D2}>n_{D1}$; a plurality of low angle directing features optically coupled to the body of the lightguide; a plurality of light turning features optically coupled to the lightguide; wherein light propagating under total internal reflection at a first angle within the lightguide is redirected by the low angle directing features to a second angle less than the critical angle of an interface between the core lightguide layer and the second layer, a portion of the redirected light propagating through the interface and redirected by the light turning features to an angle within 30 degrees of the thickness direction of the film.

In one aspect, a light emitting device including a film with coupling lightguides extending therefrom includes a coupling lightguide Relative Position Maintaining Element (RPME) including a spine region connecting an array of angled teeth or guides. In another aspect, the angled teeth or guides of the RPME are physically coupled by a spine that does not extend outside the volume defined between the overlapping sections of the array of coupling lightguides in the regions of the fold. In another aspect, the array of angled teeth in an RPME include first edges oriented at a first tooth edge angle to the extended direction of the teeth (the direction the teeth extend from the spine, perpendicular to the array direction of the array of teeth) and second edges oriented at a second tooth edge angle to the extended direction of the teeth wherein the first tooth edge angle and second tooth edge angle are greater than 0 degrees.

In another aspect, a lightguide, cladding, or adhesive optically coupled to the lightguide includes a pliable or impact absorbing material. In another aspect, the ASTM D2240 Shore A hardness of the light transmitting lightguide, adhesive, or component physically and/or optically coupled to the lightguide is greater than one selected from the group: 5, 10, 20, 30, 40, 50, 60, 70, and 80.

In one aspect, a light input coupler for a light emitting device includes a wrap around a stack of coupling lightguides wherein the wrap includes a film with a Young's modulus less than one selected from the group: 10, 8, 6, 4, 2, 1, 0.5, and 0.1 gigapascals. In another aspect, the wrap includes perforations or alignment holes. In another aspect, the wrap material is a conformal material coated or injected into a cavity or region including the coupling lightguides.

EQUIVALENTS

Those skilled in the art will recognize or be able to ascertain using no more than routine experimentation, numerous equivalents to the specific procedures described herein. Such equivalents are considered to be within the scope of the disclosure. Various substitutions, alterations, and modifications may be made to the embodiments without departing from the spirit and scope of the disclosure. Other aspects, advantages, and modifications are within the scope of the disclosure. This disclosure is intended to cover any adaptations or variations of the specific embodiments discussed herein. Therefore, it is intended that this disclosure be limited only by the claims and the equivalents thereof.

Exemplary embodiments of light emitting devices and methods for making or producing the same are described above in detail. The devices, components, and methods are not limited to the specific embodiments described herein, but rather, the devices, components of the devices and/or steps of the methods may be utilized independently and separately from other devices, components and/or steps described herein. Further, the described devices, components and/or the described methods steps can also be defined in, or used in combination with, other devices and/or methods, and are not limited to practice with only the devices and methods as described herein.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context. Further, when a particular feature, structure, or characteristic is described in connection with any embodiment, it is submitted that it is within the purview of one skilled in the art to effect such feature, structure, or characteristic in connection with other ones of the embodiments.

While the disclosure includes various specific embodiments, those skilled in the art will recognize that the embodiments can be practiced with modification within the spirit and scope of the disclosure and the claims. It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein. Unless indicated to the contrary, all tests and properties are measured at an ambient temperature of 25 degrees Celsius or the environmental temperature within or near the device when powered on (when indicated) under constant ambient room temperature of 25 degrees Celsius. Unless otherwise stated, refractive indexes referenced herein are measured at the yellow doublet sodium D-line, with a wavelength of 589 nanometers. Elements in the figures are not drawn to scale.

What is claimed is:

1. A lightguide comprising:
a film having opposing surfaces with a thickness in a thickness direction not greater than 0.5 millimeters therebetween;
a light mixing region of the film between a light emitting region of the film comprising light extraction features and an array of coupling lightguides, the array of coupling lightguides in a form of strips of the film extending from the light mixing region in an extended direction and arrayed in an array direction, with each coupling lightguide of the array of coupling lightguides terminating in a light input edge and folded such that the array of coupling lightguides are stacked to form a light input surface defined by the light input edges of the array of coupling lightguides and the array of coupling lightguides are flat at the light input surface; and
a first coupling lightguide of the array of coupling lightguides positioned first in the array of coupling lightguides along a side of the film, the first coupling lightguide comprising a first light input edge between an inner lateral edge of the first coupling lightguide and an outer lateral edge of the first coupling lightguide opposite the inner lateral edge,
wherein a width of the first light input edge is less than a width of the first coupling lightguide at the light mixing region and the first coupling lightguide is folded toward the outer lateral edge of the first coupling lightguide at an angled fold such that the first light input edge is between the outer lateral edge and the inner lateral edge of the first coupling lightguide along the array direction.

2. The lightguide of claim 1 wherein the first light input edge is offset from the outer lateral edge in the array direction when the first coupling lightguide is folded, and the width of the light input edge is less than 70% of the width of the first coupling lightguide at the light mixing region.

3. The lightguide of claim 1 wherein the light input surface is between the outer lateral edge and the inner lateral edge of the first coupling lightguide along the array direction when the first coupling lightguide is folded.

4. The lightguide of claim 1 wherein the light input surface is offset from the outer lateral edge in the array direction when the first coupling lightguide is folded.

5. The lightguide of claim 1 wherein the first light input edge is offset from a center of the first coupling lightguide at the light mixing region in the array direction when the first coupling lightguide is un-folded.

6. The lightguide of claim 1 wherein the first coupling lightguide comprises a curved lateral edge region or a tapered lateral edge region defined by a first lateral edge or a second lateral edge curved or tapered, respectively, toward the first light input edge.

7. The lightguide of claim 6 wherein the first coupling lightguide comprises a curved region curved in a plane comprising the thickness direction of the film when the first coupling lightguide is folded, and the first light input edge is positioned outside of the curved region of the first coupling lightguide.

8. The lightguide of claim 7 wherein the curved region comprises a portion of the first lateral edge.

9. The lightguide of claim 1 wherein the first light input edge is positioned in a first planar region of the first coupling lightguide defined between the inner lateral edge and a first line that is a first curved extension length from the angled fold in the extended direction when un-folded, wherein the first curved extension length, c, is defined by an equation $$c = \frac{\pi R}{2\cos\theta}$$

where R is a radius of curvature of the first coupling lightguide when folded and θ is an angle of the fold relative to the extended direction.

10. A lightguide comprising:
a film having opposing surfaces with a thickness in a thickness direction not greater than 0.5 millimeters therebetween;
a light mixing region of the film between a light emitting region of the film comprising light extraction features and an array of coupling lightguides, the array of coupling lightguides in a form of strips of the film extending from the light mixing region in an extended direction and arrayed in an array direction, with each coupling lightguide of the array of coupling lightguides terminating in a light input edge and folded such that the array of coupling lightguides are stacked to form a light input surface defined by the light input edges of the array of coupling lightguides and the array of coupling lightguides are flat at the light input surface; and
a first coupling lightguide of the array of coupling lightguides positioned first in the array of coupling lightguides along a side of the film, the first coupling lightguide comprising a first light input edge between an inner lateral edge of the first coupling lightguide and an outer lateral edge of the first coupling lightguide opposite the inner lateral edge,
wherein a width of the first light input edge is less than a width of the first coupling lightguide at the light mixing region and the first coupling lightguide is folded toward the outer lateral edge of the first coupling lightguide at an angled fold such that the first light input edge is offset from the outer lateral edge in the array direction and positioned above the first coupling lightguide in the thickness direction when the first coupling lightguide is folded.

11. The lightguide of claim 10 where in the first coupling lightguide is folded 90 degrees such that the angled fold has a fold angle of 45 degrees from the extended direction.

12. The lightguide of claim 10 wherein the first light input edge is offset from the outer lateral edge in the array direction when the first coupling lightguide is folded.

13. The lightguide of claim 10 wherein the light input surface is between the outer lateral edge and the inner lateral edge of the first coupling lightguide along the array direction when the first coupling lightguide is folded.

14. The lightguide of claim 13 wherein the first coupling lightguide comprises a curved lateral edge region or a tapered lateral edge region defined by a first lateral edge or a second lateral edge curved or tapered, respectively, toward the first light input edge.

15. The lightguide of claim 14 wherein the first coupling lightguide comprises a curved region curved in a plane comprising the thickness direction of the film when the first coupling lightguide is folded and the first light input edge is positioned outside of the curved region of the first coupling lightguide.

16. The lightguide of claim 15 wherein the curved region comprises a portion of the first lateral edge.

17. The lightguide of claim 14 wherein the curved lateral edge region or the tapered lateral edge region extends through the angled fold.

18. The lightguide of claim 10 wherein the first light input edge is offset from a center of the first coupling lightguide at the light mixing region in the array direction when the first coupling lightguide is un-folded.

19. The lightguide of claim 10 wherein the first light input edge is positioned in a first planar region of the first coupling lightguide defined between the inner lateral edge and a first line that is a first curved extension length from the angled fold in the extended direction when un-folded, wherein the first curved extension length, c, is defined by an equation $$c = \frac{\pi R}{2\cos\theta}$$

where R is a radius of curvature of the first coupling lightguide when folded and θ is an angle of the fold relative to the extended direction.

20. A lightguide comprising:
a film having opposing surfaces with a thickness in a thickness direction not greater than 0.5 millimeters therebetween;
a light mixing region of the film between a light emitting region of the film comprising light extraction features and an array of coupling lightguides, the array of coupling lightguides in a form of strips of the film extending from the light mixing region in an extended direction and arrayed in an array direction, with each coupling lightguide of the array of coupling lightguides terminating in a light input edge and folded such that the array of coupling lightguides are stacked to form a light input surface defined by the light input edges of the array of coupling lightguides and the array of coupling lightguides are flat at the light input surface; and
a first coupling lightguide of the array of coupling lightguides positioned first in the array of coupling lightguides along a side of the film, the first coupling lightguide comprising a first light input edge between an inner lateral edge of the first coupling lightguide and an outer lateral edge of the first coupling lightguide opposite the inner lateral edge, and a curved region curved in a plane comprising the thickness direction of the film when the first coupling lightguide is folded,
wherein a width of the first light input edge is less than a width of the first coupling lightguide at the light mixing region and the first coupling lightguide is folded toward the outer lateral edge of the first coupling lightguide such that the first light input edge is positioned outside of the curved region of the first coupling lightguide, and the first light input edge and the light input surface are between the outer lateral edge and the inner lateral edge of the first coupling lightguide along the array direction.

* * * * *